US007061197B1

(12) United States Patent
Mullet et al.

(10) Patent No.: US 7,061,197 B1
(45) Date of Patent: Jun. 13, 2006

(54) PIVOTING AND BARRIER LOCKING OPERATOR SYSTEM

(75) Inventors: Willis J. Mullet, Gulf Breeze, FL (US); Albert W. Mitchell, Cantonment, FL (US); David B. Davies, Pace, FL (US); Paul J. VanDrunen, Navarre, FL (US); James S. Murray, Milton, FL (US); Derek S. Paquette, Daphne, AL (US); Michael Cognevich, Cantonment, FL (US)

(73) Assignee: Wayne-Dalton Corp., Mt. Hope, OH (US)

( * ) Notice: Subject to any disclaimer, the term of this patent is extended or adjusted under 35 U.S.C. 154(b) by 0 days.

(21) Appl. No.: 11/165,138

(22) Filed: Jun. 22, 2005

(51) Int. Cl.
*G05B 5/00* (2006.01)

(52) U.S. Cl. ........................ 318/466; 318/468; 318/471

(58) Field of Classification Search ................ 318/466, 318/266, 282, 812, 468, 445, 471, 434
See application file for complete search history.

(56) References Cited

U.S. PATENT DOCUMENTS

| | | | | |
|---|---|---|---|---|
| 3,051,014 | A | 8/1962 | Houk | |
| 4,234,833 | A | 11/1980 | Barrett | 318/282 |
| 4,338,553 | A | 7/1982 | Scott, Jr. | 318/266 |
| 4,355,274 | A | 10/1982 | Bourbeau | 318/812 |
| 4,472,910 | A | 9/1984 | Iha | 49/139 |
| 4,560,046 | A | 12/1985 | Lorello et al. | 192/11 |
| 4,817,927 | A | 4/1989 | Martin | 267/155 |
| 4,940,357 | A | 7/1990 | Davis | 403/344 |
| 5,048,653 | A | 9/1991 | Fellows | 192/67 |
| 5,222,327 | A | 6/1993 | Fellows et al. | 49/139 |
| 5,222,403 | A | 6/1993 | Angelini et al. | 74/892.1 |
| 5,278,480 | A | 1/1994 | Murray | 318/626 |
| 5,557,887 | A | 9/1996 | Fellows et al. | 49/28 |
| 5,581,939 | A | 12/1996 | Regan et al. | 49/139 |
| 5,632,063 | A | 5/1997 | Carper et al. | 16/198 |
| 5,698,073 | A | 12/1997 | Vincenzi | 160/188 |
| 5,929,580 | A | 7/1999 | Mullet et al. | 318/466 |
| 5,931,212 | A | 8/1999 | Mullet et al. | 160/188 |
| 6,078,263 | A | 6/2000 | Galloway, Jr. | 340/679 |
| 6,097,166 | A | 8/2000 | Fitzgibbon et al. | 318/471 |
| 6,118,243 | A | 9/2000 | Reed et al. | 318/468 |
| 6,133,703 | A | 10/2000 | Fitzgibbon et al. | 318/445 |
| 6,134,835 | A | 10/2000 | Krupke et al. | 49/200 |

(Continued)

FOREIGN PATENT DOCUMENTS

EP 0 162 799 B1 9/1989

(Continued)

*Primary Examiner*—Karen Masih
(74) *Attorney, Agent, or Firm*—Renner Kenner Greive Bobak Taylor & Weber

(57) ABSTRACT

A system for moving a barrier between limit positions, includes an operator motor assembly mounted proximate to the barrier, wherein at least a portion of the motor assembly is movable between an operating position and a locking position with the motor assembly blocking movement of the barrier. A bias assembly biases the motor assembly in the operating position and allows the motor assembly to move toward the locking position when either a predetermined force overcomes a biasing force or when the barrier is moved to a closed limit position or when forced entry is imposed on the barrier. The biasing force may be adjusted by moving posts on the motor assembly that are engaged by the bias assembly. A disengagement feature may also be provided that allows pivotable movement of the motor assembly even when in a locking position. And the pivoting motor assembly may be used as a secondary entrapment input to an operator controller.

54 Claims, 32 Drawing Sheets

U.S. PATENT DOCUMENTS

| | | | | |
|---|---|---|---|---|
| 6,230,864 | B1 | 5/2001 | Cline | 192/69.9 |
| 6,253,824 | B1 | 7/2001 | Mullet et al. | 160/188 |
| 6,325,134 | B1 | 12/2001 | Mullet | 160/189 |
| 6,326,751 | B1 | 12/2001 | Mullet et al. | 318/434 |
| 6,327,744 | B1 | 12/2001 | Dorma | 16/197 |
| 6,376,832 | B1 | 4/2002 | Smith et al. | 250/231.14 |
| 6,401,792 | B1 | 6/2002 | Mullet et al. | 160/188 |
| 6,401,793 | B1 | 6/2002 | Martin | 160/191 |
| 6,528,961 | B1 | 3/2003 | Fitzgibbon et al. | 318/283 |
| D472,568 | S | 4/2003 | Mullet et al. | D15/199 |
| D473,573 | S | 4/2003 | Mullet et al. | D15/199 |
| 6,561,255 | B1 | 5/2003 | Mullet | 160/188 |
| 6,568,454 | B1 | 5/2003 | Mullet et al. | 160/188 |
| 6,605,910 | B1 | 8/2003 | Mullet et al. | 318/264 |
| 6,655,817 | B1 | 12/2003 | Devlin et al. | 362/233 |
| 6,739,323 | B1 * | 5/2004 | Tippmann, Jr. | 124/51.1 |
| 2004/0006918 | A1 | 1/2004 | Fitzgibbon | 49/28 |
| 2004/0064287 | A1 | 4/2004 | Fitzgibbon | 702/145 |
| 2005/0077715 | A1 * | 4/2005 | Mulhern et al. | 280/755 |

FOREIGN PATENT DOCUMENTS

| | | | |
|---|---|---|---|
| EP | 0 579 727 | B1 | 8/1997 |
| EP | 0 924 585 | B1 | 6/2001 |
| WO | WO 02/086270 | A2 | 10/2002 |
| WO | WO 03/071365 | A2 | 8/2003 |

* cited by examiner

PIVOTING AND BARRIER LOCKING OPERATOR SYSTEM

TECHNICAL FIELD

The present invention relates generally to operators for sectional overhead doors. More particularly, the present invention relates to an operator for moving a sectional overhead door between open and closed positions. More specifically, the present invention relates to a barrier operator system which pivots to lock the door in the closed position, which pivots upon detection of an obstruction, and which is provided with a mechanical disconnect.

BACKGROUND ART

Motorized apparatus for opening and closing sectional overhead doors have long been known in the art. These powered door operators were developed in part due to extremely large, heavy commercial doors for industrial buildings, warehouses, and the like where opening and closing of the doors essentially mandates power assistance. Later, homeowners' demands for the convenience and safety of door operators resulted in an extremely large market for powered door operators for residential usage.

The vast majority of motorized operators for residential garage doors employ a trolley-type system that applies force to a section of the door for powering it between the open and closed positions. Another type of motorized operator is known as a "jack-shaft" operator, which is used virtually exclusively in commercial applications and is so named by virtue of similarities with transmission devices where the power or drive shaft is parallel to the driven shaft, with the transfer of power occurring mechanically, as by gears, belts, or chains between the drive shaft and a driven shaft, normally part of the door counterbalance system, controlling door position. While some efforts have been made to configure hydraulically or pneumatically-driven operators, such efforts have not achieved any substantial extent of commercial acceptance.

The well-known trolley-type door operators are attached to the ceiling and connected directly to a top section of a garage door and for universal application may be powered to operate doors of vastly different size and weight, even with little or no assistance from a counterbalance system for the door. Since the operating force capability of trolley-type operators is normally very high, force adjustments are normally necessary and provided to allow for varying conditions and to allow the operator to be adjusted for reversing force sensitivity, depending on the application. When a garage door and trolley-type operator are initially installed and both adjusted for optimum performance, the overhead door system can perform well as designed. However, as the system ages, additional friction develops in door and operator components due to loss of lubrication at rollers and hinges. Also, the door can absorb moisture and become heavier, and counterbalance springs can lose some of their original torsional force. These and similar factors can significantly alter the operating characteristics seen by the operator, which may produce erratic door operation such as stops and reversals of the door at unprogrammed locations in the operating cycle.

Rather than ascertaining and correcting the conditions affecting door performance, which is likely beyond a homeowner's capability, or engaging a qualified service person, homeowners frequently increase the force adjustment to the maximum setting. However, setting an operator on a maximum force adjustment creates an unsafe condition in that the operator becomes highly insensitive to obstructions. In the event a maximum force setting is effected on a trolley-type operator, the unsafe condition may also be dramatically exemplified in the event of a broken spring or springs maintained in the counterbalance system. In such case, if the operator is disconnected from the door in the fully open position during an emergency or if faulty door operation is being investigated, one half or all of the uncounterbalanced weight of the door may propel the door to the closed position with a guillotine-like effect. Another problem with trolley-type door operators is that they do not have a mechanism for automatically disengaging the drive system from the door if the door encounters an obstruction. This necessitates the considerable effort and cost which has been put into developing a variety of ways, such as sensors and encoders, to signal the operator controls when an obstruction is encountered. In virtually all instances, manual disconnect mechanisms between the door and operator are required to make it possible to operate the door manually in the case of power failures or fire and emergency situations where entrapment occurs and the door needs to be disconnected from the operator to free an obstruction. These mechanical disconnects, when coupled with a maximum force setting adjustment of the operator, can readily exert a force on a person or object which may be sufficiently high to bind the disconnect mechanism and render it difficult, if not impossible, to actuate.

In addition to the serious operational deficiencies noted above, manual disconnects, which are normally a rope with a handle, must extend within six feet of the floor to permit grasping and actuation by a person. In the case of a garage opening for a single car, the centrally-located manual disconnect rope and handle, in being positioned medially, can catch on a vehicle during door movement or be difficult to reach due to its positioning over a vehicle located in the garage. Trolley-type door operators raise a host of peripheral problems due to the necessity for mounting the operator to the ceiling or other structure substantially medially of and to the rear of the sectional door in the fully open position.

Operationally, trolley-type operators are susceptible to other difficulties due to their basic mode of interrelation with a sectional door. Problems are frequently encountered by way of misalignment and damage because the connecting arm of the operator is attached directly to the door for force transmission, totally independent of the counterbalance system. Another source of problems is the necessity for a precise, secure mounting of the motor and trolley rails which may not be optimally available in many garage structures. Thus, trolley-type operators, although widely used, do possess certain disadvantageous and, in certain instances, even dangerous characteristics.

The usage of jack-shaft operators has been limited virtually exclusively to commercial building applications where a large portion of the door stays in the vertical position. This occurs where a door opening may be 15, 20, or more feet in height, with only a portion of the opening being required for the ingress and egress of vehicles. These jack-shaft operators are not attached to the door but are attached to a component of the counterbalance system, such as the shaft or a cable drum. Due to this type of connection to the counterbalance system, these operators require that a substantial door weight be maintained on the suspension system, as is the case where a main portion of the door is always in a vertical position. This is necessary because jack-shaft operators characteristically only drive or lift the door from the closed to the open position and rely on the weight of the door to move the door from the open to the closed position, with the suspension cables attached to the counterbalance system controlling only the closing rate.

Such a one-way drive in a jack-shaft operator produces potential problems if the door binds or encounters an obstruction upon downward movement. In such case, the operator may continue to unload the suspension cables, such that if the door is subsequently freed or the obstruction is removed, the door is able to free-fall, with the potential of damage to the door or anything in its path. Such unloading of the suspension cables can also result in the cables coming off the cable storage drums, thus requiring substantial servicing before normal operation can be resumed.

Jack-shaft operators are normally mounted outside the tracks and may be firmly attached to a door jamb rather than suspended from the ceiling or wall above the header. While there is normally ample jamb space to the sides of a door or above the header in a commercial installation, these areas frequently have only limited space in residential garage applications. Further, the fact that normal jack-shaft operators require much of the door to be maintained in a vertical position absolutely mitigates against their use in residential applications where the door must be capable of assuming essentially a horizontal position since, in many instances, substantially the entire height of the door opening is required for vehicle clearance during ingress and egress.

In order to permit manual operation of a sectional door in certain circumstances, such as the loss of electrical power, provision must be made for disconnecting the operator from the drive shaft. In most instances this disconnect function is effected by physically moving the drive gear of the motor out of engagement with a driven gear associated with the drive shaft. Providing for such gear separation normally results in a complex, oversized gear design which is not compatible with providing a compact operator which can feasibly be located between the drive shaft for the counterbalance system and the door. Larger units to accommodate gear design have conventionally required installation at or near the end of the drive shaft which may result in shaft deflection that can cause one of the two cables interconnecting the counterbalance drums and the door to carry a disproportionate share of the weight of the door.

Another common problem associated particularly with jack-shaft operators is the tendency to generate excessive objectionable noise. In general, the more components, and the larger the components, employed in power transmission the greater the noise level. Common operator designs employing chain drives and high speed motors with spur gear reducers are notorious for creating high noise levels. While some prior art operators have employed vibration dampers and other noise reduction devices, most are only partially successful and add undesirable cost to the operator.

Another requirement in jack-shaft operators is a mechanism to effect locking of the door when it is in the closed position. Various types of levers, bars and the like have been provided in the prior art which are mounted on the door or on the adjacent track or jamb and interact to lock the door in the closed position. In addition to the locking mechanism, which is separate from the operator, there is normally an actuator which senses slack in the lift cables which is caused by a raising of the door without the operator running, as in an unauthorized entry, and activates the locking mechanism. Besides adding operational complexity, such locking mechanisms are unreliable and, also, introduce an additional undesirable cost to the operator system.

A motorized barrier operator, such as a garage door operator, must have obstruction detection to prevent the barrier from damaging property or injuring people by contact. There must be at least two independent safety systems to perform these tasks. Safety standards refer to these as a primary system and a secondary system. The primary system requires that other than for the first one foot (305 mm) of travel as measured over the path of the moving door, both with and without any external entrapment protection device functional, the operator of a downward moving residential garage door shall initiate reversal of the door within two seconds of contact with the obstruction. After reversing the door, the operator shall return the door to, and stop the door at, the full up-most position. It is also required in the safety standards that the secondary system must respond to "a secondary entrapment protection device supplied with, or as an accessory to, an operator and shall consist of: either an external photo-electric sensor that, when activated, results in an operator that is closing a door to reverse direction of the door and the sensor prevents an operator from closing an open door; an external edge sensor installed on the edge of the door that, when activated, results in an operator that is closing a door to reverse direction of the door and the sensor prevents an operator from closing an open door; an inherent door sensor independent of the system used to comply with the standard that, when activated, results in an operator that is closing a door to reverse direction of the door and the sensor prevents an operator from closing an open door; or any other external or internal device that provides entrapment protection equivalent to the foregoing.

The standards also set forth that the operator shall monitor for the presence and correct operation of the secondary entrapment device, including the wiring to it, at least once during each close cycle. In the event the device is not present or a fault condition occurs which precludes the sensing of an obstruction, including an open-or short-circuit in the wiring that connects an external entrapment protection device to the operator and the device's supply source, the operator shall be constructed such that: a closing door shall open and an open door shall not close more than one foot (305 mm) below the up-most position, or the operator shall function with the use of an external photoelectric sensor.

Various systems and mechanisms have been attempted to comply with these safety standards. However, most systems are rather complex and require costly components. It is believed that methods of obstruction detection can be incorporated into a pivoting type operator so as to reduce the overall complexity and make the system more robust.

DISCLOSURE OF THE INVENTION

Therefore, one aspect of the present invention is to provide a pivoting obstruction sensing and barrier locking operator system.

It is another aspect of the present invention to provide a system for moving a barrier between limiting positions comprising an operator motor assembly mounted proximate to the barrier, at least a portion of the operator motor assembly movable between a barrier operating position and a barrier locking position with the operator motor assembly blocking movement of the barrier, and a bias assembly biasing the operator motor assembly in the barrier operating position and allowing the operator motor assembly to move toward the barrier locking position when either a predetermined force overcomes a biasing force of the bias assembly or when the barrier is moved to a closed limit position.

Yet another aspect of the present invention is to provide a system for moving a barrier between limit positions, comprising a counterbalance system adapted to be connected to the barrier, an operator motor assembly mounted proximal the barrier, at least a portion of the operator motor assembly movable between an operating position and a locking position, a bias assembly coupled to the operator motor assembly and maintaining the operator motor assembly in the operating position, the operator motor assembly overcoming a bias force of the bias assembly when the barrier is proximal a closed limit position, and a disengagement mechanism selectively interposed between the counterbalance system and the operator motor assembly, wherein actuation of the disengagement mechanism from an engagement position to a disengagement position allows the bias force to move the operator motor assembly from the locking position even when the barrier is proximal the closed limit position.

It is still another aspect of the present invention to provide an operator motor assembly for moving a barrier between limit positions comprising a motor assembly having at least one post associated therewith and a bias assembly engaging the at least one post to maintain the motor assembly in an operating position, the bias assembly allowing the motor assembly to pivot and maintain engagement with the, at least one, post when a bias force of the bias assembly is overcome by pivoting forces applied to the motor assembly.

Yet another aspect of the present invention is to provide a barrier operator system that moves a barrier between limit positions, comprising a pivotable motor, the pivotable motor assembly having a blocking tab, a counterbalance system coupled to the pivotable motor assembly and adapted to be linked to the barrier, a drive system connected between the pivotable motor assembly and the counterbalance system, and a controller connected to the pivotable motor assembly to control operation thereof, the controller receiving a primary obstruction input from one of the pivotable motor assembly and the drive system and secondary obstruction input from movement of the blocking tab, wherein the controller initiates corrective action based upon the obstruction inputs.

Still another aspect of the present invention is to provide a drive system for a motorized barrier operator that moves a barrier between limit positions, comprising an encoder wheel having a plurality of equally spaced markers and at least one directional marker different than the equally spaced markers; and a sensor associated with the encoder wheel and generating count signals as the equally spaced markers pass the sensor, and a directional signal as the directional marker passes the sensor.

BRIEF DESCRIPTION OF THE DRAWINGS

For a complete understanding of the objects, techniques and structure of the invention, reference should be made to the following detailed description and accompanying drawings, wherein:

FIGS. 9A–C show the motor assembly in a side elevational view further illustrating the compliance encoder, wherein FIG. 9A shows an operational position, FIG. 9B shows an obstructed position and FIG. 9C shows a barrier locked position;

FIGS. 16A–C show the alternative motor assembly in a side elevational view further illustrating the compliance encoder, wherein FIG. 16A shows an operational position, FIG. 16B shows an obstructed position and FIG. 16C shows a barrier locked position;

BEST MODE FOR CARRYING OUT THE INVENTION

Figure 16C:
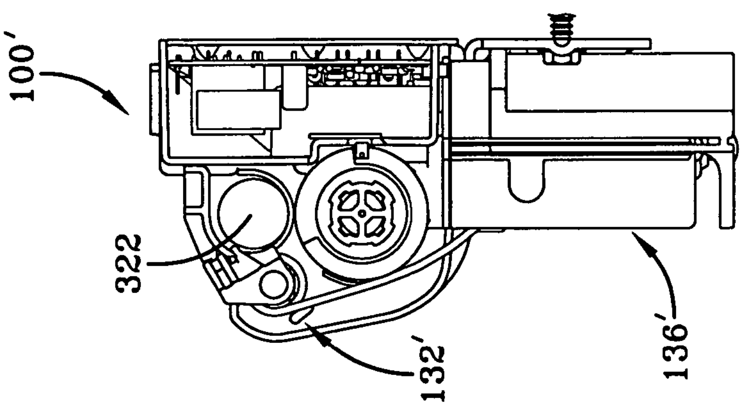
Figure 16B:
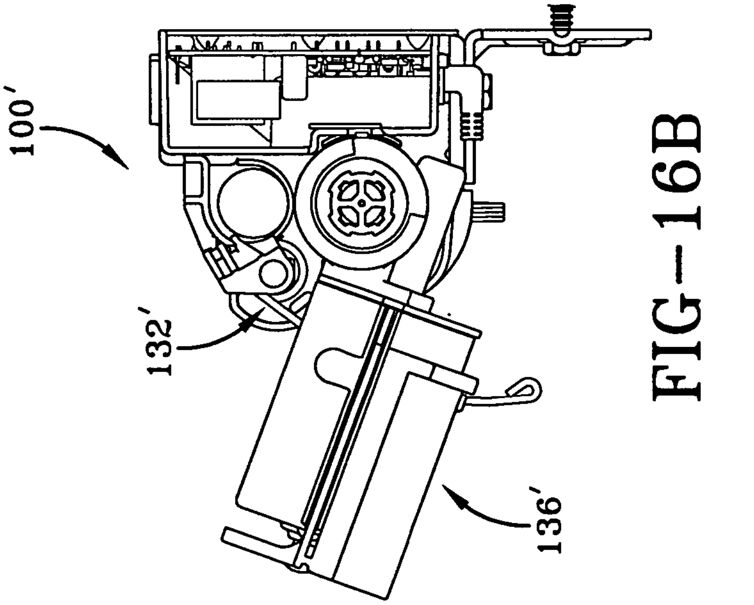
Figure 16A:
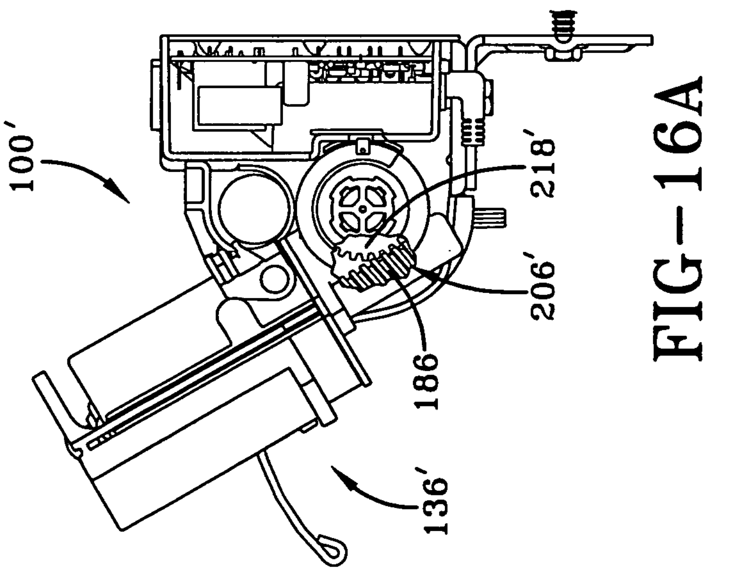
Figure 17:
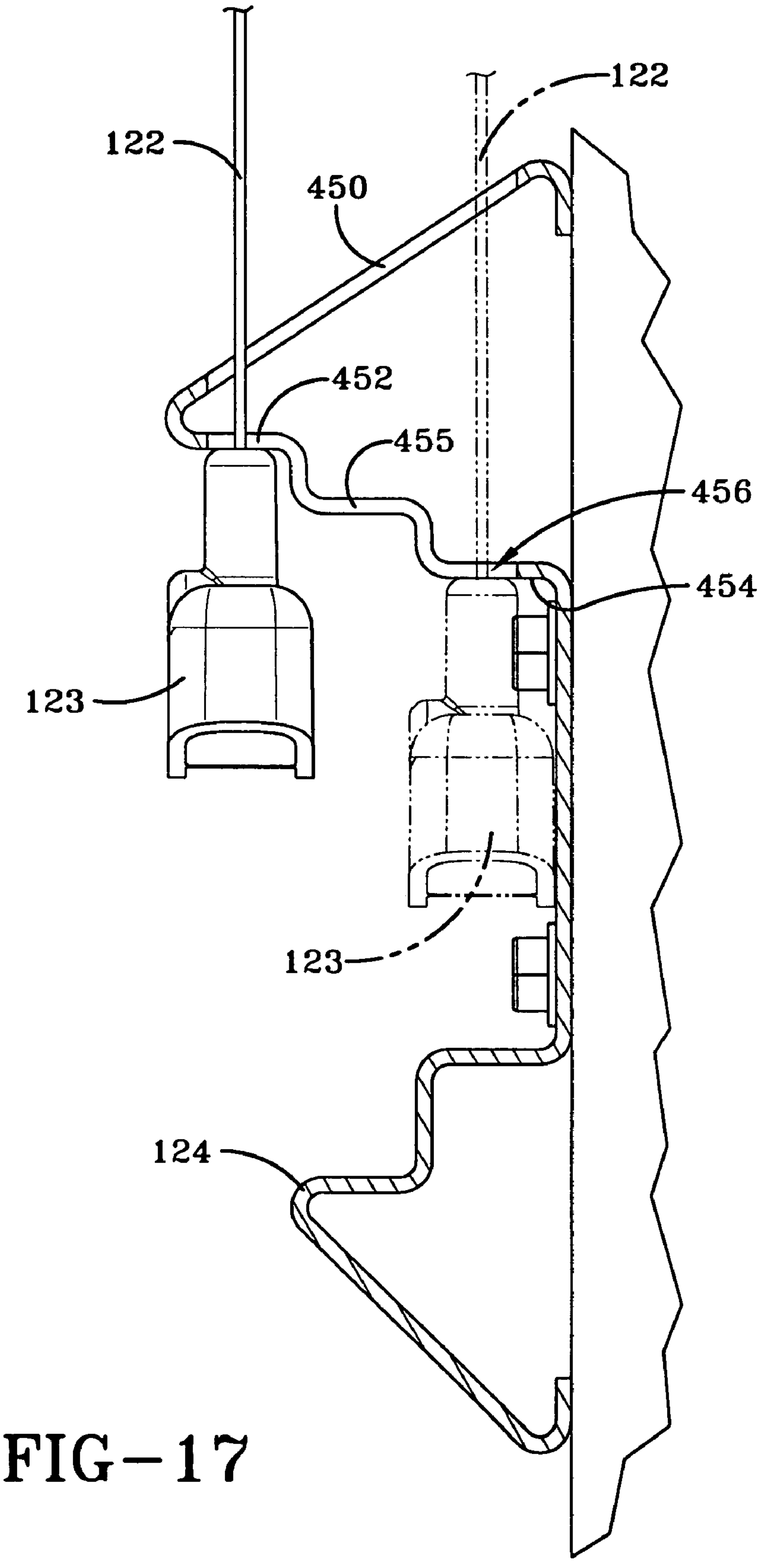
FIG. 17 is a side-elevational view showing a disconnect handle, which is part of a disengagement mechanism used between the drive assembly and a counterbalance system, wherein the solid lines show the handle in an engaged position and the hidden lines show the handle in a disengaged position.

Prior to discussing the structural features and methods of operation of the motorized operator system disclosed herein, a brief outline of the major features will be presented. The present invention is directed to an operator system for moving a barrier between open and closed positions. The major features coact with one another to provide a comprehensive barrier operator system. A number of exemplary variations of the features are presented, but these variations are in no way meant to be limiting. In particular, the major features are directed to a pivoting and locking operator; a disengagement mechanism associated with the operator; an obstruction force adjustment feature utilized by the pivoting and locking operator; and control functions utilized by the operator. In particular, FIGS. 1–16 are directed to a motorized operator system, wherein FIGS. 1–9 are directed to an operator system where counterbalance springs are maintained inside a drive tube and a motor directly drives or rotates the drive tube; and FIGS. 10–16 are directed to an alternative operating system, primarily used in retrofitting existing counterbalance systems, wherein the counterbalance springs are external to the drive tube. In this alternative operating system, the motor drives the drive tube through a transfer gear arrangement. FIGS. 17–20 are directed to the disengagement mechanism, wherein FIGS. 17–18 are used with the operator system shown and described in FIGS. 1–9, and FIGS. 17,19 and 20 are used with the operator system shown and described in FIGS. 10–16. FIGS. 21–29 are directed to alternative embodiments of the obstruction force adjustment which are utilized based upon the characteristics of the door and motor associated with the operator system; and FIGS. 30–31 are directed to control system features utilized by either of the operator systems and which may be applicable to other operator systems not specifically disclosed herein.

Pivoting and Locking Operator

Figure 1:
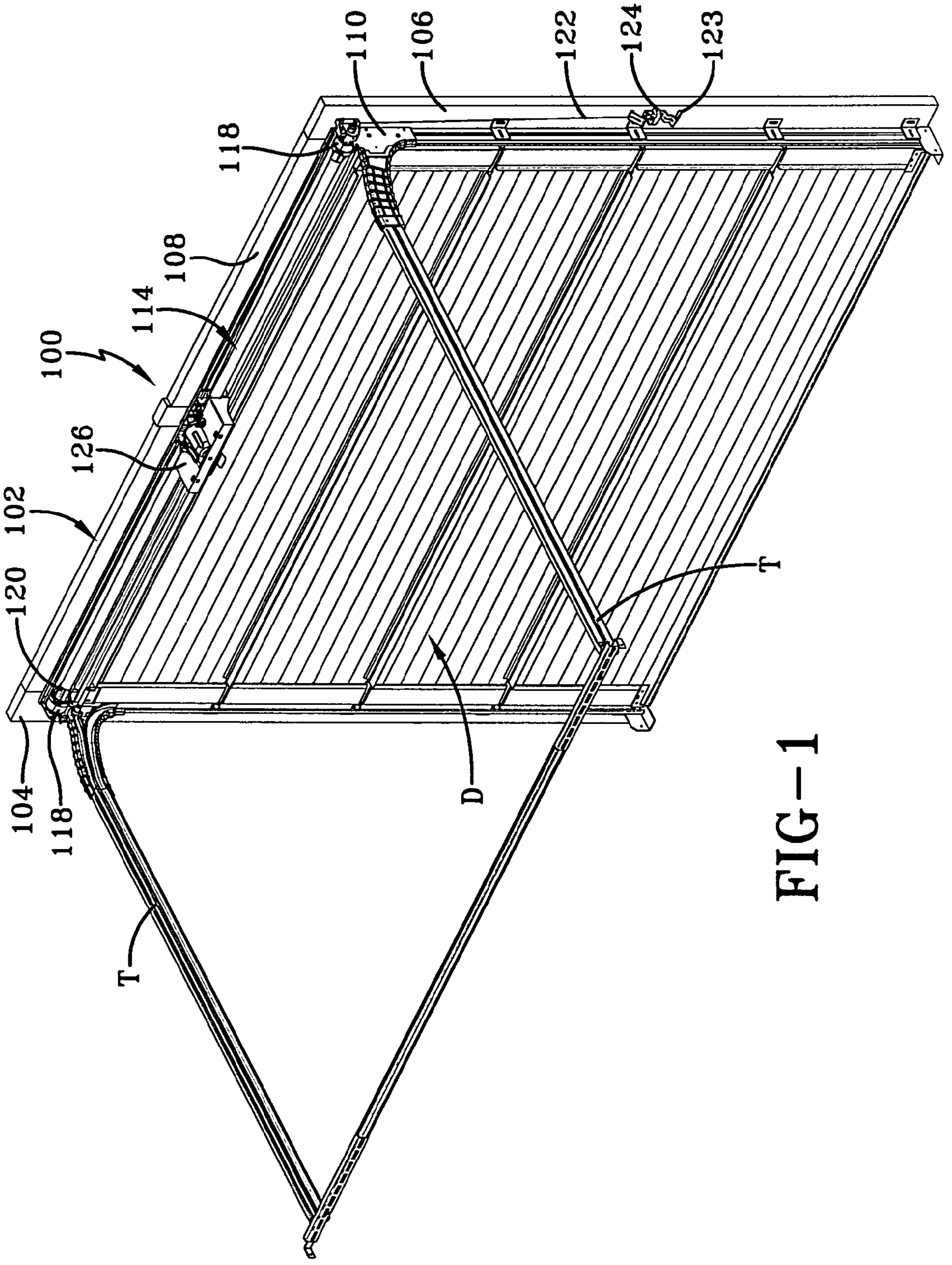
FIG. 1 is a rear perspective view of a sectional overhead garage door installation showing a motorized operator system according to the concepts of the present invention installed in operative relation thereto, with the operator depicted in an operating position.

A motorized operator system according to the concepts of the present invention is generally indicated by the numeral 100 in FIGS. 1–9. The operator system 100 shown in FIG. 1 is mounted in conjunction with a barrier such as a sectional door D of a type commonly employed in garages for residential housing. However, it will be appreciated that the concepts disclosed in relation to the operator system and its various embodiments can be employed with other barriers such as curtains, awnings, gates and the like. The opening in which the door D is positioned for opening and closing movements relative thereto is defined by a frame generally indicated by the numeral 102, which consists of a pair of spaced jambs 104, 106 which are generally parallel and extend vertically upwardly from the floor (not shown). The jambs 104, 106 are spaced apart and joined at their vertical upper extremity by a header 108 to thereby delineate a generally inverted u-shaped frame around the opening of the door D. The jambs and the header are normally constructed of lumber, as is well known to persons skilled in the art, for purposes of reinforcement and facilitating the attachment of elements supporting and controlling door D, including the operator system 100.

Affixed to the jambs 104,106 proximate the upper extremities thereof and the lateral extremities of the header 108 to either side of the door D are flag angles 110 which are secured to the underlying jambs 104,106 respectively. Connected to and extending from the flag angles 110 are respective tracks T which are located on either side of the door D. The tracks provide a guide system for rollers attached to the side of the door as is well known in the art. The tracks T define the travel of the door D in moving upwardly from the closed to open position and downwardly from the open to closed position. The operator system 100 may be electrically interconnected with a peripheral device, such as a light kit, which may contain a power supply, a light, and a radio receiver with antenna. The receiver receives wireless signals—such as radio frequency or otherwise—for remote actuation of the peripheral device in a manner known in the art. The operator system 100 may be controlled by wired or wireless transmitter devices which provide user-functions associated therewith. The peripheral device may also be a network device which generates or transfers wireless signals to lights, locks or other operational peripherals.

Referring now to FIGS. 1 and 2 of the drawings, the operator system 100 mechanically interrelates with the door D through a counterbalance system generally indicated by the numeral 114. As shown, the counterbalance system 114 includes an elongated non-circular drive tube 116 extending between tensioning assemblies 118 positioned proximate each of the flag angles 110. While the exemplary counterbalance system 114 depicted herein is advantageously in accordance with U.S. Pat. No. 5,419,010, which is incorporated herein by reference, it will be appreciated by persons skilled in the art that operator system 100 could be employed with a variety of torsion-spring counterbalance systems. In any event, the counterbalance system 114 includes cable drum mechanisms 120 positioned on the drive tube 116 proximate the ends thereof which rotate with the drive tube. The cable drum mechanisms 120 each have a cable received thereabout which is affixed to the door D preferably proximate the bottom, such that rotation of the cable drum mechanisms 120 operate to open or close the door D in conventional fashion. A disconnect cable 122 is mounted to either one of the jambs 104,106. In particular, the disconnect cable 122 has one end associated or coupled to the operator system and an opposite end terminated by a cable handle 123. A handle holder 124 is secured to either of the jambs 104,106 to hold the cable handle 123. The handle holder 124 provides at least two different positions for the cable handle so as to allow for actuation of the disconnect cable 122. As will be discussed in greater detail, the movement of the disconnect cable 122 connects and disconnects the operator system to the counterbalance system as needed. This aspect will be discussed in more detail in relation to FIGS. 17–20.

Figure 2A:
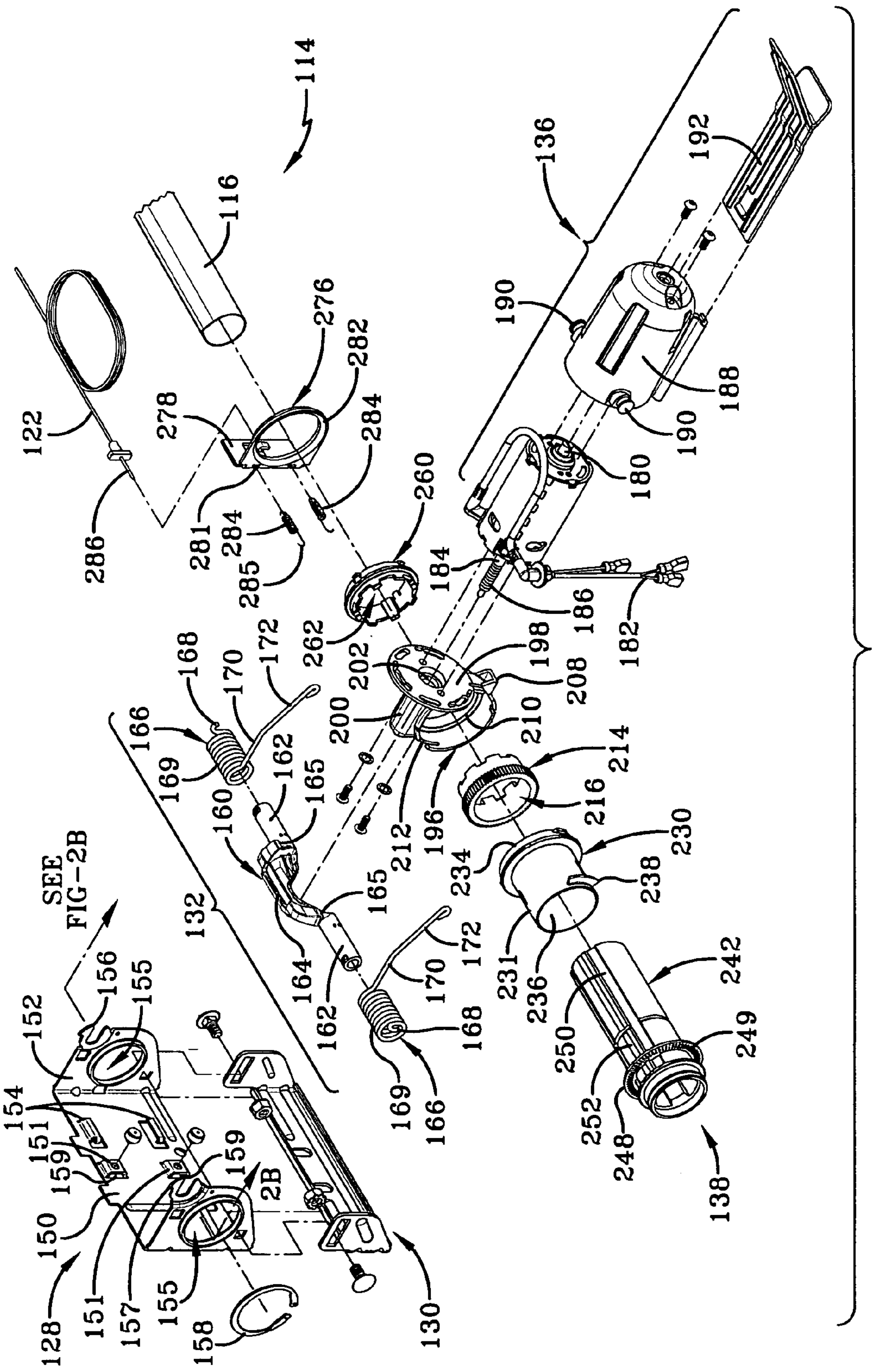
FIGS. 2A–B are an exploded perspective view of the motorized operator system.
Figure 2B:
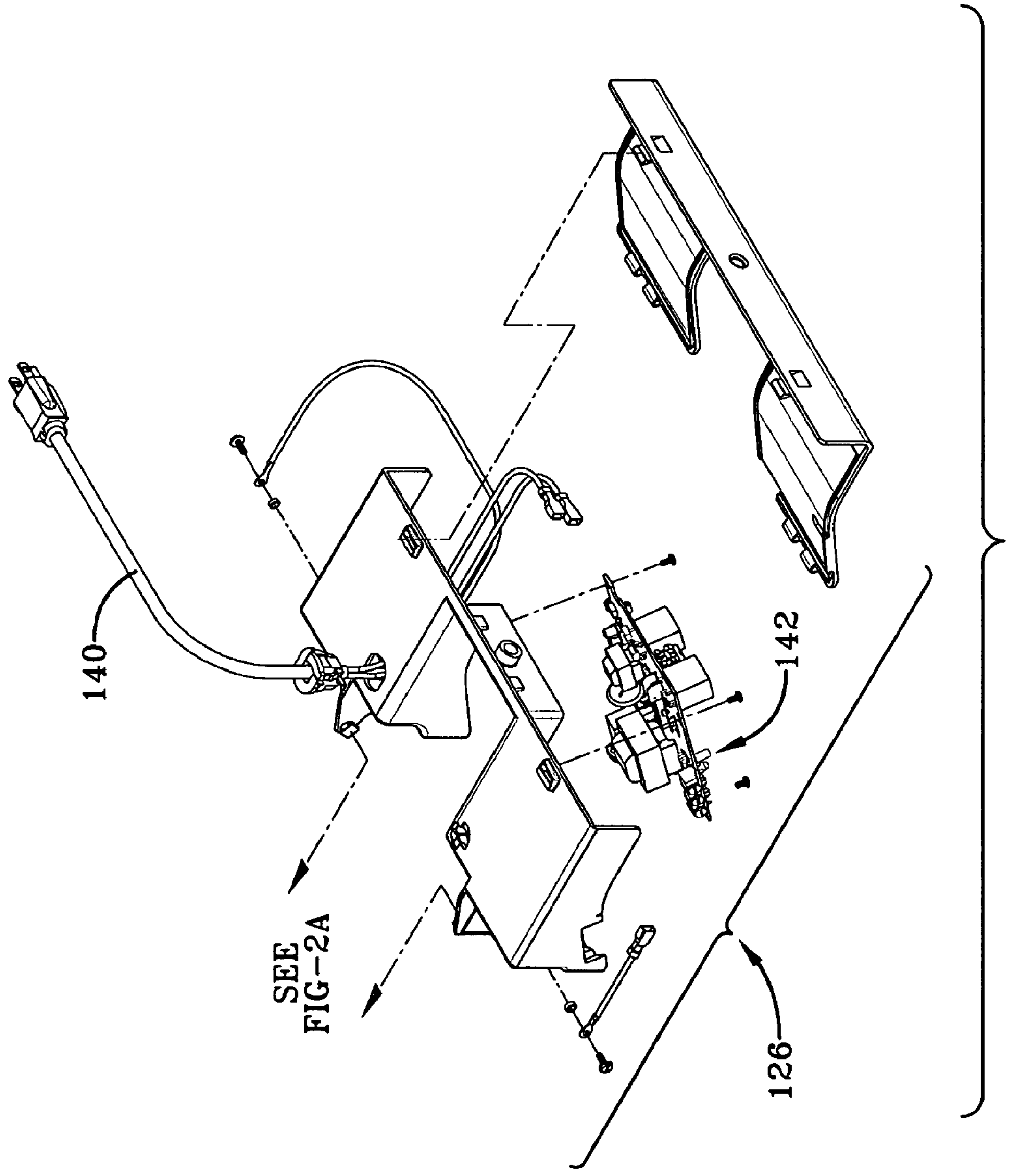
Figure 3:
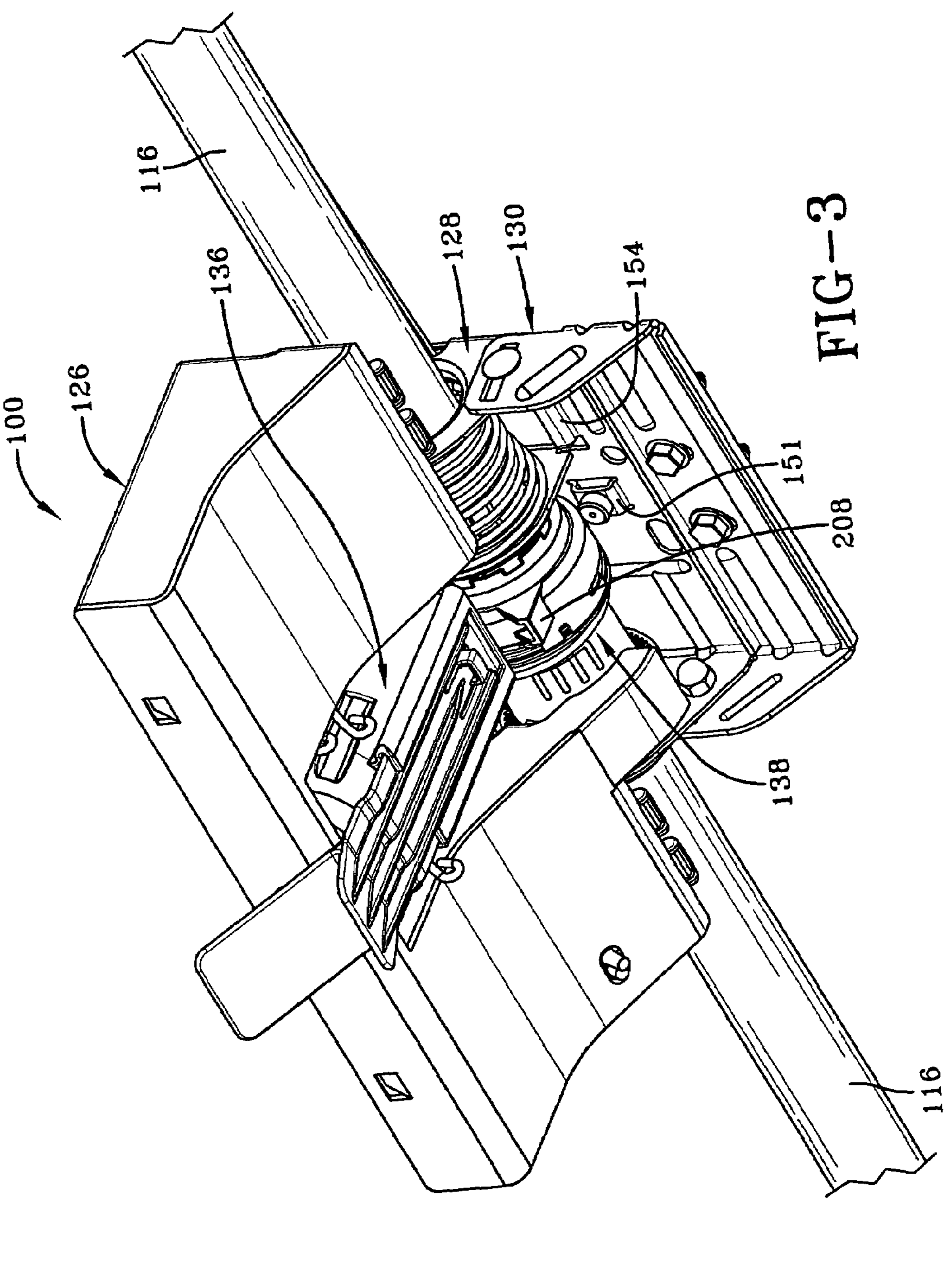
FIG. 3 is a perspective view of an underside of the assembled motorized operator system shown in an operating position.

As best seen in FIGS. 2A, 2B and 3, the operator system 100 includes an operator housing 126 mounted to the header 108. In particular, a header bracket 128 is mounted to the header which may further include a support bracket 130 mounted to the underside of the header bracket 128 and also mounted to the header. The brackets 128 and 130 may be in the form of adjustable mounting brackets which enable alignment of the operator drive assembly axis with the counterbalance drive tube. The adjustable brackets also preserve flatness of the header bracket for mechanical sliding and rotational alignments. The aspect of the self-aligning brackets are disclosed in U.S. Pat. No. 6,588,156, which is incorporated herein by reference. Secured to either the header bracket, or both the header bracket and the support bracket are the following major components of the operator system 100. In particular, the operator system includes a bias assembly designated by the numeral 132 which supports a motor assembly that is designated generally by the numeral 136. A drive assembly, which is generally designated by the numeral 138, is coupled to the motor assembly 136 and in turn coacts with the counterbalance system 114. A power cord 140, which is connectable at one end to a residential or other power supply source, is connected to a control circuit 142 maintained within the operator housing 126. As will be discussed in further detail, the control circuit 142 controls operation of the operator system by receiving input from various sensors and user-generated commands, and generates appropriate outputs to control operation of the motor assembly and other operator system components. Briefly, the motor assembly 136 coacts with the drive assembly 138 for the purpose of rotating the counterbalance system or drive tube which, in turn, opens and closes the barrier between limit positions. The bias assembly 132 is coupled between the header bracket 128 and the motor assembly 136 and supports the motor assembly in an operating position. In the event an obstruction force is applied when the door moves from an open position to a closed position, and that force overcomes the biasing forces applied by the bias assembly to the motor assembly 136, then the motor assembly pivots or rotates downwardly from the operating position. The pivoting motion is detected by features associated with the drive assembly 138 and the control circuit 142 so as to initiate corrective action.

The header bracket 128 includes a header portion 150 which is adjacent to the header 108 and is mounted flush thereto and is fastened with bolts or the like in a desired location. Ideally, the header bracket 128 is medially located between the jambs, but it will be appreciated that the operator system can function most anywhere along the length of the counterbalance system. At least one motor stop 151 may extend from the header portion 150 to prevent over-rotation of the motor assembly. Extending substantially perpendicularly from the opposite ends of the header portion 150 are header flanges 152. Also extending from the header portion 150, in an area between the header flanges 152, are opposed bracket slides 154. Each header flange 152 has an aperture 155 extending therethrough and which are substantially aligned with one another. The apertures 155 receive the components of the drive assembly 138 and allow selected components to rotate therebetween. The header bracket 128 and associated components may also be referred to as a retaining system for carrying the bias assembly 132, the motor assembly 136 and the drive assembly 138. Each flange 152 is also provided with a slot 156 that is substantially aligned with one another and positioned proximal the apertures 155. Each flange 152 also has a notch 157 proximal a corresponding slot 156. The drive assembly 138 is received in the apertures 155 and one end of the assembly is retained by a clip 158 that is positioned externally of one of the header flanges 152. After the various components of the system are installed, the housing 126 is secured to the header bracket 128 which is secured to the mounting (support) bracket 130, all of which, in turn, are secured to the header 108. The motor stops 151 are raised above the surface of the header portion and form a spring catch 159 which is utilized by the disengagement mechanism to be discussed.

The bias assembly 132, which supports the motor assembly 136 with respect to the header bracket 128, includes a yoke designated generally by the numeral 160. The yoke 160 is carried by the header flanges 152 and each yoke end 162 is received in the corresponding slot 156. A buckle 164 connects the yoke ends 162 to one another in an inverted u-shaped configuration. A compliance spring stop 165 is provided at an interconnection of each yoke end 162 and the buckle 164. Carried on each yoke end 162 is a compliance spring 166. Each spring 166 has a spring end 168 secured to a corresponding notch 157 and wherein a body 169 of the spring is wrapped around the yoke end 162. It will be appreciated that the body of the spring 166 is a torsional spring from which extends an elongated section 170 that extends radially from the yoke end 162. A portion of the elongated section 170 is retained by the compliance spring stop 165 to prevent over-rotation of the section and, more importantly, to remove parasitic drag of the drive assembly 138. In any event, the elongated section 170 extends into a curved or angular transition section 172. The change between the elongated section 170 and the transition section 172 may be quite distinct or gradually curved. Indeed, it has been found that a range of curvatures between the sections 170 and 172 can be used to accommodate a range of door weights as will be discussed. The elongated section 170, when both compliance springs are carried by the yoke ends, function to support the motor assembly 136. It will be appreciated that the spring or biasing force generated by the spring 166 is adjustable depending upon the number of turns of the spring body 169 made around the yoke end 162 and also by selection of materials utilized in the spring so as to generate a desired spring constant. Moreover, the springs 166 coact with one another so as to provide a uniform biasing force to support the motor assembly 136. Although two springs are shown, it will be appreciated that one spring or more than two springs may be employed for the purpose of biasing the motor assembly. In such instances, the yoke 160 may be modified accordingly so as to provide the proper biasing force for the motor assembly with respect to the header bracket 128. When using two compliance springs 166, the compliance spring stops 165 are integrated into the yoke 160 to remove parasitic drag on the drive assembly 138 due to the bias force being offset from the motor drive axis when the motor assembly 136 is in a barrier operating position.

The motor assembly 136 includes a motor 180 which is usually a direct current motor but could also be an alternating current motor. A plurality of power leads 182 interconnect the motor 180 with the power cord 140 or other electrical power source. A rotatable drive shaft 184 axially extends from the motor 180 and is rotatable in either direction. The drive shaft 184 provides a shaft gear 186 that engages the drive assembly 138. A motor housing 188 receives and surrounds the motor 180 from any number of external elements. A pair of posts 190 extend from opposite sides of the motor housing 188. The posts 190 may be integral with the housing 188 or they may be selectively movable along the length of the motor housing 188. As will be discussed in further detail, the posts 190 are engaged by or coact with the bias assembly 132. And the movable features of the posts 190 will be discussed specifically in reference to FIGS. 21–29. Axially extending from an end of the motor housing 188, opposite the drive assembly 138, is a door arm 192. The door arm 192 is used to block the top section of the door when the door is in a closed position. Accordingly, any unauthorized upward movement of the door is blocked by the door arm 192. The door arm 192 may be slidably mounted with respect to the motor housing or it may be affixed with any well known type of fastener.

Figure 4:
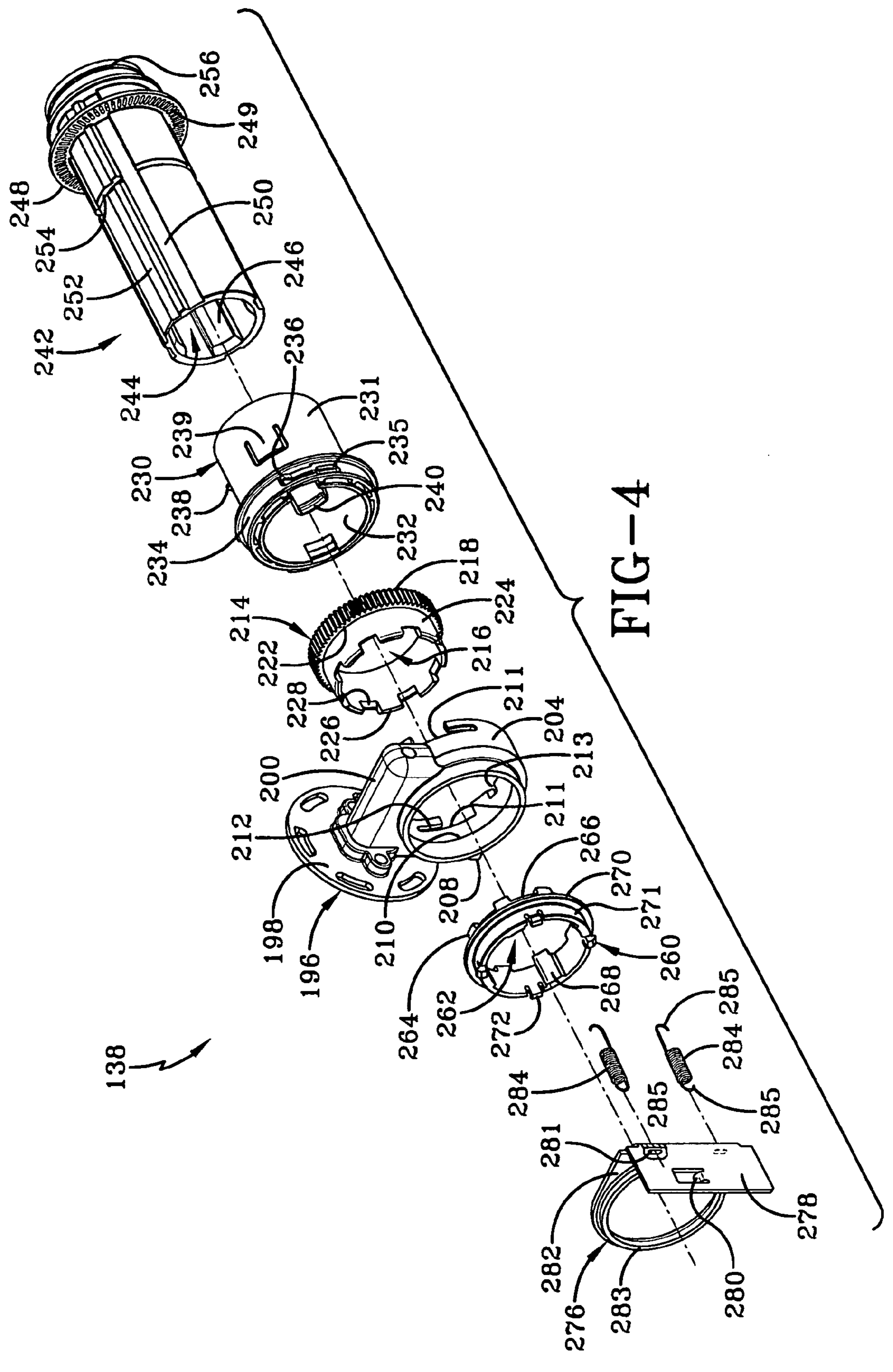
FIG. 4 is a front outside exploded perspective view of a drive assembly incorporated into the motorized operator of the present invention.

The drive assembly 138, which is best seen in FIG. 4, when assembled, fits mostly between the header flanges 152. Generally, the drive assembly transfers rotational forces of the motor drive shaft 184 to the counterbalance system 114. The drive assembly incorporates several major components the details of which can be seen in FIGS. 2 and 4.

A gear case housing designated generally by the numeral 196 includes a mount plate 198 which is secured to an end of the motor 180 from which the drive shaft extends. Axially extending from the mount plate 198 is a hollow cylindrical extension 200 that provides a shaft opening 202 which receives the drive shaft 184. Extending from one side of the cylindrical extension 200 is an open-ended cylindrical journal 204. The extension 200 also provides a worm gear opening 206 (best seen in FIG. 18A) which allows for a portion of the drive shaft 184 to extend into the open area defined by the cylindrical journal 204. A journal projection 208 extends outwardly from the cylindrical journal 204 in substantially the same direction as the mount plate 198. The journal 204 includes a radially in-turned flange 210. The journal 204 also includes a journal slot 211 that is open along one edge of the journal and that extends into a slot recess 212. Somewhat removed from the slot 212 on the same side of the journal 204 is a journal notch 213. It will be appreciated that more than one slot 212 and notch 213 may be provided by the journal.

A worm gear designated generally by the numeral 214 is received in the open-ended cylindrical journal 204 and in particular the gear 214 is rotatably received adjacent and retained by the radial in-turned flange 210. The worm gear 214 provides an opening 216 therethrough and radially provides a worm wheel 218 which is engaged by the shaft gear 186. The worm gear 214 provides an axial surface 222 which is rotatably and slidably received in the cylindrical journal 204. When assembled, it will be appreciated that the axial surface 222 abuts the flange 210 so as to allow for rotation of the gear 214. Extending from the axial surface 222 is a square tooth gear 224 which has a diameter somewhat reduced from the worm wheel 218, wherein the surface 222 is slidably retained by the flange 210. The square tooth gear 224 includes a plurality of circumferential teeth 226 which extend somewhat past the flange 210 when the gear 214 is received in the journal. The teeth 226 define circumferential recesses 228 therebetween.

A gear case cover designated generally by the numeral 230 is coupled to the gear case housing 196 so as to retain the worm gear 214 therebetween. The gear case cover 230 is a hollow tubular construction and provides a cover outer surface 231 opposite a cover inner surface 232. One end of the cover 230 provides a locking ring 234 which is coupled to the gear case housing 196. In particular, the locking ring 234 bears against the worm wheel 218 and allows for the worm gear 214 to freely rotate between the housing 196 and the cover 230. The locking ring includes an alignment tab 235 which is first axially received by the journal slot 211 and then rotatably received by the slot recess 212. The locking ring 234 further includes a deflection tab 236 which is received initially by the journal notch 213. With the worm gear 214 received in the gear case housing 196, the deflection tab 236 is received in the journal notch 213 and the alignment tab 235 is received in the journal slot 211. The gear case cover 230 is then rotated such that the deflection tab is deflected inwardly until it enters the journal slot 211. When the alignment tab 235 is received in the slot recess 212, the gear case cover 230 is locked into place. Radially extending from the outer surface 231 is a blocker tab 238 that is provided at a specific angular orientation with respect to the gear case housing 196. Accordingly, the specific rotational orientation of the motor assembly 136 can be monitored according to the position of the blocker tab 238. The gear case cover 230 further includes a pair of opposed sleeve tabs 239 which are axially displaced from the locking ring 234. Inwardly extending from each sleeve tab 239 into the opening defined by the inner surface 232 is a tab head 240.

An encoder sleeve 242 is received in the gear case housing 196, the worm gear 214, and the gear case cover 230. The encoder sleeve 242 is of a generally tubular construction and provides a sleeve opening 244 extending therethrough. The interior surface of the sleeve 242 includes a sleeve cam 246 which is engaged by the counterbalance tube 116. The sleeve cam 246 is sized so as to slidably receive the non-circular tube 116 but is configured such that the rotation of the sleeve 242 results in corresponding rotation of the tube 116. An encoder wheel 248 radially extends from the sleeve 242 wherein the wheel 248 provides a plurality of encoder slots 249. A predetermined number of slots are maintained by the encoder wheel 248 such that rotational movement of the sleeve 242 relates to rotational position of the tube 116 which correlates to the position of the door. The sleeve 242 provides a plurality of external sleeve splines 250. These splines extend from one end of the sleeve 242 toward the encoder wheel 248. Each of the splines 250 may provide a spline wall taper 252. The sleeve 242 further provides an exterior radial groove 254 which intersects the splines 250. When the sleeve 242 is inserted into the gear case cover 230, the radial groove 254 rotatably receives the tab heads 240. In other words, the sleeve tabs 239 are deflected by the outer surface of the encoder sleeve 242 until such time that the tab heads 240 return to their undeflected position at the radial groove 254. This allows the encoder sleeve 242 to rotate within the gear case cover 230, but not allow for axial movement of the sleeve 242 with respect to the cover. The sleeve 242 also provides a retention groove 256 at an end proximal the encoder wheel 248. When the drive assembly 138 is assembled, the encoder sleeve 242 slightly extends past one of the header bracket flanges 152 so as to allow receipt of the clip 158 which precludes axial movement of the encoder sleeve 242 and attached components with respect to the header bracket. Accordingly, with the encoder sleeve 242 assembled to the gear case cover 230 and the gear case housing 196, the end opposite of the encoder wheel 248 extends outwardly from the gear case housing 196.

A disconnect bearing 260 is slidably received upon the encoder sleeve 242 on a side of the gear case housing opposite the encoder wheel 248. The bearing 260 provides a bearing opening 262 which extends therethrough. The bearing 260 is primarily a ring construction and is engaged by the worm gear 214 and the sleeve 242. One end of the bearing 260 provides a plurality of circumferential bearing teeth 264 which have bearing recesses 266 therebetween. These teeth and recesses 264, 266 mesh with and are engaged by the recesses 228 and teeth 226 of the square tooth gear 224. The interior surface of the disconnect bearing 260 provides a plurality of internal bearing splines 268 which slidably mesh with the sleeve splines 250. In other words, the disconnect bearing 260 is slidably receivable on the encoder sleeve 242 and the splines 268, 250 are alignable such that the bearing teeth 264 mesh and engage with the square tooth gear 224. Axially extending from the disconnect bearing 260, in a direction opposite the teeth 264, is an external ridge 270 which provides a collar 271. A plurality of deflectable bracket tabs 272 extend from the collar 271.

An L-bracket, which is designated generally by the numeral 276, is slidably carried by the header bracket 128. The L-bracket 276 includes a slide plate 278 that provides a cable clip 280. Perpendicularly extending from the slide plate 278 is a ring 282. Formed at the interconnection of the plate 278 and the ring 282 are a pair of opposed spring catches 281 at the top and bottom edges. The catches 281 may be in the form of a notch along the respective edges or an opening slightly removed from the edges, or both a notch and an opening. A rim 283 axially extends from the ring 282 and has a somewhat smaller diameter. The disconnect bearing is attached to the L-bracket 276 wherein the bracket tabs 272 are inserted into and deflected by the rim 283. The tabs are then rotatably received by the ring 282 as they return to their undeflected state past the rim 283. In other words, the disconnect bearing is rotatably mountable on the ring 282 such that any rotation of the disconnect bearing 260 imparted by the worm wheel allows the disconnect bearing to likewise rotate. And slidable movement of the L-bracket imparts slidable movement of the disconnect bearing 260. The slide plate 278 is coupled to and slidably retained by the bracket slides 154. As such, the catches 281 are substantially aligned with the respective spring catches 159.

Two engagement springs 284 are mounted and retained by the base of the ring 282 at one end and at the header bracket motor stops 154 at an opposite end. In particular, each spring 284 has a hook end 285, wherein one hook end 285 is retained by the selected spring catch 281, and the opposite hook end is retained by the selected spring catch 159. The engagement springs 284 bias the disconnect bearing 260 into engagement with the worm gear 214. As will be discussed in further detail below, one end of the disconnect cable 122 has attached thereto a cable head 286 which is received in or secured to the cable clip 280. Any axial force applied to the disconnect cable 122 pulls on the slide plate 278 which in turn disengages the disconnect bearing from the worm gear. In the alternative, a coil spring may replace the springs 284, wherein the coil spring is disposed between the L-bracket 276 and the adjacent flange 152. This disconnect feature will be discussed in further detail in relation to FIGS. 17–20.

Figure 5:
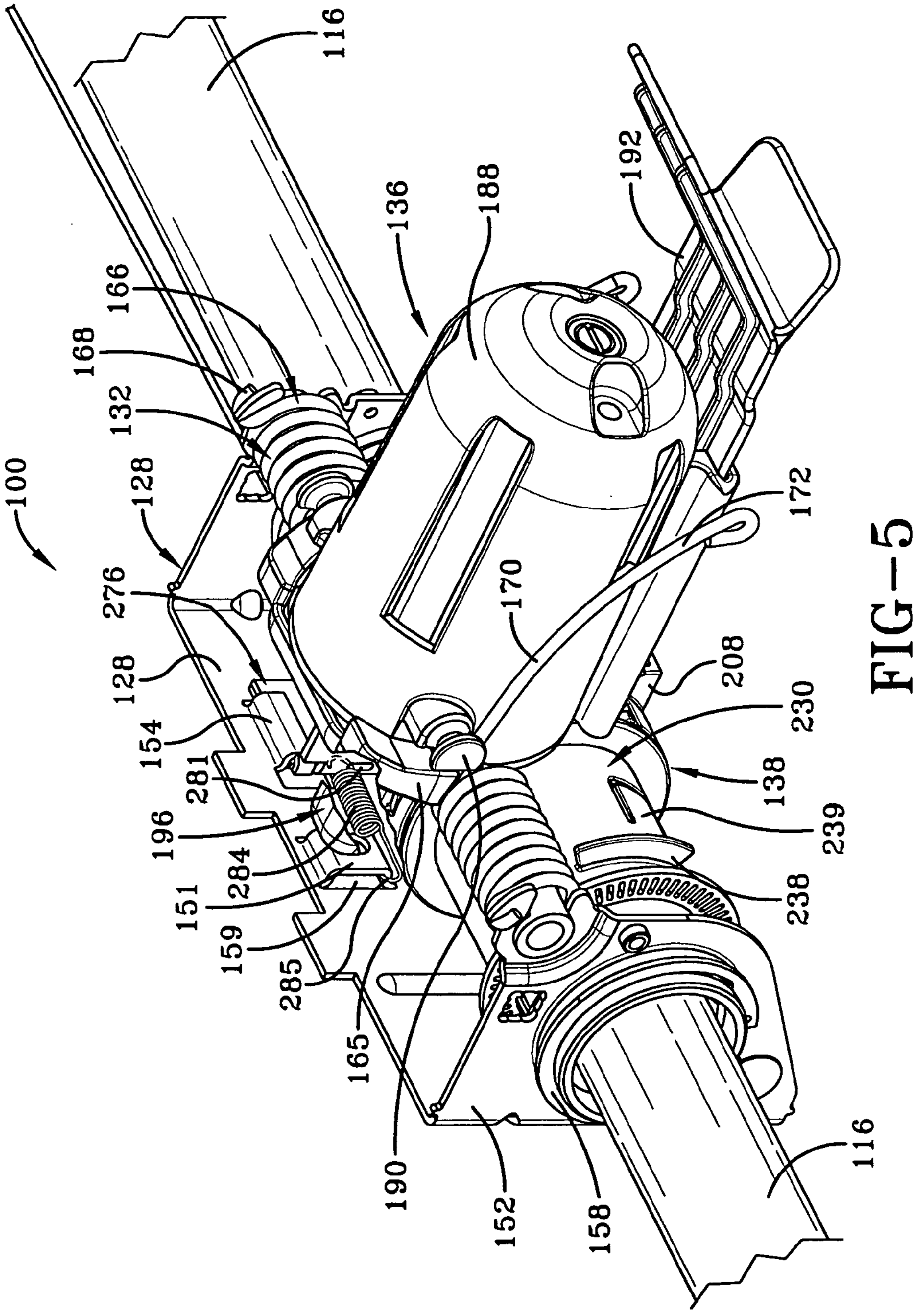
FIG. 5 is a top perspective view of the motorized operator with a housing removed so as to illustrate a bias assembly supporting a motor assembly of the motorized operator.

Referring now to FIG. 5 it can be seen that the drive assembly 138 is assembled and disposed primarily between the flanges 152 with the motor assembly 136 interconnected and maintained in an operating position by the bias assembly 132. When in the operating position, the motor assembly 136, in this particular embodiment, is substantially perpendicular with respect to the header bracket 128 such that the gear case housing 196 and in particular the cylindrical extension 200 is in close proximity to or abuts the upper most motor stop 151.

Figure 6:
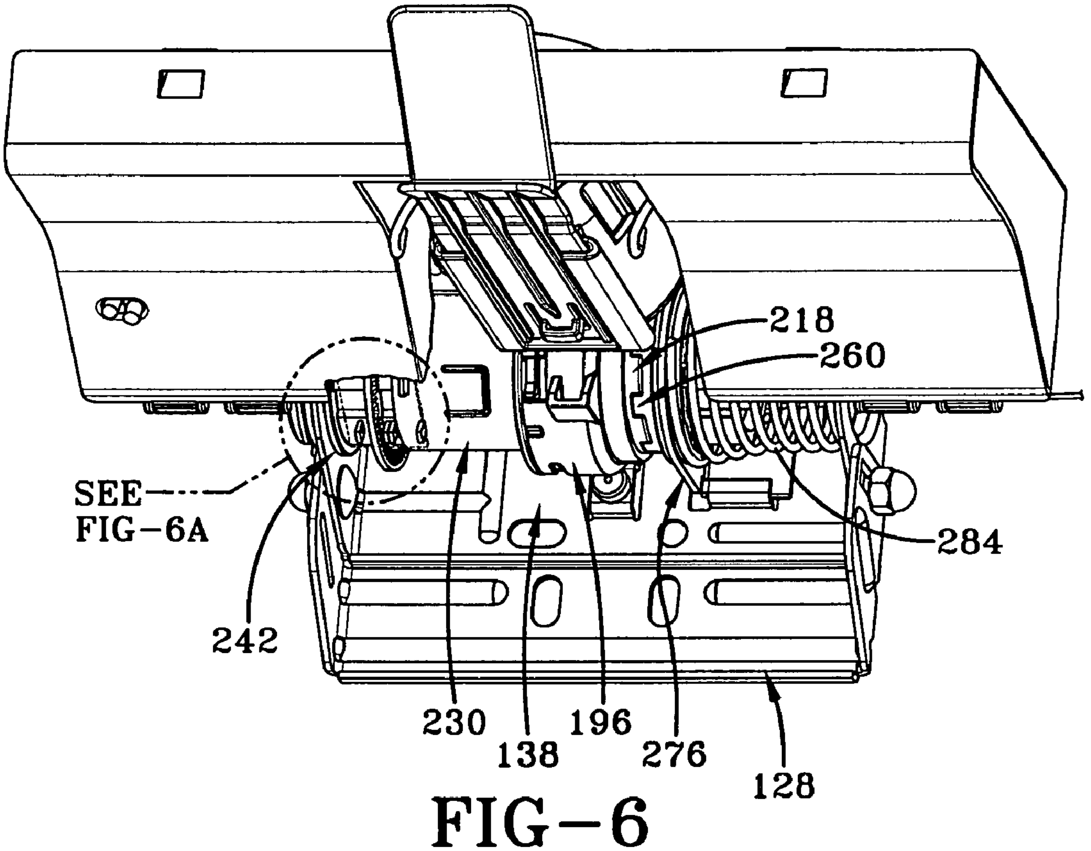
FIG. 6 is a perspective view showing the underside of the motor assembly and FIG. 6A is an enlarged view of particular components of the drive assembly including, but not limited to, a counting encoder and a compliance encoder.
Figure 6A:
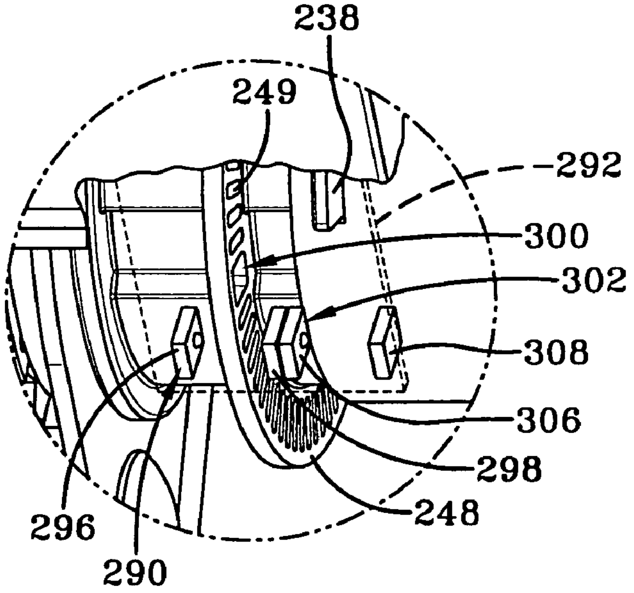

Referring now to FIGS. 6 and 6A, it can be seen that a counting encoder designated generally by the numeral 290 is carried by a circuit board 292 which maintains the control circuit 142. Mounted on one side of the encoder wheel 248 is a counting emitter 296 and on the other side a counting receiver 298. The emitter generates a light beam or other signal that is received by the receiver 298 and which is periodically interrupted by the encoder wheel 248 as it rotates through the light beam. As the encoder wheel rotates, the counting encoder 290 detects the light pulses generated and their corresponding timing sequence and a corresponding count signal is generated and sent to the control circuit 142. In other words, if the encoder wheel is rotating slowly, then more time for an emitter beam is allowed for the beam to pass through the slot 249 until blocked. In this manner, the rotational speed of the drive sleeve and as such of the counterbalance tube and, in turn, the door can be determined. The encoder wheel 248 further includes a directional slot 300 which is two adjacent slots 249 (or teeth) joined to one another. This is done by removing the material between two slots so as to create a single slot that has a longer or wider opening. Accordingly, whenever this longer directional pulse or non-pulse signal is detected, the control circuit is able to associate the encoder sleeve's rotational direction with a particular linear door direction. The number of pulses generated by rotation of the encoder wheel may also be used to determine position of the barrier relative to the position limits of the barrier. And, if desired, the pulse or non-pulse associated with the directional slot may also be used to determine or further confirm a relative position of the barrier with respect to the limits.

A compliance encoder 302 is also maintained by the circuit board 292. The compliance encoder 302 includes a compliance emitter 306 that generates a light beam or other signal which is received by a compliance receiver 308 which generates a compliance signal received by the control circuit 142. The blocker tab 238 is oriented such that it is in close proximity to the compliance encoder 302 but does not normally interfere with the emitter 306 when the motor assembly is in an operating position, that is, when the motor assembly is substantially perpendicular to the header bracket for this particular embodiment. As will be discussed in further detail, rotation of the motor assembly causes rotation of the blocker tab that blocks the light beam. Such an event is detected by the control circuit 142 for the purpose of taking corrective action and for detecting motor pivot speed and position when the motor moves to a closed (locked) position.

In operation, opening and closing limit positions are set during installation of the door. Simultaneous with establishment of the door positions, a door operating profile is also established. This door profile may consist of monitored variables, which if exceeded during operation result in corrective action being taken by the operator system. The position limits and door profile may be established by conventional means or by methodologies described herein such as set forth in FIGS. 30–31. The operator system disclosed herein operates in an open-loop configuration. In other words, the motor does not drive the door downwardly in a closing direction although the system could be configured to operate in a closed-loop environment where a closing force is exerted by the motor. In any event, in an open-loop control environment the motor is energized to control the closing rate of the barrier. Once the limits and the door profile have been established and the door is in an open position, the motor assembly is oriented substantially perpendicular to the header, and the counterbalance system supports the weight of the door in the tracks. When a command signal is received in the control circuit to close the door, the motor assembly is energized to counteract any upward forces exerted by the door through the counterbalance system. These mechanical forces are transmitted from the motor drive shaft 186 to the worm wheel 214 which are in turn transmitted to the disconnect bearing 260. The splines of the disconnect bearing transmit the motor force so as to rotate the drive sleeve 242 which in turn rotates the counterbalance tube 116. During the movement cycle—open or close—the control circuit receives input from any number of sensors for the purpose of indicating primary obstruction detection. These sensed variables include, but are not limited to motor current, the speed of the encoder sleeve as determined by the encoder wheel, motor speed as determined by a commutator sensor and the use of an internal timer associated with the control circuit. Any one or combination of these variables are monitored and then compared to the door profile. If these variables exceed the door profile parameters, then the motor is stopped and corrective action is taken.

The control circuit 142 may also receive secondary entrapment input such as from photo eyes or other devices. In the present embodiment, the operating system eliminates the need for other secondary components by utilizing the compliance springs of the biasing assembly and the blocker tab associated with the encoder sleeve. Accordingly, if an obstruction force is applied to the door as it travels downwardly and this obstruction force exceeds a predetermined amount, such as 15 pounds, the torque generated by the motor drive shaft overcomes the supporting forces exerted by the bias assembly which results in the motor assembly pivoting downward. When this occurs, the gear case cover also pivots downwardly and the blocker tab interferes with the beam of light generated by the compliance encoder 302. In other words, the beam generated by the compliance emitter is blocked and the compliance receiver 308 generates an appropriate indicator signal that is sent to the control circuit. When the signal is received by the control circuit, the motor is stopped and corrective action is taken. As such, it will be appreciated that the compliance springs or bias assembly prevents motor assembly rotation during normal unobstructed operation and is positioned to pivot on a different axis than the motor. And the bias assembly is configured such that the biasing force lessens in a non-linear manner as the motor pivots during obstruction detection or locking of the door or barrier. It is known that the inertia of accelerating different weight doors is not the same such that if the bias assembly is used to keep the operator motor in the operational position during closing of the barrier and has a sensitivity to allow the motor to pivot at a predetermined amount of torque, then there must be some type of adjustment for the biasing member's tension or it may require a plurality of biasing members to match the door's inertia. It has been determined that different weights of a door can be separated into three major categories in that the same biasing member could be used for different weight doors by changing the point where the biasing member supports the operator motor. These plurality of position points depend on the weight range of the barriers or doors and where the operator is intended to be used. It is further desirable to have the end of the biasing member that is not in contact with the motor post to be angularly adjustable such that "fine tuning" of the instant of the motor rotation is possible. This is done by selecting an appropriate radius of curvature for the transition section in consideration of the post's position with respect to the motor housing.

Figure 7:
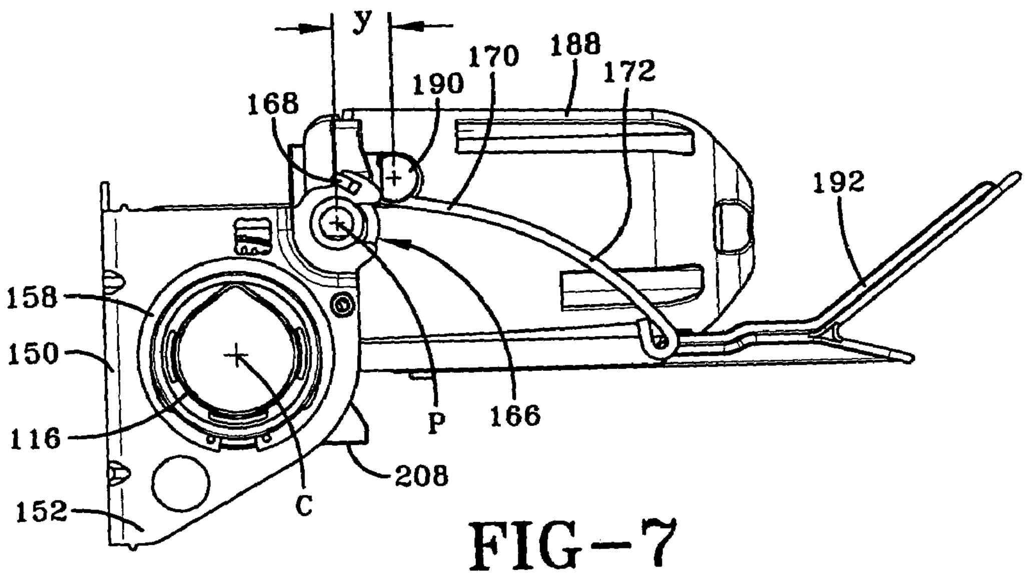
FIG. 7 is a side elevational view of the operator system showing the motor assembly in an operating position.
Figure 8:
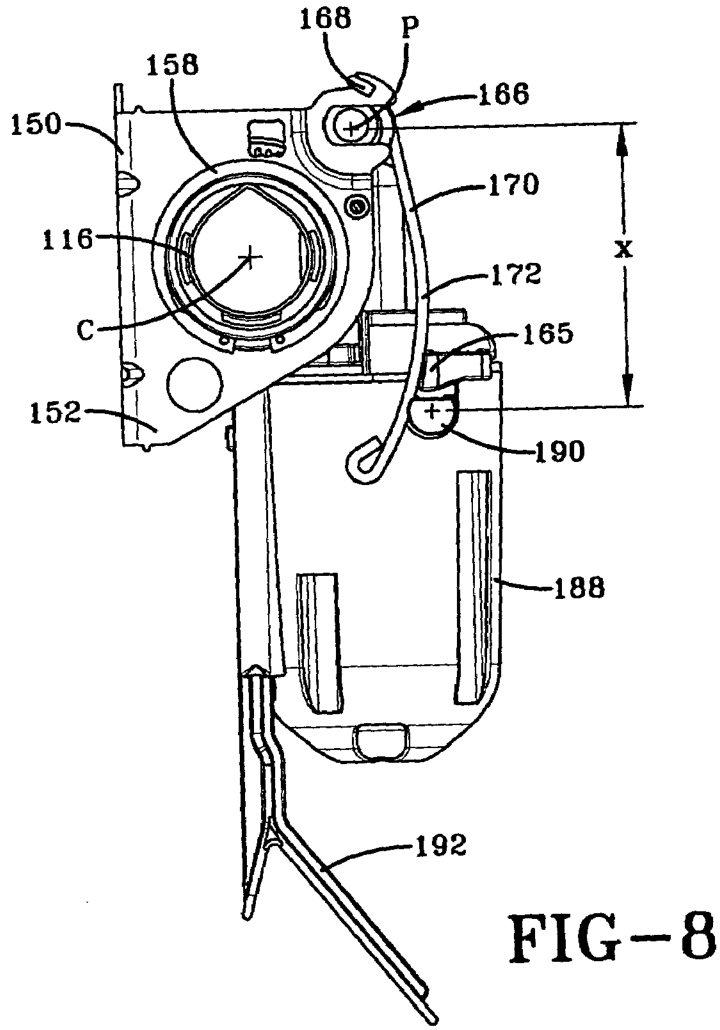
FIG. 8 is a side elevational view of the operator system showing the motor assembly in a barrier locking position.

FIGS. 7 and 8 show the relationship between the compliance spring's mounting perch, designated by the capital letter P, and the center of the rotation of the motor designated by the capital letter C. This is necessary to allow the distance from the center of rotation and the point where the compliance springs contact the motor—at post 190—to become greater such that the leverage that the motor exerts against the compliance springs becomes greater to negate the force from the compliance springs as the motor pivots. This allows the use of stronger than necessary springs, but still allowing them to be sensitive enough to sense an obstruction. Further, the compliance springs can be shaped obliquely beyond the point of contact with the motor by use of the transition section 172 to further reduce the tension of the springs once the motor has pivoted. The pivot point P for the biasing member must be above and away from the pivoting axis C of the motor to achieve sufficient reduction of the torsional force from the biasing member. The further away the two points P and C are from each other, the greater the force reduction. For example, the pivot point of the biasing member P should be located away from the pivoting axis of the operator motor C such that the distance X in FIG. 8 is 5 to 6 times greater than the distance Y in FIG. 7. It is further helpful to gain additional advantage over the biasing member by configuring the transition section 172 just beyond the contact point at post 190 to an angle from 15 degrees to 45 degrees. The operating system 100 will also perform the proper function with constant pressure or tension biasing members and will not require the spaced apart pivot centers P and C. However, a slight holding force would be required to hold the motor in the operational position during the closing of the door to prevent the motor from partially pivoting during the varying load the motor experiences during the normal closing cycle.

Figure 9C:
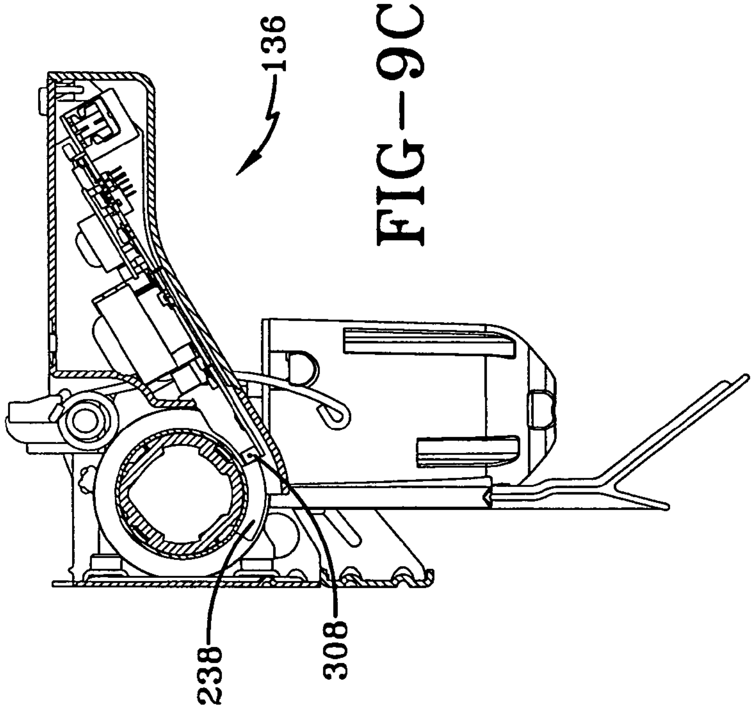
Figure 9A:
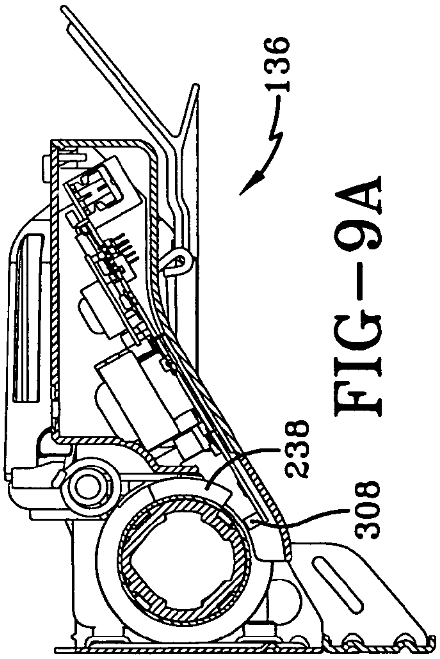
Figure 9B:
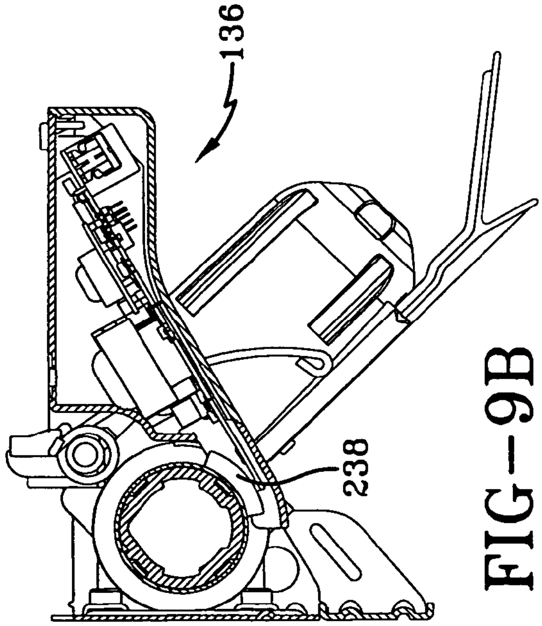
Figure 10:
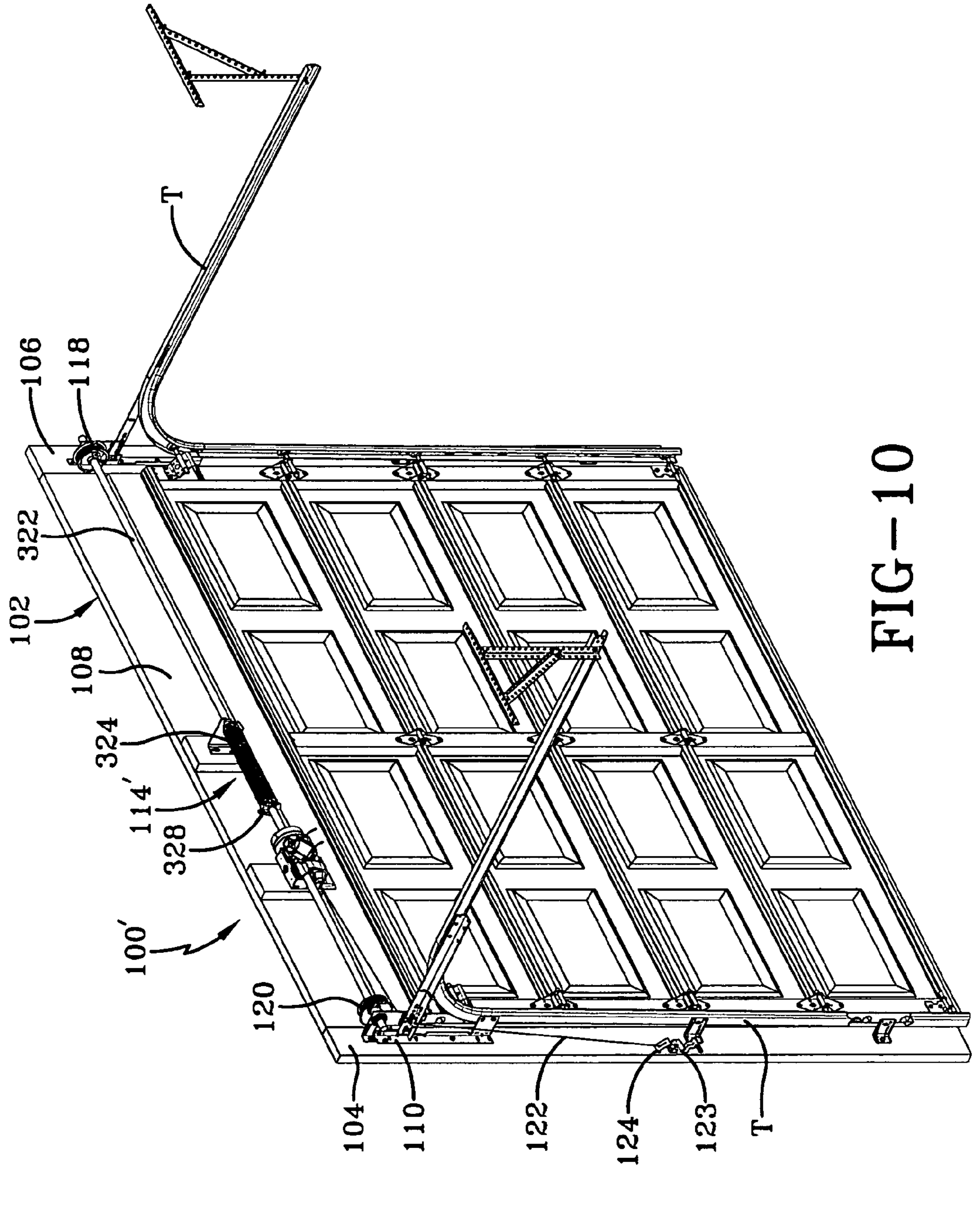
FIG. 10 is a rear perspective view of a sectional overhead garage door installation showing an alternative motorized operator system according to the concepts of the present invention installed in operative relation thereto, with the operator depicted in an operating position.
Figure 11:
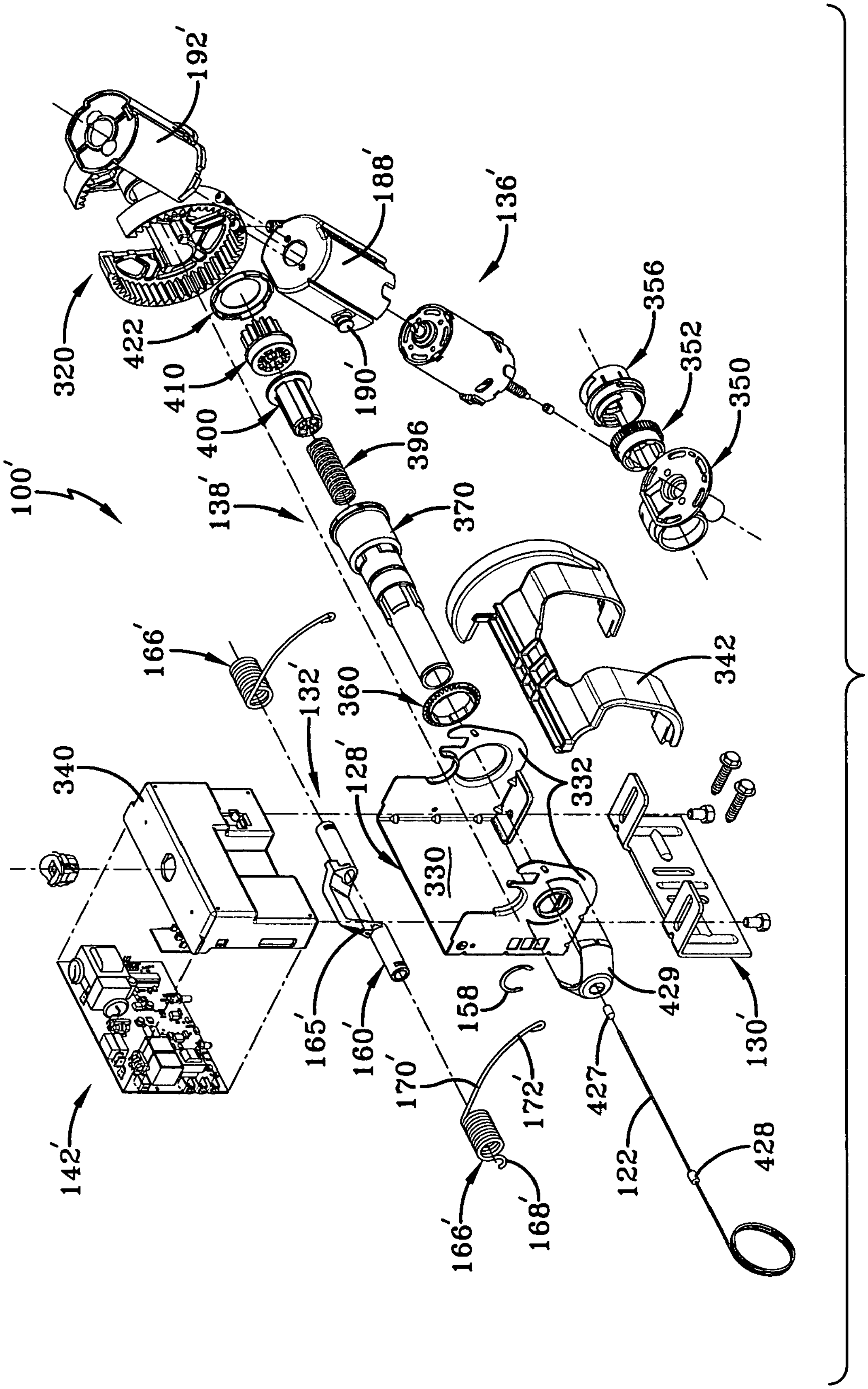
FIG. 11 is an exploded perspective view of the alternative motorized operator system.
Figure 12:
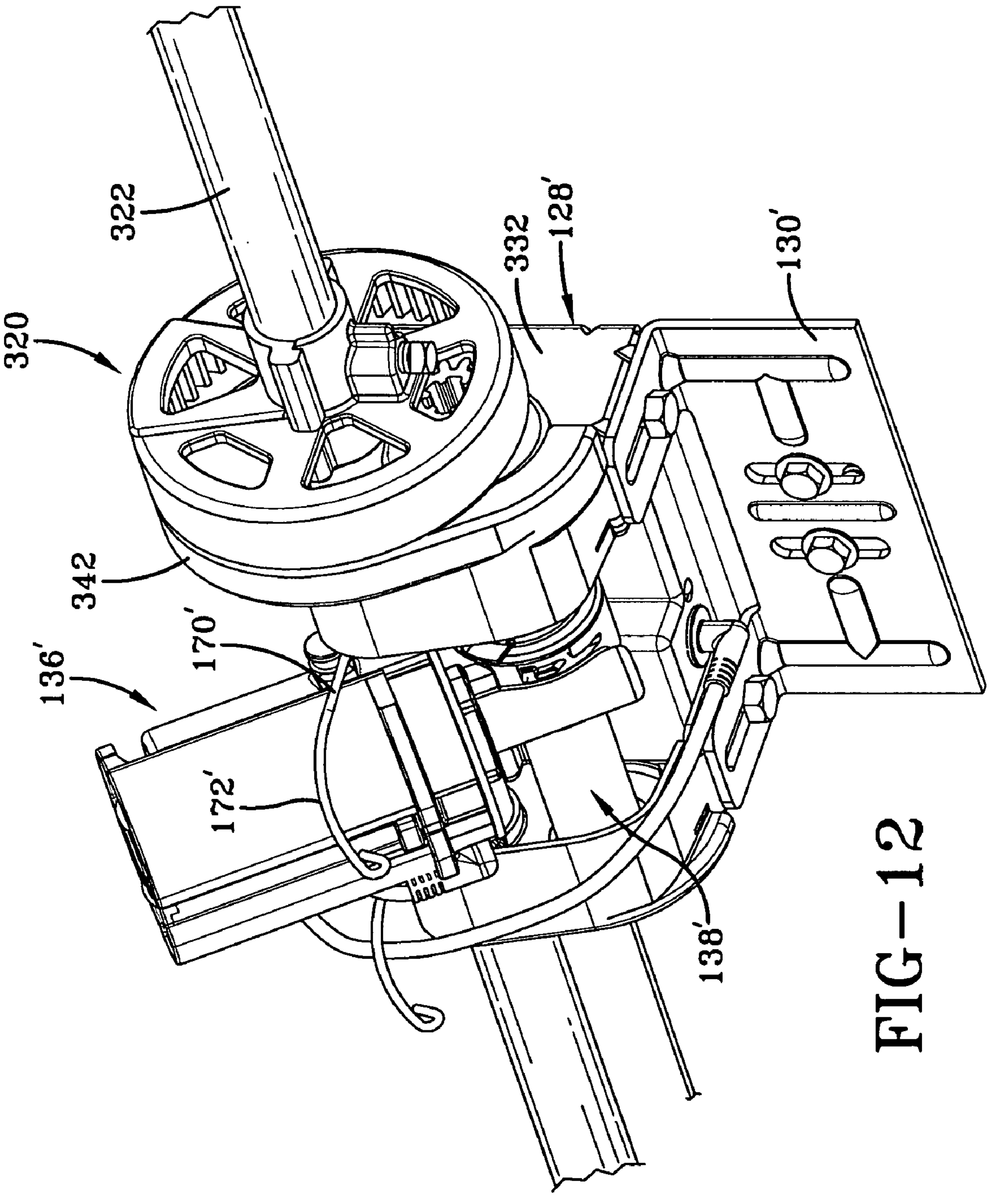
FIG. 12 is a perspective view of an underside of the alternative motorized operator system with the motor assembly shown in an operating position.
Figure 13:
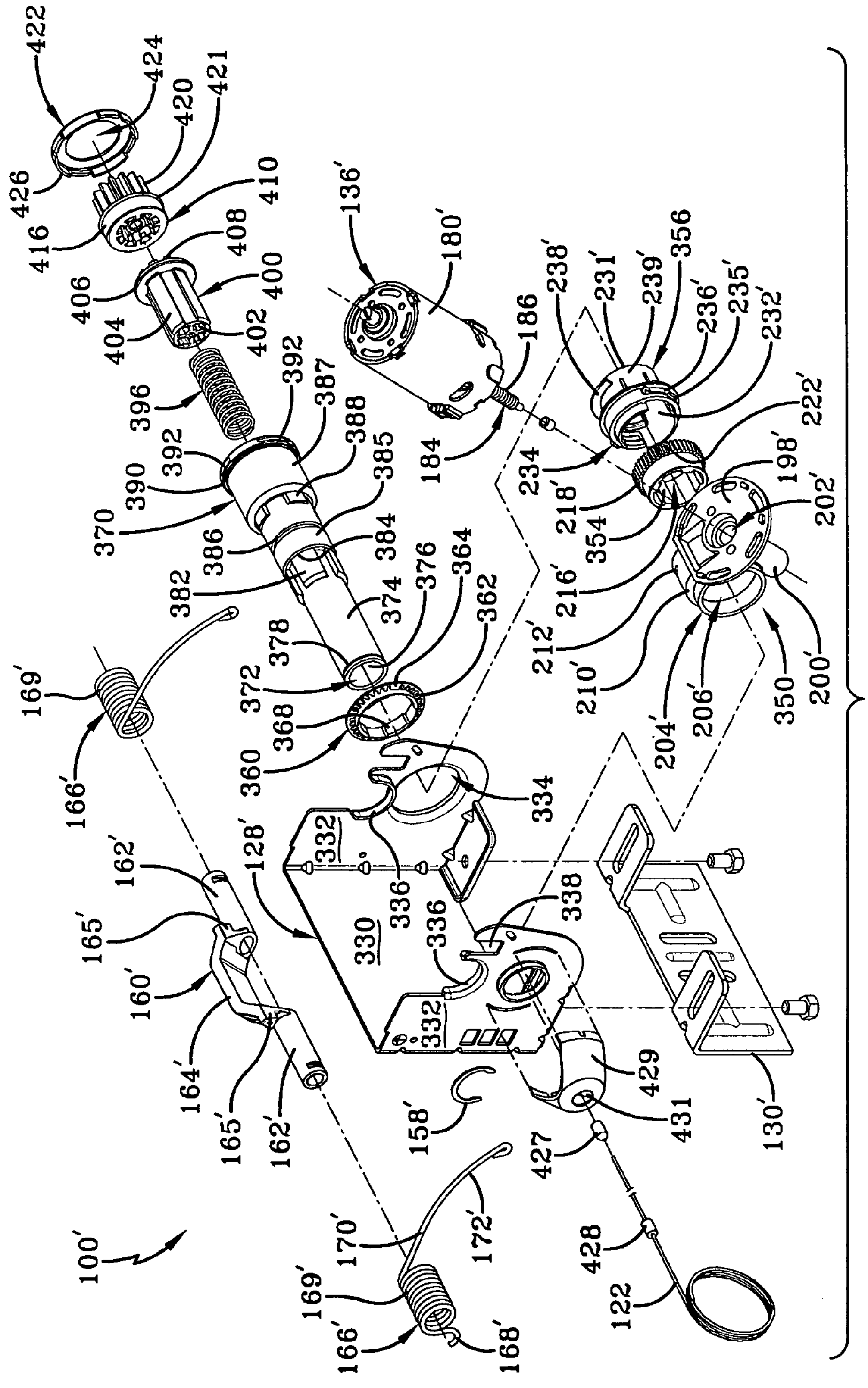
FIG. 13 is an enlarged rear exploded perspective view of an alternative drive assembly incorporated into the alternative motorized operator system.

FIGS. 9A–C respectively show the operational position, obstructed position and barrier locked position of the motor assembly. As can be seen in the obstructed position (FIG. 9B), when an obstruction force overcomes the bias assembly forces, the blocker tab 238 interrupts the light beam of the emitter 308 of the compliance encoder as seen in FIG. 6A, but not in the barrier locked position (FIG. 9C). As a result, the control circuit 142 receives an interrupt signal from the compliance encoder, which serves as indication of an obstruction, and commands the motor to stop rotation of the counterbalance tube and thus the door. In the close limit door position, the blocker tab function changes from obstruction indication to motor pivot position and speed indication. A trailing edge of the blocker tab 238 will rotate beyond the emitter light beam as the motor continues to pivot, re-establishing emitter detection to signal the barrier lock motor position. Measuring the time period from blocking tab leading edge detection to trailing edge detection enables determination of motor pivot speed. Accordingly, the motor control can vary the power level applied to the motor to maintain desired pivot speed to avoid loud impact of the motor against the stops and the mechanical and electrical wear associated with sudden stops. Other appropriate correction action may then be taken. As the door closes, if the door position is determined to be one inch or less from the close limit or the floor, then signals received by the control circuit in regard to the door slowing or not matching the door profile, or by the obstruction or blocker tab interfering with operation of the compliance encoder are ignored and the door stops at the predetermined close limit position. Upon receipt of a door open command, the motor rotates or pivots upwardly and drives the torque tube in the appropriate direction. The control circuit continues to monitor the variables with an established up profile and stops movement of the door if one of the variables of the operator profile are exceeded.

Another way for counting the rotations of the counterbalance system is to monitor the energizing and collapsing of the armature fields in a permanent magnet motor and sending that count to the microprocessor maintained by the control circuit. To accomplish this, the armature commutator must have at least 8 segments, if the motor is gear reduced from the drive, to provide sufficient counts to the controller. This embodiment may replace the function of the encoder wheel, but use of the compliance encoder is still required.

During installation of the operator system, the profile routine is established by first setting the barrier in the closed position. The initial signal to the control circuit sends the barrier to the fully open stalled position and a count is recorded by use of the encoder wheel or like device and stored during this movement. The next activation command causes the barrier to close and the count is reversed to approximate the last inch of travel at which point the control circuit uses the blocked signal to control the motor pivot position and speed to the barrier locked position. Upon the next open activation, the control circuit stops the barrier prior to the initial stall point to prevent wear deterioration of the barrier. During these initial upward and closing movements, door profiles are established.

Referring now to FIGS. 10–16, an alternate embodiment of the operator system is shown and designated generally by the numeral 100'. This embodiment also utilizes a compliance spring bias assembly, a compliance encoder and blocker tab, and functions in much the same way as the embodiment shown in FIGS. 1–9 and described. One difference in this embodiment is that the motor drives a transfer gear which is geared to rotate the counterbalance tube. Accordingly, the appropriate drive gears associated with the motor are modified to accommodate this change. As this discussion proceeds, and if appropriate, it will be appreciated that components similar to those in the embodiment shown in FIGS. 1–9 are given the same number but with a ' designation. Some components are given the same identifying numeral if they are substantially equivalent components.

The operator system 100' is used mostly in modifying existing counterbalance systems. Accordingly, components 102–120, the door and the tracks, are the same as shown in FIG. 1. The operator system 100' employs a header bracket 128' which includes the header portion 150', the header flanges 152', the apertures 154', the slots 156' and a clip 158'. A support bracket 130' is utilized to support the components of the operator system and the header bracket 128'. The major components of this operator system 100' include a bias assembly 132', a motor assembly 136', and a drive assembly 138'.

The operator system 100' includes a transfer assembly designated generally by the numeral 320 which functions to transfer the drive forces from the drive assembly 138' to a counterbalance tube 322. In this embodiment, it is envisioned that the counterbalance tube or torque tube is a round construction wherein the torsion springs are carried about the exterior of the tube. In particular, the tube 322 receives a torsion spring 324. A mounted torsion spring bracket 326 extends from the header 108 and secures one end of the torsion spring 324 while a fastening assembly 328 mounts the other end of the torsion spring to the drive tube 322.

The header bracket 128' includes a header portion 330 which is mounted flush or adjacent the header. Extending substantially perpendicular from the header portion 330 are a pair of opposed header flanges 332 each of which has an aperture 334 extending therethrough and which are substantially aligned with one another. The apertures 334 receive and carry the drive assembly 138'. Each flange 332 provides a tube cradle 336 which is aligned with the other and which rotatably carries the drive tube 322. The header flanges 332 also provide bias notches 338 which are somewhat removed from the tube cradle 336 and are aligned in such a manner to carry the bias assembly 132'. A bracket cover 340 encloses a control circuit 142' and allows for receipt of power and other wired connections to enable operation of the operator system 100'. A housing cover 342 is also coupled to at least a portion of the header portion 330 and header flanges 332 to enclose components of the operator system.

The bias assembly 132' includes a yoke 160' which has opposed yoke ends 162'. A buckle 164' is interposed between the ends 162'. A compliance spring 166' is received on each of the yoke ends 162' wherein a compliance spring end 168' is secured to the header flange 132' about the bias notch 338. An elongated torsion spring section 169' is wound about each end 162' and from which extends an elongated section 170' and from which further extends a transition section 172'. With the springs 166' received on the yoke ends, the yoke 160' is mounted in the bias notches.

The motor assembly 136' includes a motor 180' from which axially extends a rotatable drive shaft 184'. The shaft gear 186' is provided on the drive shaft 184'. A motor housing 188' encloses the motor 180' wherein a pair of opposed posts 190' extend from either side of the housing 188'. These posts 190' are supported by the sections 170' and 172' of the compliance springs when the motor assembly is assembled the installed drive assembly 138'. A door arm 192' extends from the motor housing 188' and is configured to be positioned slightly above the top of the door when the door is in the closed position. Any manual upward movement of the door is blocked by the door arm 192' when the motor assembly is pivoted to a closed position.

A gear case housing 350 is configured so as to be attachable to the motor assembly 136'. The gear case housing 350 includes a mount plate 198' that is secured to the motor 180'. A hollow cylindrical extension 200' extends from the motor plate 198' and provides a shaft opening 202' that receives the drive shaft 184'. An open-ended cylindrical journal 204' extends perpendicularly from the mount plate 198' and the extension 200' and has a worm gear opening 206' extending therethrough. The journal 204' further includes a radially in-turned flange 210'. At an exposed edge opposite the flange 210', the journal 204' provides a journal slot 211' that extends into a slot recess 212', and a spaced apart journal notch 213'. It will be appreciated that one slot or notch may be provided or multiple slots or notches 212', 213' may be provided in the journal 214'.

A worm gear 352 has an opening 216' therethrough and is received in the cylindrical journal 204'. The worm gear 352 includes a worm wheel 218' which partially extends into the worm gear opening 206'. The worm gear 352 provides an axial surface 222' which is positioned adjacent the flange 210' and may come in slidable contact therewith. A plurality of internal worm splines 354 define the opening 216'.

A gear case cover designated generally by the numeral 356 is secured to the gear case housing 350 with the worm gear 352 rotatably received therebetween. The gear case cover 356 includes a cover outer surface 231' opposite a cover inner surface 232'. The cover 356 includes a locking ring 234' at one end wherein the locking ring includes at least one alignment tab 235' and at least one deflection tab 236'. In much the same manner as in the previous embodiment, the locking ring 234' is secured to the gear case housing 350 such that rotation or movement of the gear case housing 350 causes the same type of rotation movement in the gear case cover 356. In particular, the alignment tab 235' is initially received in the journal slot 211' while the deflection tab 236' is initially received in the journal notch 213'. Rotation of the gear case cover 356 deflects the deflection tab until such time that the deflection tab 236' is rotated into the slot recess 211' and is undeflected. As this rotation occurs, the alignment tab 235' is received further into the slot recess 212' and as such the gear case cover 356 is locked into place with the gear case housing 350. The gear case cover 356 also includes a blocker tab 238' which is associated with the compliance encoder in a manner which will be described. The gear case cover 356 also includes a pair of sleeve tabs 239' each of which has an inward tab head 240'. Accordingly, the sleeve tab 239' can be deflected outwardly as will be described.

An encoder wheel designated generally by the numeral 360 includes a plurality of radial slots 362 around the outer periphery thereof. A pair of adjacent slots may be modified so as to form an enlarged directional slot 364 or enlarged tooth which allows for synchronization of the drive assembly and door directional indication with respect to the limit positions. The encoder wheel 360 has an opening therethrough which is formed by a plurality of encoder splines 368.

The drive sleeve, which is designated generally by the numeral 370, is of a generally tubular construction and effectively replaces the encoder sleeve of the previous embodiment. The drive sleeve 370 has a drive sleeve opening 372 which extends all the way therethrough. The sleeve 370 includes an outer surface 374 opposite an inner surface 376. One end of the sleeve 370 has a reduced diameter which is received into and through the respective openings of the gear case housing 350, the worm gear 352 and the gear case cover 356. The reduced diameter end has a radial retention groove 378 disposed about the outer surface 374 wherein this end extends through one of the flanges 332 and the aperture 334. A tension clip 158' is received in the groove 378 so as to axially retain the drive assembly in the header bracket. The outer surface 374, somewhat removed from the reduced diameter end, provides a plurality of radially extending external sleeve splines 382. These splines 382 are configured so as to mesh and mate with the internal worm splines 354 of the worm gear 352. Accordingly, rotation of the worm gear 352 results in rotation of the drive sleeve 370. A sleeve ledge 384 radially extends from the outer surface 374 and from an end of each of the splines 382, wherein the sleeve ledge abuts or is adjacent to a facing side of the worm gear. The outer surface 374 provides a radially enlarged external surface 385 which extends from the ledge 384 to a gear cup surface 387. Somewhat displaced from the sleeve ledge 384 and provided about the external surface 385 is a gear case groove 386 which receives the tab heads 240. When the drive sleeve 370 is assembled within the gear case cover 356, the drive sleeve is able to freely rotate in the cover but is axially restrained by the tab heads. Extending between the gear cup surface 387 and the sleeve ledge 384 are a plurality of external wheel splines 388 which mesh with the encoder splines 368. Accordingly, as the sleeve 370 is rotated the encoder wheel likewise rotates. It will be appreciated that the encoder wheel 360 is assembled to the drive sleeve 370 prior to assembly of the sleeve to the gear case housing 350, the gear case cover 356 and the worm gear 352. As in the previous embodiment, the tab heads 240' are deflected by the external surface 385 until they are received and become undeflected at the groove 386. At the end of the drive sleeve 370, opposite the radial retention groove 378, the gear cup surface 387 terminates at a drive sleeve rim 390 which has a plurality of rim slots 392 radially disposed thereabout. Received within the drive sleeve 370 is an engagement spring 396 which is retained at one end by an internal wall extending partially radially inwardly from the inner surface 376.

A disconnect sleeve designated generally by the numeral 400 is slidably received in the opening 372 at the gear cup end and is allowed to move axially within the drive sleeve. The sleeve 400 has a disconnect sleeve opening 402 extending therethrough and has a plurality of radially extending drive splines 404. As will be discussed in further detail, the drive splines 404 are engaged by spline surfaces maintained on the inner surface 376 such that rotatable movement of the drive sleeve is transferred to the disconnect sleeve 400. The disconnect sleeve 400 at one end provides a lip 406 which radially extends from one end thereof. Axially extending from the lip 406 are a plurality of peripherally arranged disconnect cogs 408.

A drive gear 410 is rotatably received in the drive sleeve opening and in particular in the gear cup area defined by the gear cup surface 387. The drive gear 410 has a drive gear opening extending completely therethrough. One end of the drive gear 410 provides a drive gear disc 416 which is mostly received in the disconnect sleeve opening 402. The drive gear disc 416 has a plurality of peripherally arranged cog receptacles 418 which slidably receive the disconnect cogs 408. When the disconnect sleeve 400 engages with the drive gear 410, rotation of the drive sleeve 370 results in like rotation of the drive gear. Axially extending from the drive gear disc 416 are a plurality of radial drive gear teeth 420. The disc 416 may be provided with a taper or ramp surface 421 that is rotatably received by a corresponding internal gear cup curface that precludes inward axial movement.

A lock ring cap designated generally by the numeral 422 rotatably retains the drive gear 410 in the drive sleeve 470. The lock ring cap 422 has a cap opening 424 extending therethrough and a plurality of radially extending retention fingers 426 which are received in the rim slots 392. Accordingly, when the cap 422 is secured to the end of the drive sleeve, the drive gear 410 is rotatable therein. Moreover, with the engagement spring 396 received within the drive sleeve, the disconnect sleeve 400 meshes with the drive gear 410 and in particular, the disconnect cogs 408 are received in the cog receptacles 418. As the drive shaft 184 is rotated, the worm gear 352 is rotated which in turn rotates the drive sleeve 370 as a result of the splines 354 meshing with the splines 382. Accordingly, the encoder wheel 360 rotates as the drive shaft 370 rotates. And in view of the connection of the disconnect sleeve 400, in particular the drive splines 404 meshing with the internal splines maintained by the drive sleeve 370, the disconnect sleeve 400 is likewise rotated which in turn rotates the drive gear 410.

The disconnect cable 122 is received through the various openings of the components that comprise the drive assembly 138'. Briefly, the disconnect cable is fed through the openings and the spring 396, and a slug 427 is attached at the distal end of the cable 122. A tamper guard or tamper slug 428 is also attached at a distance somewhat removed from the slug 427. The slug 427 is retained by the disconnect sleeve 400. As such, the sleeve 400 is allowed to rotate about the slug but when an axial force is applied by the handle 123, the disconnect sleeve 400 disengages from the drive gear 410 by disconnecting or disengaging the cogs 408 from the receptacles 418. When the applied axial force on the disconnect cable is released, the spring 396 re-exerts a biasing force upon the sleeve 400 so that it re-engages the drive gear 410.

A guard 429 is mounted to an external outwardly facing side of one flange 332 and about the aperture 334 wherein the guard has a guard opening 431 therethrough to allow for passage of the disconnect cable. The tamper slug 428 is positioned with respect to the guard so that only an axial force applied by the cable 122 will be transmitted to the disconnect sleeve 400.

Figure 14:
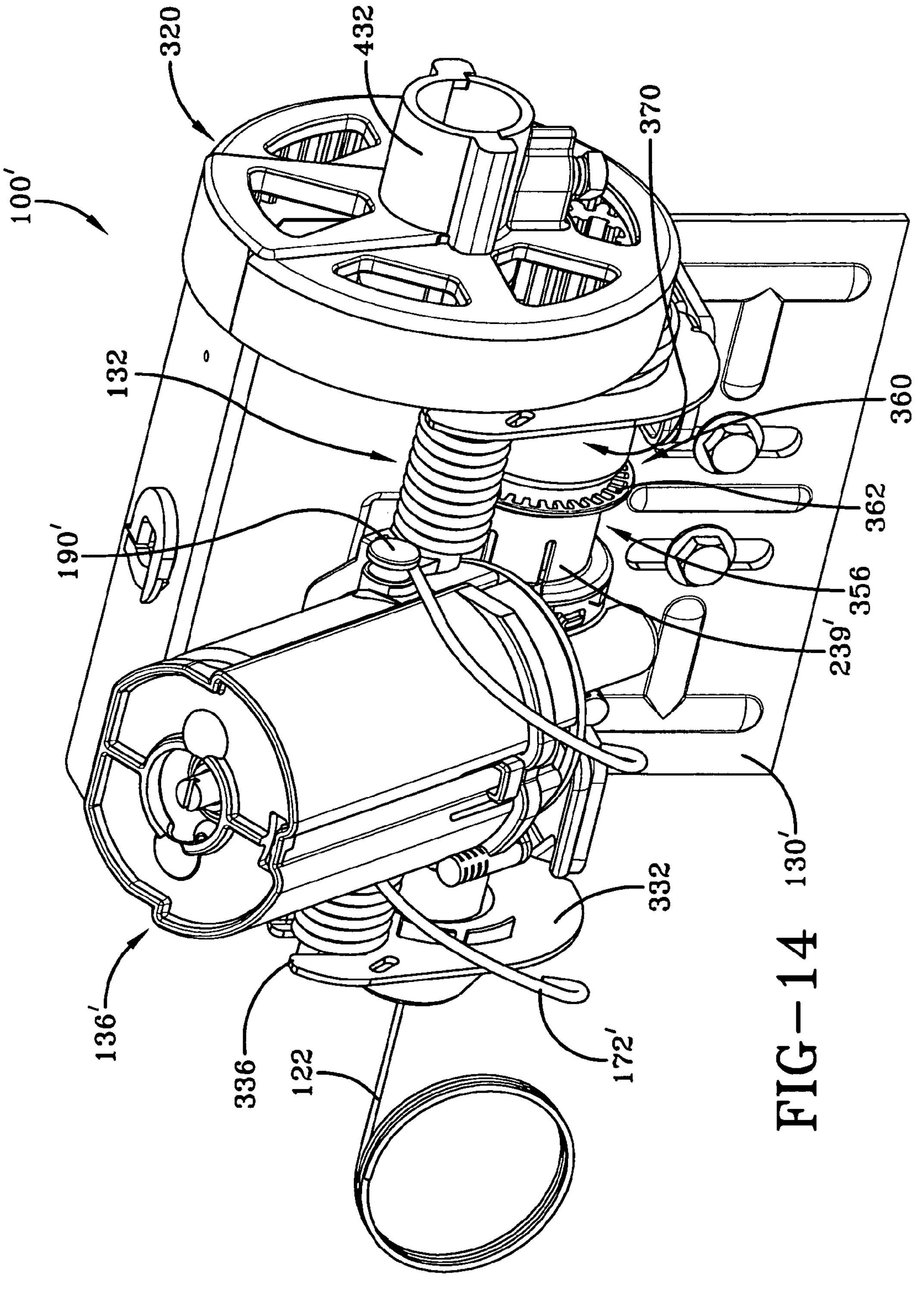
FIG. 14 is a top right perspective view of the alternative motorized operator system with a housing removed so as to illustrate a bias alternative assembly supporting a motor assembly.
Figure 15:
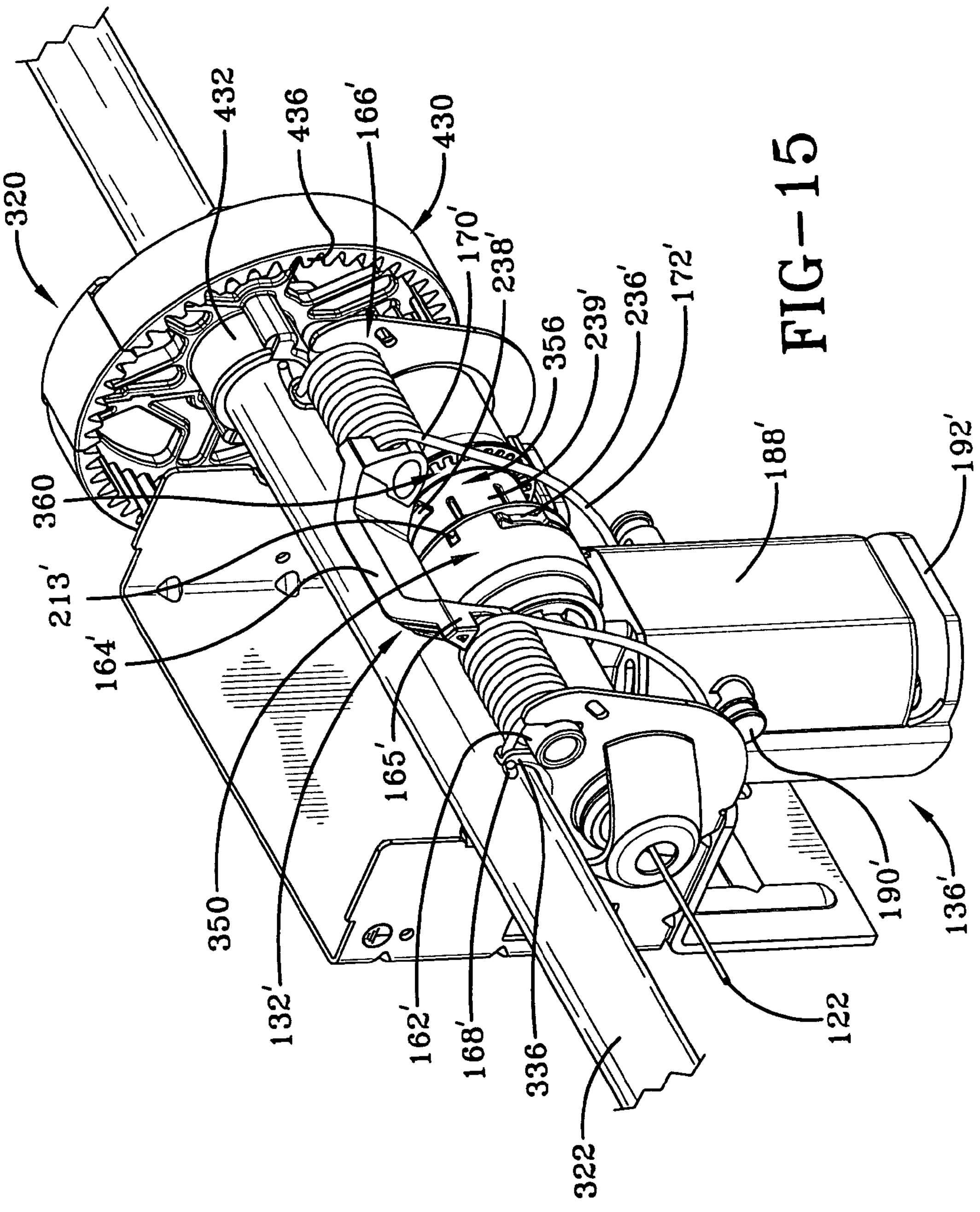
FIG. 15 is a perspective view showing the top left of the alternative motor assembly and, in particular, components of a drive assembly.

Referring now to FIGS. 14 and 15, it can be seen that the assembled drive assembly 136' is carried between the flanges such that the drive gear 410 extends past or through one of the apertures 334. Accordingly, the drive gear 410 engages the transfer assembly 320. The transfer assembly 320 includes a driven gear designated generally by the numeral 430 which is connected to the drive tube 322 by a tube connector 432. The driven gear 430 includes a plurality of driven gear teeth which mesh with the drive gear teeth 420. Accordingly, as the drive gear 420 is rotated, the transfer assembly is rotated, which in turn rotates the drive tube 322 for the raising and lowering of the attached door.

The operator system 100' operates in much the same manner as the operator system 100 shown in FIGS. 1–9 except for the use of the transfer assembly 320. Rotation or energization of the motor assembly 136' results in rotation of the drive sleeve 370 which in turn rotates the transfer assembly 320 and thus raises and lowers the door. The biasing assembly 132' supports the motor assembly in much the same manner and if an obstruction force is exerted upon the door which overcomes the forces of the compliance springs, then the motor rotates into an obstructed position as best seen in FIGS. 16A–C and in particular FIG. 16-B. The angular configuration of the motor assembly is somewhat different than in the previous embodiment so as to allow for clearance of the drive tube. However, it will be appreciated that the offset pivoting of the compliance spring with respect to the motor is maintained so as to allow for the immediate non-linear reduction of the biasing force once the biasing force is overcome. In other words, as soon as the biasing force is overcome and the posts are supported by the transition sections 172'; the biasing force supporting the motor assembly rapidly drops. It is envisioned that the profiling of the door movement, the setting of limit positions and the overall obstruction force operation for this embodiment is much the same as in the previous embodiment. Accordingly, all the benefits and features of the previous embodiment are provided by the embodiment shown in FIGS. 10–16.

Disengagement Mechanism

FIGS. 1,4,10,13 and specifically 17–20 show disengagement mechanisms that may be utilized with either operating system 100 or 100'. The disconnect features of these mechanisms allow for manual movement of the door. In other words, the disconnect feature separates the motor assembly from the counterbalance system so as to allow for manual movement of the door. For system 100, the counterbalance system is configured so as to allow for the control circuit and encoder wheels to continue to operate such that the door position may be monitored or known by the control circuit when the system is re-engaged. It will also be appreciated that the disconnect cable and the forces applied thereto can only be exerted in one direction such that tampering of the disconnect cable from outside the exterior of the barrier is significantly thwarted.

Referring now to FIG. 17 it can be seen that one end of the disconnect cable 122 is attached to the cable handle 123. A handle holder, designated generally by the numeral 124, is secured to one of the jambs 104,106. The handle holder 124 has an exit slot opening 450 that allows for axial and lateral movement of the cable 122 while also allowing the handle 123 to be retained by the handle holder 124. The holder 124 includes an engage step 452, and a disengage step 454 somewhat displaced from the engage step 452. An intermediate step 455 may be provided between the steps 452 and 454. An entry slot opening 456 is provided through the handle holder 124 between the steps 452 and 454, and the step 455 if provided. The openings 450 and 456 are aligned but not contiguous with one another so as to allow retained movement of the disconnect cable.

When the disengagement mechanism is in an engaged position, the handle 123 is positioned adjacent the engage step 452. When it is desired to disengage the drive mechanisms of the operator systems, the handle 123 is pulled and, as shown in the hidden lines, is moved to the disengage step 454. This single step allows for a one-step disengagement mechanism. It will be appreciated that the intermediate steps can be employed to utilize a two-step disengagement mechanism. In other words, the handle and the handle holder could be configured to allow for incremental movement of the disconnect cable as deemed appropriate.

Figure 18A:
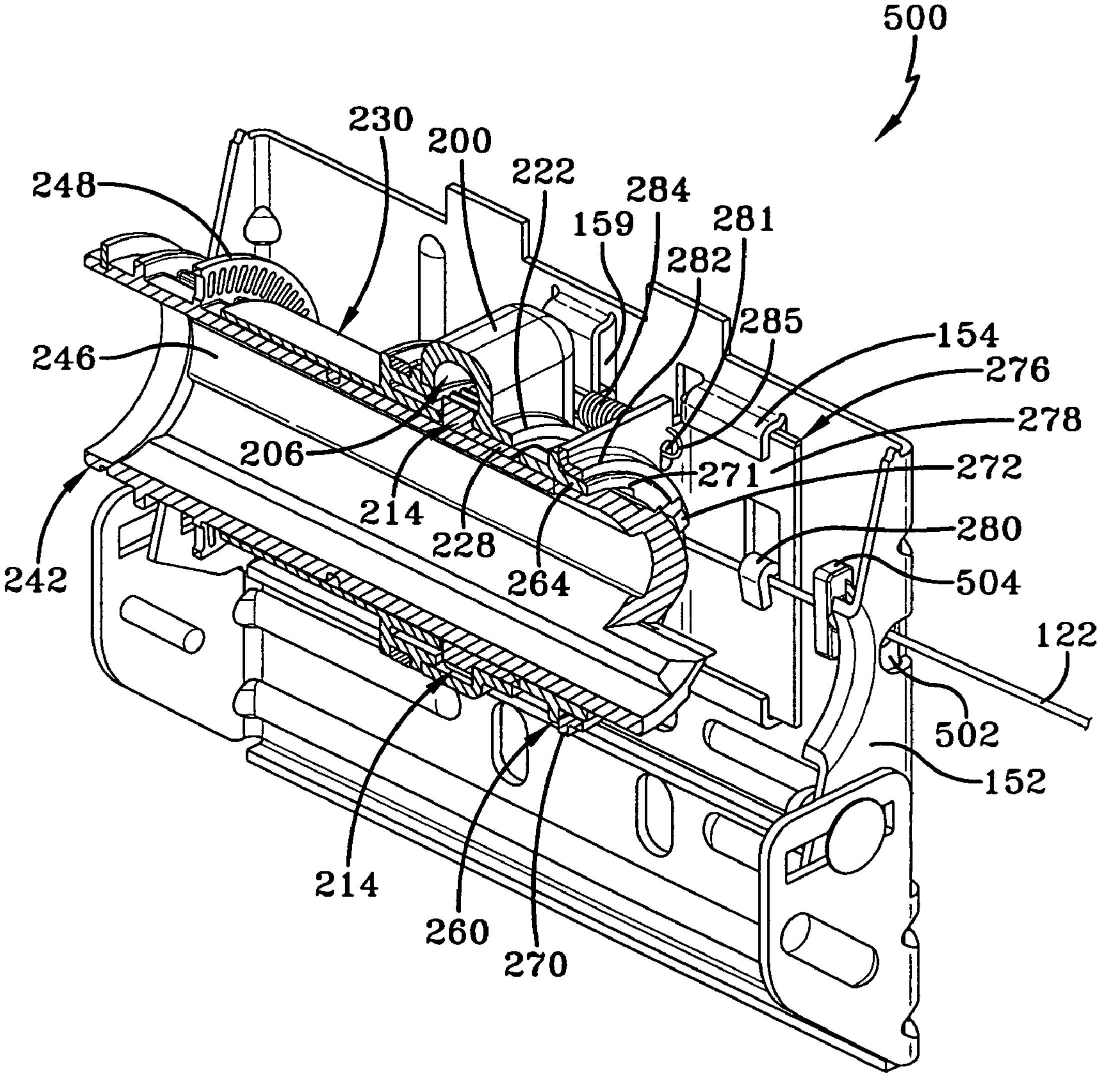
FIGS. 18A–C are perspective cross-sectional views of the drive assembly used in the motorized operator system further illustrating the disengagement mechanism.

Referring now to FIG. 18A, an exemplary disengagement mechanism for the operator system 100 is designated generally by the numeral 500. An end of the disconnect cable opposite the cable handle is connected to the L-bracket 276 and in particular to the clip 280. As noted previously, the L-bracket 276 is slidably received within the opposed bracket slides 154. The flange 152 provides a flange hole 502 to allow for axial movement of the cable therethrough. A tamper block 504 is attached to the cable at a position slightly removed from the end of the cable attached to the cable clip. Accordingly, forces other than an axial force applied to the disconnect cable 122 do not result in movement of the slide bracket. Moreover, if the cable inadvertently releases from the cable clip 280 the tamper block 504 would preclude total unraveling of the cable. Moreover, the tamper block 504 is the hard stop for mechanical disengagement so that the L-bracket 276 cannot over travel beyond the bracket slides 154.

The encoder sleeve 242 provides internal splines 246 which rotate the counterbalance tube 116. The sleeve also slidably carries the disconnect bearing 260 which is rotated by the sleeve and which engages with the worm gear 214. The springs 284 bias the L-bracket and in turn the disconnect bearing 260 into engagement with the worm gear 214. As such, rotatable movement of the motor drive shaft rotates the worm gear which in turn rotates the sleeve and the counterbalance tube.

Figure 18B:
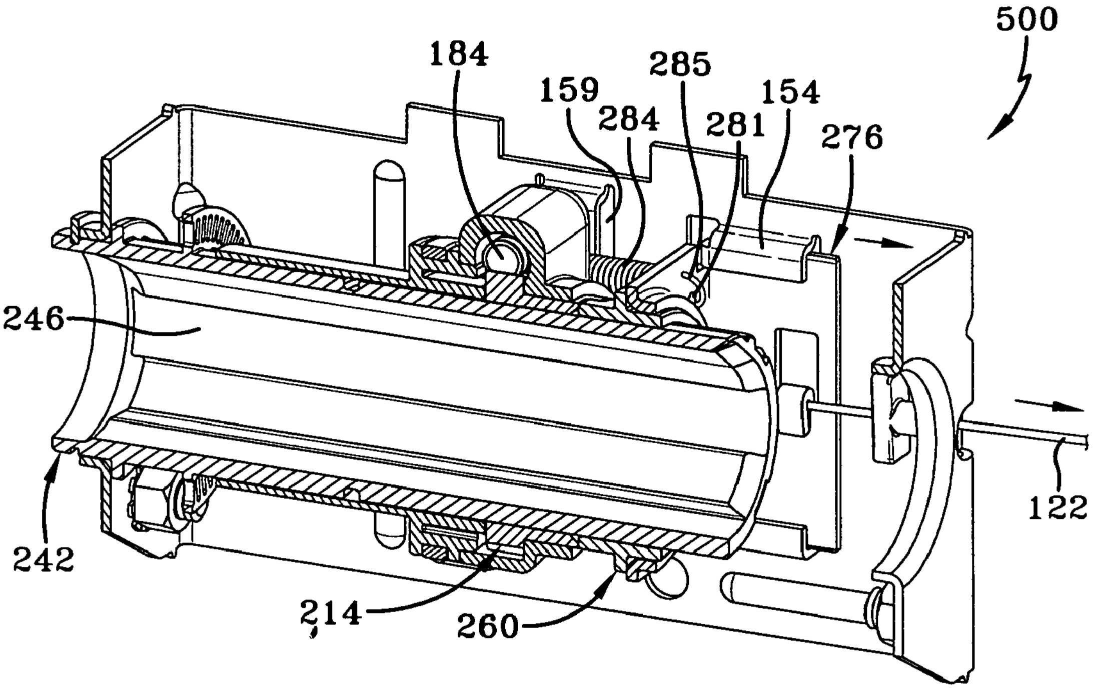
Figure 18C:
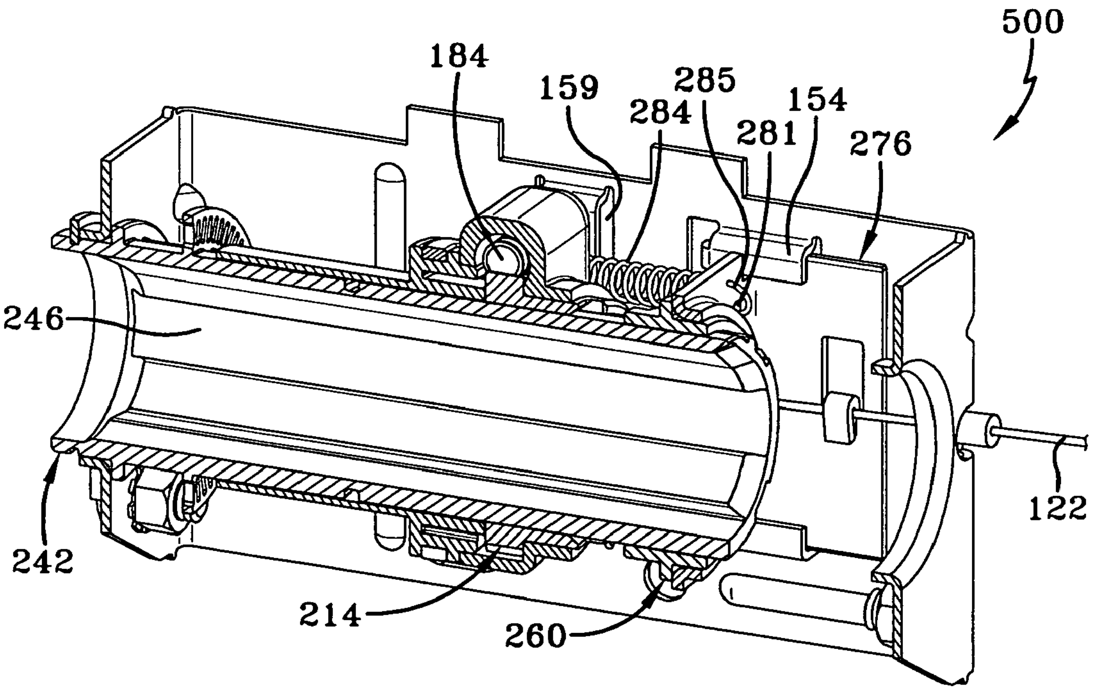

Referring now to FIG. 18B, it can be seen that when an axial force is applied to the disconnect cable 122, the L-bracket is moved in a like direction. It will further be appreciated that the disconnect cable only requires application of an axial force and that the disconnect cable is not routed around or otherwise configured to enable the disengagement feature or perform any other function associated with the operator system. With the slidable movement of the L-bracket, the disconnect bearing is slidably moved away and disengaged from the worm gear 214. With the disconnect handle retained at the disengage step 454, the encoder sleeve 242 is allowed to freely rotate with the rotation of the counterbalance tube. In other words, with the disconnect handle in the disengaged position, any manual upward force on a closed barrier allows for rotation of the counterbalance tube via the lift cables wherein rotation of the tube imparts a corresponding rotational force on the sleeve 242 which in turn rotates the encoder wheel. And the worm gear, which rotates with the sleeve 242, remains meshed with the drive shaft of the motor. When the disconnect bearing is out of engagement with the worm gear there are no longer any restraining forces upon the drive shaft and the motor assembly and, as such, the bias assembly 136 has no counteracting forces applied thereto and pivots the motor upwardly and removes the arm 192 from a locking position. Accordingly, when an upward or downward manual force is applied to the door, the encoder sleeve and counterbalance tube are allowed to freely rotate. The counting encoder 290 monitors this rotation and allows for tracking of door position based upon the number of counts detected. When the disconnect handle is removed from the disengage step 454, the springs 284 return the disconnect bearing into engagement with the worm wheel and the handle is retained by the engage step 452. After re-engagement, the operator controls may initiate a door movement sequence so as to re-learn a profile if needed.

Figure 19A:
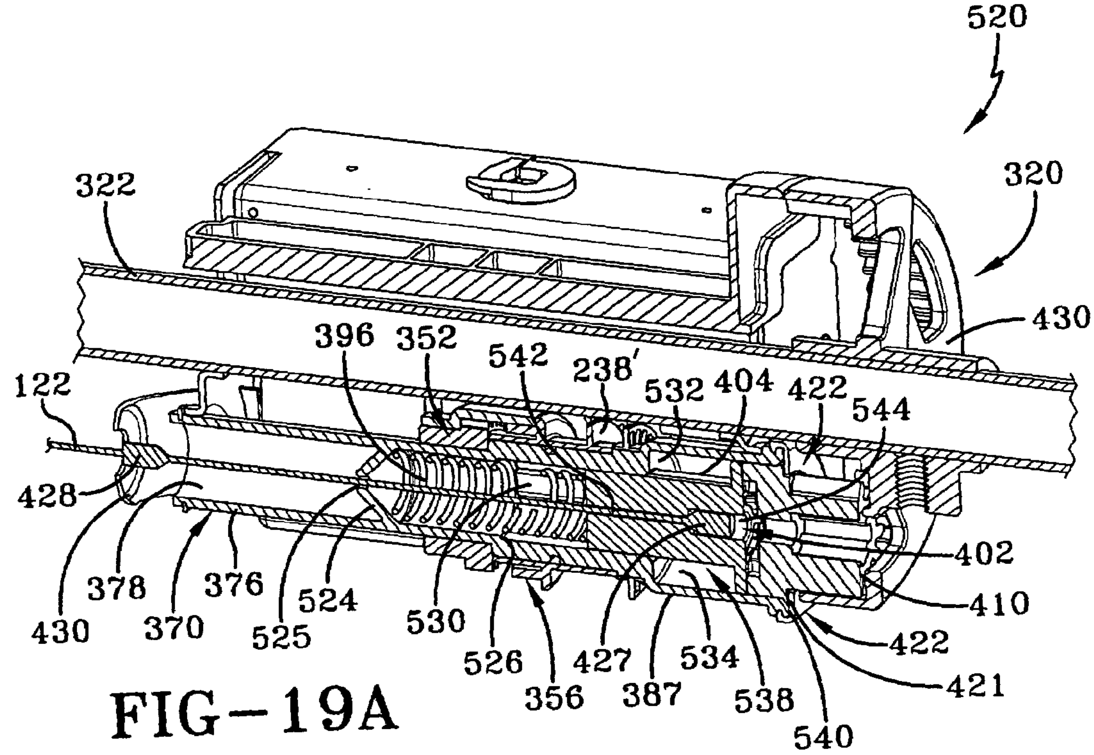
FIGS. 19A–B are perspective cross-sectional views of the drive assembly used in the alternative motorized operator system further illustrating a one-stage disengagement mechanism.
Figure 19B:
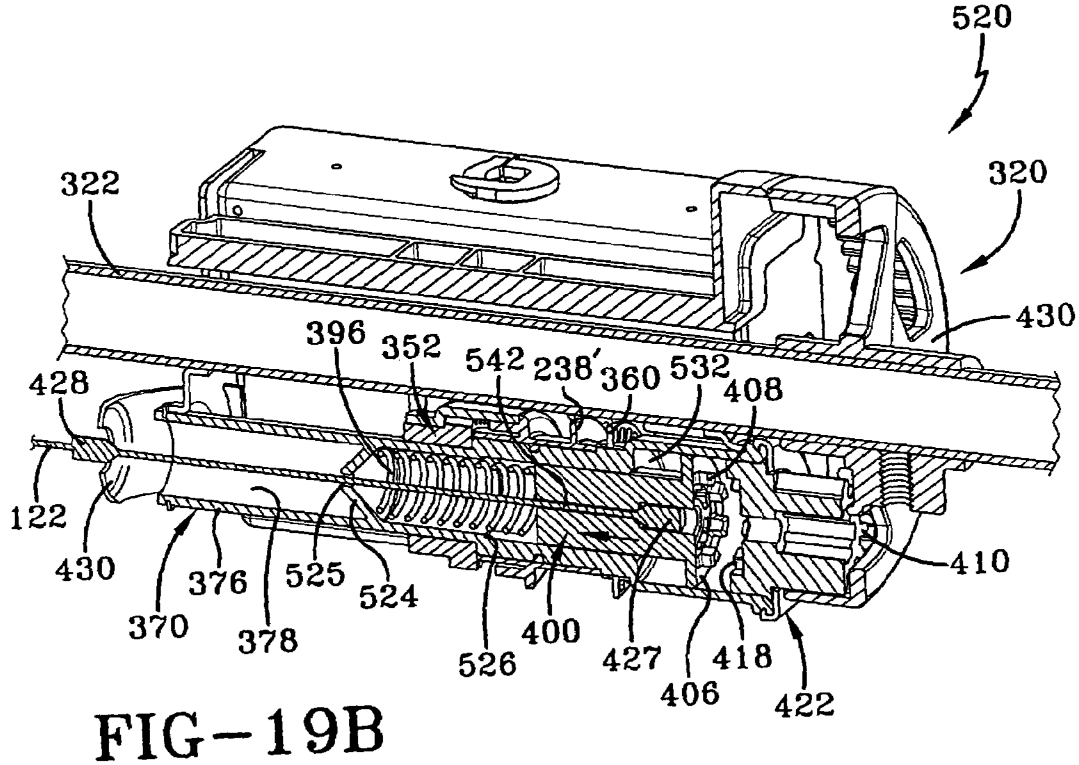

Referring now to FIGS. 19A and B it can be seen that a disengagement mechanism for operator system 100' is designated generally by the numeral 520. The mechanism 520 utilizes the disconnect cable in a similar manner with the handle holder 124 shown and described in FIG. 17. In this embodiment, the disconnect cable is axially received within the drive sleeve 370 and allows for in-line engagement and disengagement of the disconnect sleeve 400 with the drive gear 410.

Formed in the interior of the drive sleeve 370 is a spring wall 524 with a cable opening 525. The wall 524 retains the spring 396 in the opening between the wall 524 and the gear cup surface 387 while allowing the cable 122 to pass through the opening 525. The inner surface 376 provides an internal ledge 526 between the spring wall 524 and the cup portion. Between this ledge and an internal rim 532, which is radially formed on the inner surface 378, are a plurality of internal splines 530 which mesh with the disconnect sleeve 400 and in particular, the drive splines 404. Accordingly, the disconnect sleeve 400 is axially slidable, but rotates with the drive sleeve as it rotates. An internal sleeve wall 534 extends from the internal rim 532, wherein the sleeve wall 534 forms the interior of the gear cup 387. The sleeve wall 534 forms a lip chamber 538 which axially receives the lip 406 of the disconnect sleeve. The sleeve wall 534 is terminated at a chamfer end 540 that rotatably receives the ramp surface 421 of the drive gear 410 so as to be axially retained between the end of the drive sleeve 370 and the end cap 422.

The disconnect sleeve 400, which has a sleeve opening 402 therethrough, provides a cable opening 542 that receives the disconnect cable 122. The cable opening 542 expands into a cable head receptacle 544 which has a slightly larger outer diameter so as to allow for receipt of the slug 427. When an axial force is applied to the disconnect cable 122 and the handle is moved to the disengage step, this force is transferred through the slug 427 so as to pull the disconnect sleeve 400 inwardly toward the spring wall 524 while overcoming the force generated by the spring 396.

In operation, it will be appreciated that the spring 396 biases the disconnect sleeve 400 into engaging contact with the drive gear 410. As the motor drive shaft is rotated, the drive sleeve is likewise rotated along with the drive gear 410. This in turn rotates the driven gear 430 so as to rotate the tube 322. When the disconnect cable handle is pulled and put in the disengage step on the handle bracket, the slug pulls the disconnect sleeve 400 away from the drive gear 410 such that the cogs 408 no longer are received in or engaged by the cog receptacles 418. This action releases the holding force applied by the drive gear and driven gear upon the motor assembly and as such the bias assembly pivots the motor upwardly to an unobstructed operating position. Accordingly, the door or barrier may be moved in any direction by application of a manual force. In a difference from the other disengagement mechanism, manual movement of the door is not positionally tracked. Manual movement of the door results in rotation of the driven gear 430, but the drive gear 410 is not engaged and, as such, the drive sleeve 370 and the encoder wheel 360 do not rotate during manual movement of the door. Therefore, upon re-engagement of the drive gear 410 with the driven gear 430 a door profile may need to be re-learned, or driven closure of the door allows for use of the blocker tab 238' to reset a "home" or known position that is associated with an encoder wheel slot position.

Figure 20A:
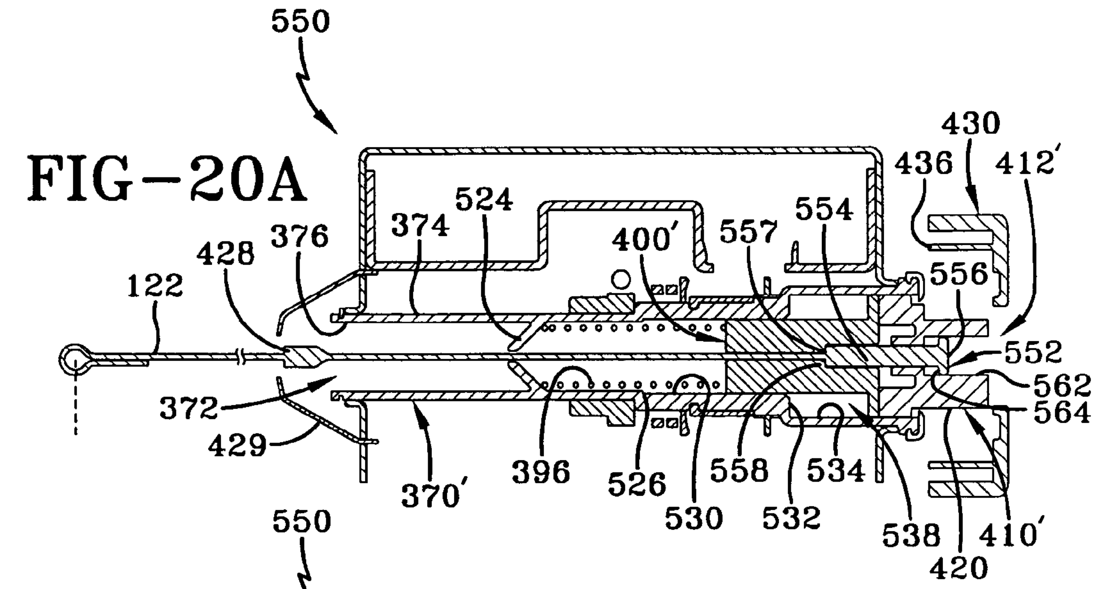
FIGS. 20A–C are perspective cross-sectional views of the drive assembly used in the alternative motorized operator system further illustrating a two-stage disengagement mechanism.
Figure 20B:
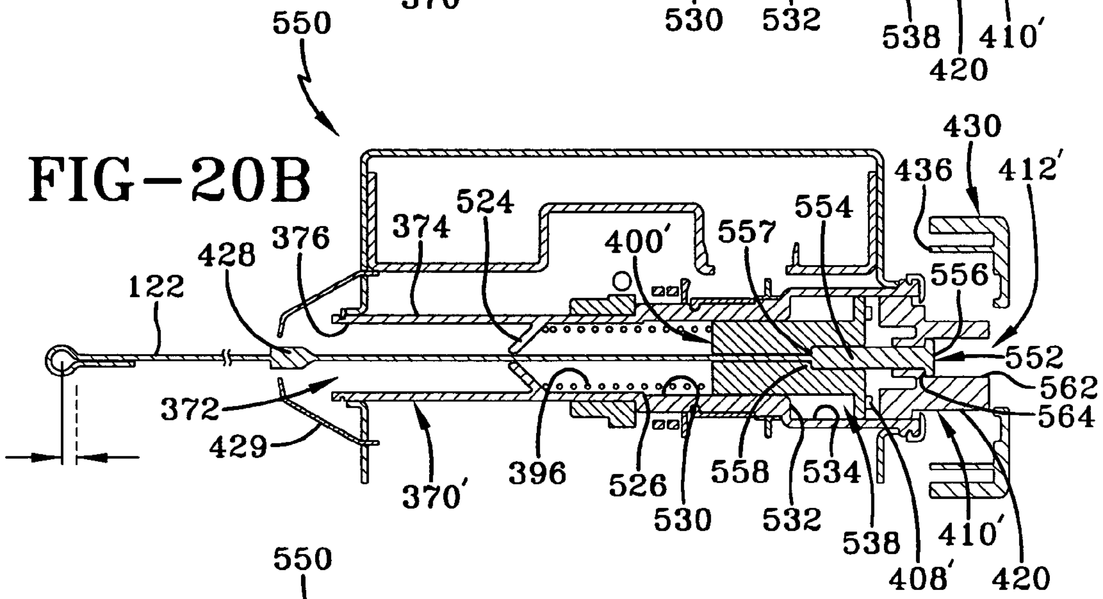
Figure 20C:
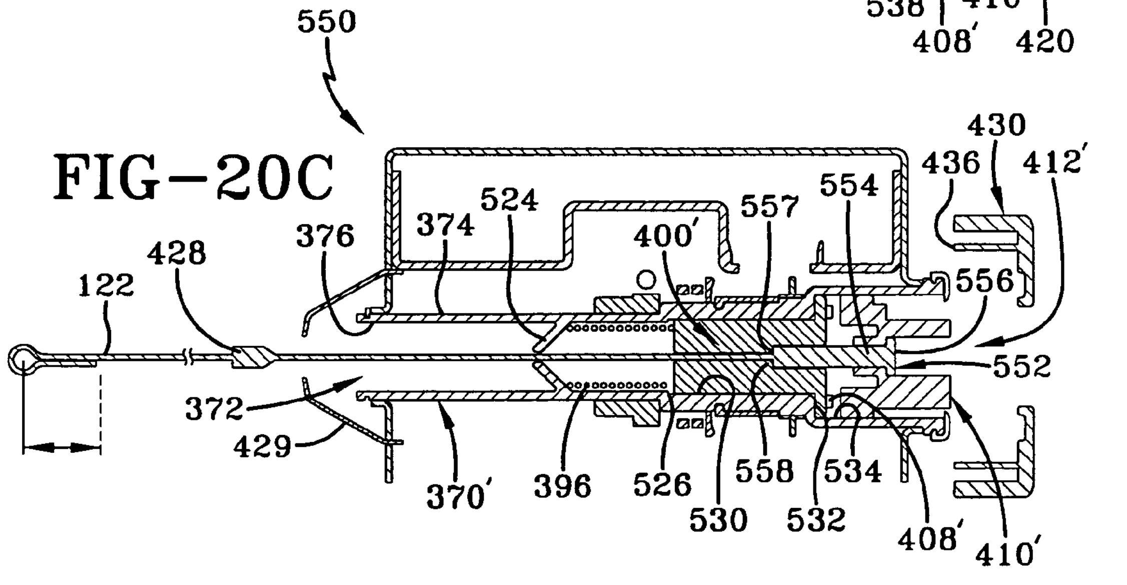

Referring now to FIGS. 20A–C it can be seen that an alternative embodiment for a disengagement mechanism is designated generally by the numeral 550. This embodiment may be employed with the operating system 100' and allows for a two-step disengagement sequence. This embodiment of the disengagement mechanism requires one of the intermediate disengagement steps provided by the handle bracket. Accordingly, as seen in FIG. 20A, a slug designated generally by the numeral 552 is provided in place of the slug 427. The slug 552 is slightly different in construction inasmuch as it has an elongated body 554 with a radial head 556 at one end. Opposite the radial head 556 is an end 557.

In this embodiment the disconnect sleeve 400' provides an internal radial head ledge 558 which is engaged by the slug end 557. Another difference is that the disconnect sleeve 400' and the drive gear 410' are axially movable within the drive sleeve 370'. In other words, the disconnect sleeve 400' and the drive gear 410', which is not provided with a ramp surface in this embodiment, may be withdrawn into the cup portion as will be described. In particular, the drive gear 410' has an opening 412' extending therethrough. And in a distinction from the previous embodiment, the slug 552 is operatively received within the drive gear. The drive gear 410' provides a head bore 562 so as to allow rotatable and slidable movement of the radial head 556. Having a somewhat smaller diameter than the head bore 562 is a head ledge 564 which is engageable by the radial head 556. Accordingly, as best seen in FIG. 20A, when the drive sleeve is in an operational position, the radial head 556 is spaced apart from the radial head ledge 564. In this position, the drive gear 410' is engaged with the driven gear 430.

Referring now to FIG. 20B, when the disconnect handle is moved to a first or intermediate disengagement step 455 (FIG. 17), the radial head 556 comes in contact with the head ledge 564 but does not move the drive gear 410'. However, the end 557 exerts a force on the disconnect sleeve 400' at head ledge 558 and moves the cogs out of engagement with the cog receptacles. This removes the torsional forces on the drive sleeve and allows the motor to pivot from a locking position by virtue of the bias assembly forces.

Referring now to FIG. 20C, the disconnect cable is pulled slightly further and held in a second disengagement step 454 (FIG. 17) so that the radial head 556 fully engages the head ledge 564 so as to pull the drive gear 410' out of engagement with the driven gear 430. This allows full rotation of the tubes so as to allow for manual movement of the door.

The disengagement mechanisms described herein provide a number of advantages. First, a direct axial force is required to disengage the drive sleeve from the drive gear. The cable is not required to be routed through various mechanisms that typically result in snagging and ineffective disengagement and problematic re-engagement and cable wear. The disengagement mechanism is also advantageous in that it utilizes the bias forces of the bias assembly. Accordingly, pulling of the cable is not required to lift the motor assembly as in previous pivoting operators. And since the disengagement mechanism only requires a single linear axial force, the force required to actuate the disengagement mechanism is minimized. In other words, the distance required to move the handle is significantly reduced.

Adjustable Post Features

Figure 21:
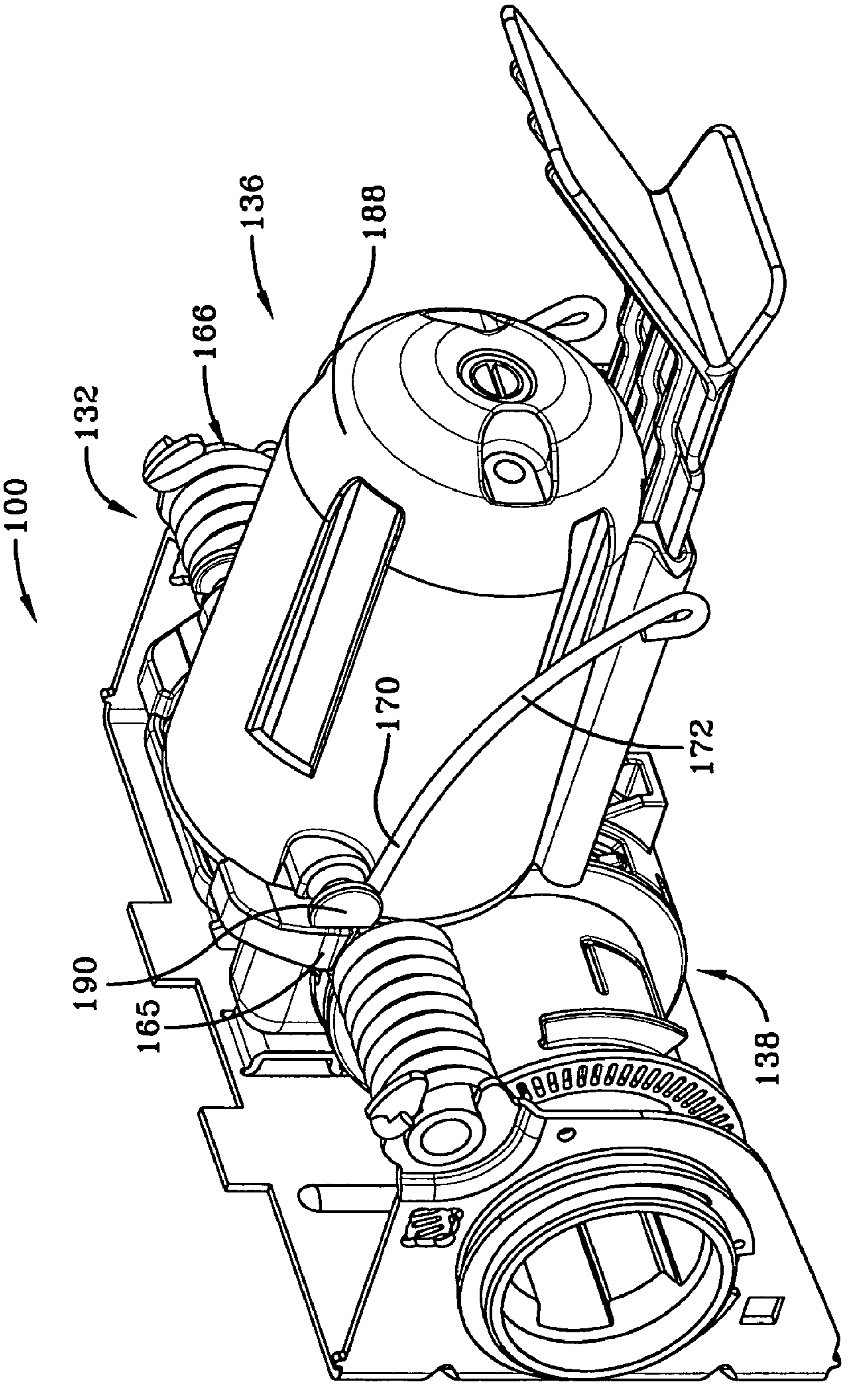
FIG. 21 is a side perspective view of the motorized operator assembly illustrating a fixed post extending from a motor housing, wherein the post coacts with the bias assembly to support the motor assembly.

Referring now to FIGS. 21–29, the adjustable post features provided with the motor housings will be discussed. As noted previously, re-positioning of the posts allow for adjustment of the biasing force generated by the bias assembly 132. As seen in FIG. 21 the operator system 100 includes the bias assembly 132 which supports the motor assembly 136 in an operating position. Portions of the drive assembly 138 are selectively rotated by the motor assembly 136 for the purpose of raising and lowering the barrier. When an obstruction force is applied to the barrier traveling in a downward direction, and that force exceeds the force provided by the bias assembly 132, then the motor assembly 136 pivots downwardly as part of a secondary entrapment feature and corrective action is taken. The motor housing 188 has a pair of outwardly, radially extending posts which are supported by corresponding compliance springs 166. Each compliance spring 166 has an elongated section 170 from which further extends a transition section 172.

Depending upon the weight of the barrier and other factors, the need may arise for the posts 190 to be moved or positionally adjusted with respect to the motor housing so as to accommodate the increase or decrease in forces needed to enable pivoting of the motor assembly at the required obstruction force. It will be appreciated that for standard residential type doors, the posts 190 may be provided in a fixed location. But if motor assemblies are selected for use with various types of doors, then the need may arise for the post or equivalent structure to be movable.

Figure 22:
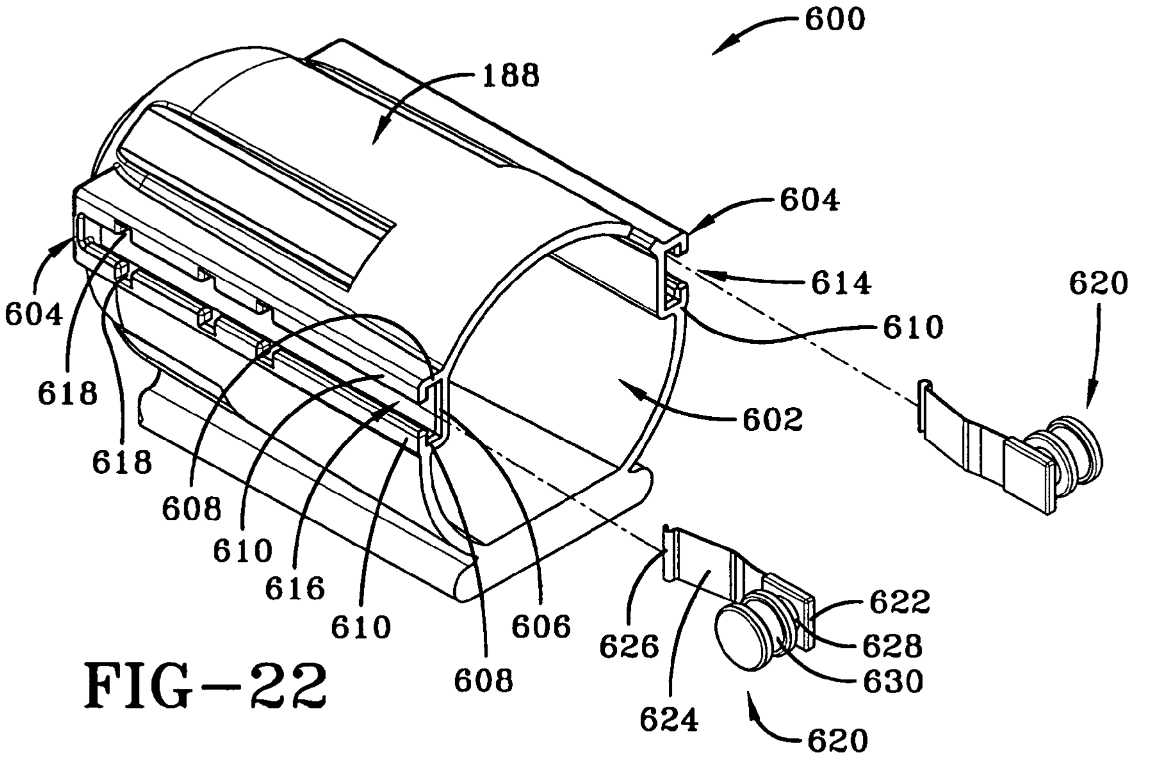
FIG. 22 is an exploded view of a first alternative adjustable post motor housing.
Figure 23:
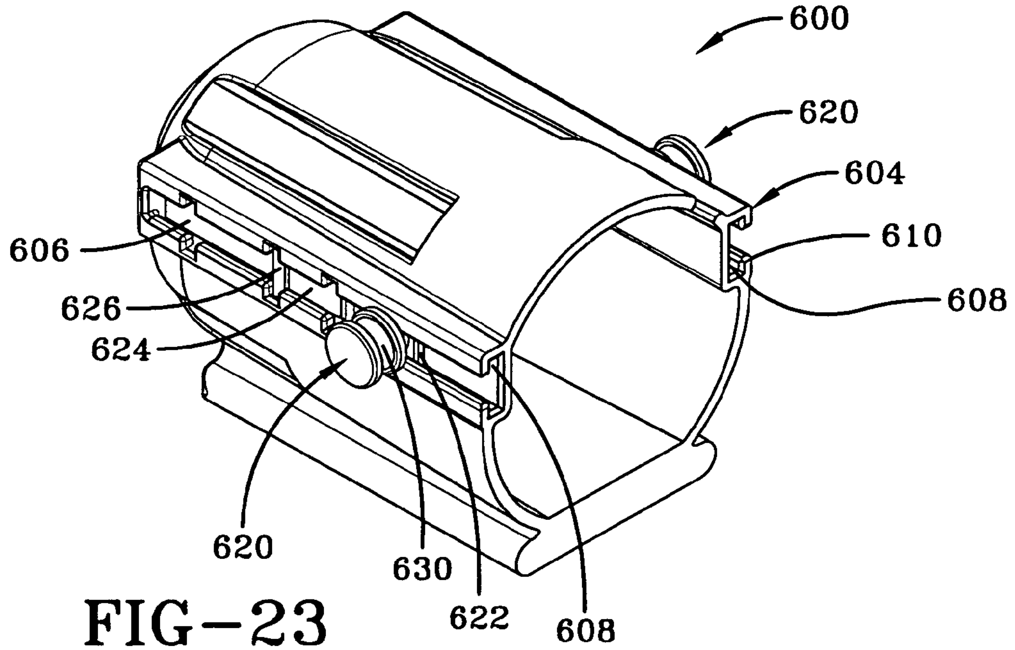
FIG. 23 is an assembled perspective view of the first alternative adjustable post motor housing shown in FIG. 22.

Referring now to FIGS. 22 and 23, a first motor housing embodiment with an adjustable post is designated generally by the numeral 600. The motor housing 600 includes the motor housing 188 which provides a housing cavity 602 to receive the motor (not shown). Extending along each lengthwise side of the motor housing is a post receptacle designated generally by the numeral 604. Each post receptacle 604 includes a slide surface 606 from which perpendicularly extends a pair of opposed side walls 608. Extending perpendicularly inwardly from each side wall 608 is a rail 610 which is substantially parallel with the slide surface 606. The surface 606, the sidewall, 608 and the rail 610 collectively form a finger opening 614 between the sidewalls 608 and a column opening 616 between the opposed rails 610. The rails have a series of paired notches 618 wherein each notch opposes a like notch.

A movable post 620 is insertable into each post receptacles 604. The post 620 includes a slide tab 622. The tab 622 includes an arm 624, which is made of a spring-like material such as stainless steel, extending from the post and which is further deformed into a finger 626 at the distal end. The post 620 includes a post column 628 which axially extends from the tab and at an end opposite the finger 626. Each column provides a post channel 630.

The movable post 620 is selectively positionable along the length of the post receptacle 604. In particular, the finger 626 is inserted into the column opening 616. When the spring-like finger reaches opposed notches 618, it deflects upwardly and the post selectively locks into position. If it is desired to move the post to a different position, then the finger is pressed downwardly back into the column opening 616 and moved. The post column 628 is received between the rails in the column opening 616. This embodiment allows for the post to be slidably movable along the length of the motor housing wherein it is preferable that the posts on each side be aligned with respect to each other. And it will be appreciated that the sections 170 and 172 of the compliance spring are received in the post channel 630.

Figure 24A:
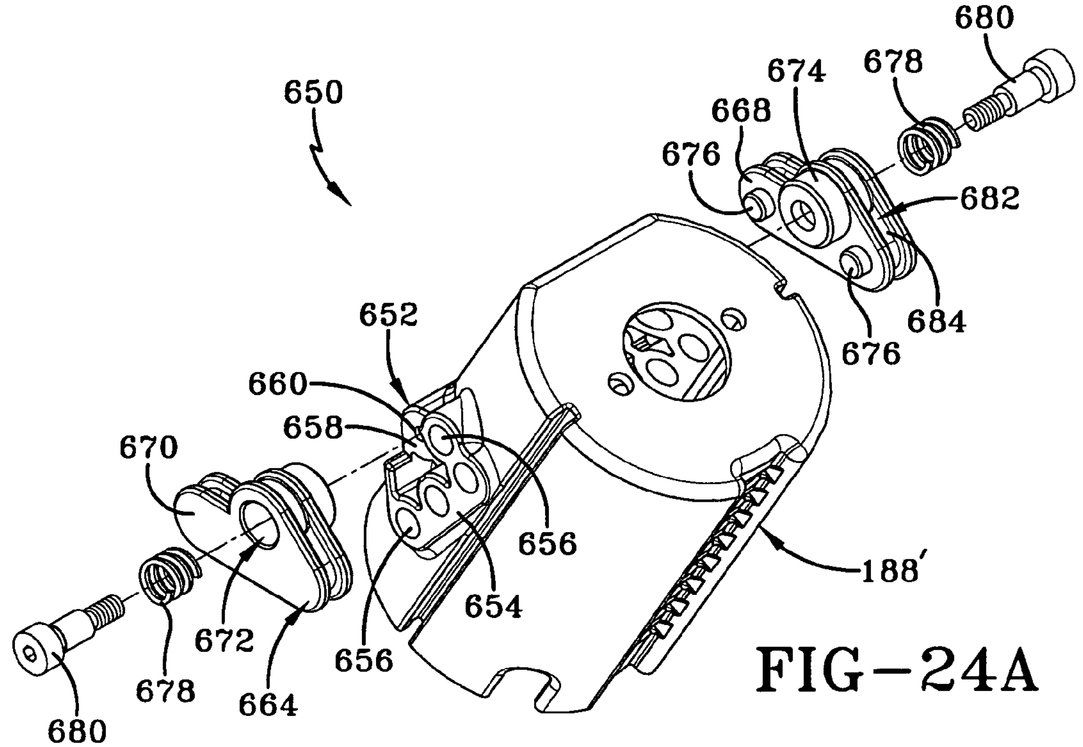
FIGS. 24A–B show an exploded and assembled perspective view, respectively, of a second alternative adjustable post motor housing.
Figure 24B:
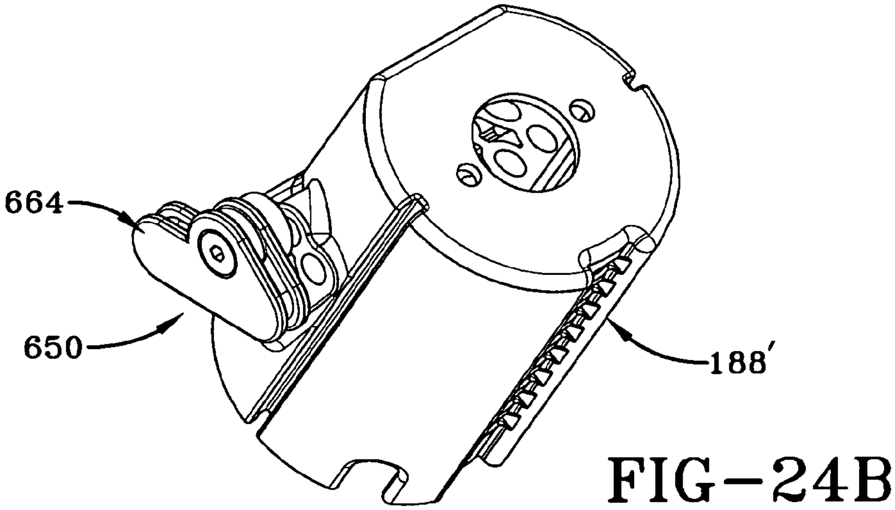

Referring now to FIGS. 24A and B, an alternative adjustable post embodiment is designated generally by the numeral 650. In this embodiment, the motor housing 188' is utilized and receives the motor as previously described. Disposed on each side of the housing 188' is a post cam receptacle 652. The receptacle 652 includes a cam surface 654 which provides four holes or bores 656 extending from the surface into the body of the housing. Although four holes are shown it will be appreciated that any number of holes could be used. Disposed somewhat beneath the cam surface 654 is a bushing surface 658 that is parallel with the cam surface 654. The bushing surface 658 has a fastener hole 660 therein.

A movable post cam designated generally by the numeral 664 is coupled to the cam surface 654. The cam 664 includes a housing side 668 which faces the housing and which is opposite an exterior side 670. The cam 664 includes a pivot opening 672 which extends from the housing side 668 through to the exterior side 670. A bushing 674 extends from the housing side 668 and surrounds the pivot opening 672. A pair of alignment nubs 676 also extend from the housing side 668. Although two nubs are shown it will be appreciated that any number of nubs could be utilized as long as they are positionable within any one of the corresponding alignment holes 656. A bias spring 678 is received within the pivot opening 672 along with a pivot fastener 680 which is received and secured in the fastener hole 660. When secured by the fastener in such a manner, the movable post cam 664 is movable axially and then rotatable. In other words, the cam is axially movable away from the housing so as to allow for clearance between the alignment nubs 676 and the cam surface 654. Accordingly, by pulling on the cam 664 and then re-aligning the nubs with other holes 656, the user can select any desired alignment configuration. The cam 664 has a cam surface 684 which peripherally surrounds in an irregular circumferential shape that is disposed between the housing side 668 and the exterior side 670 for the purpose of receiving the compliance spring.

Figure 25:
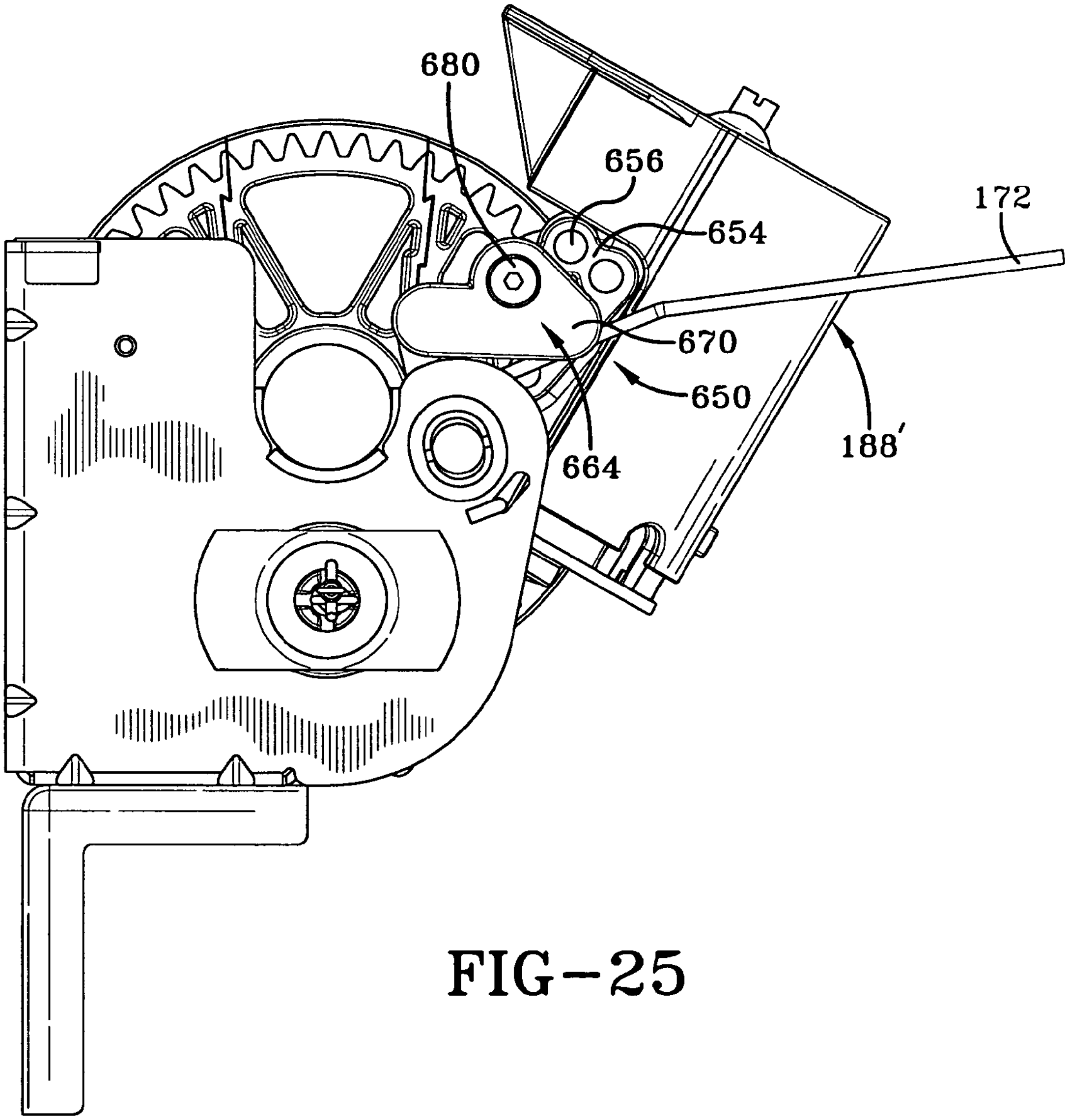
FIG. 25 illustrates the second alternative adjustable post motor housing with the motor assembly in an operating position.
Figure 26A:
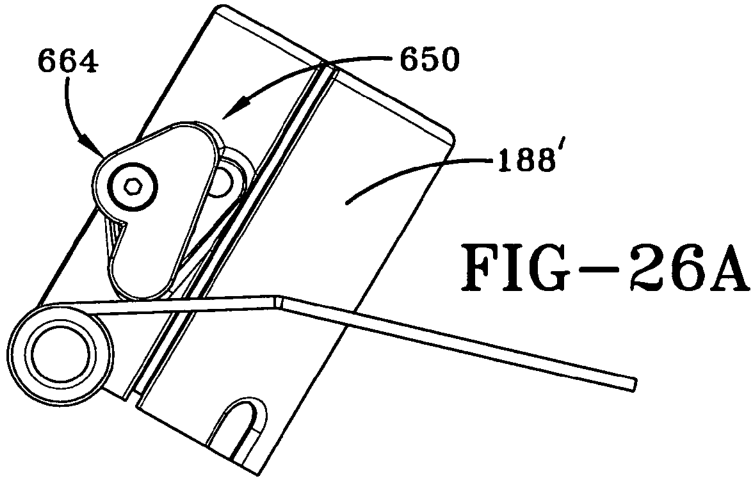
FIGS. 26A–C illustrate various positions of a cam assembly utilized in the second alternative adjustable post motor housing.
Figure 26B:
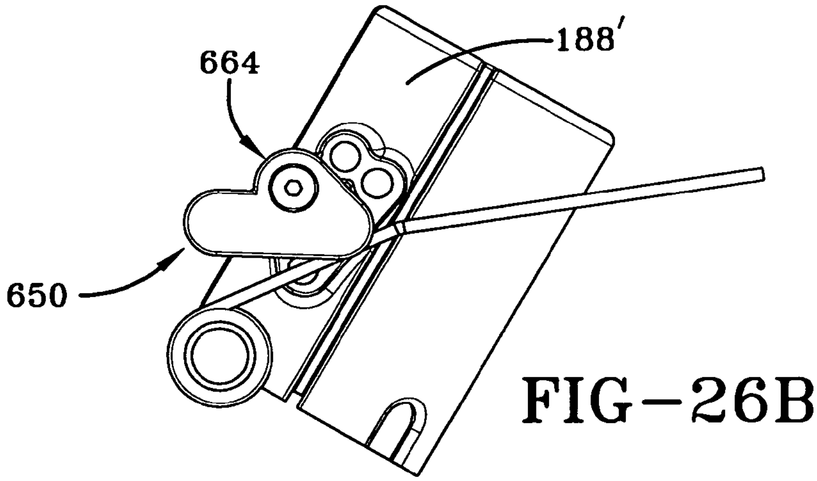
Figure 26C:
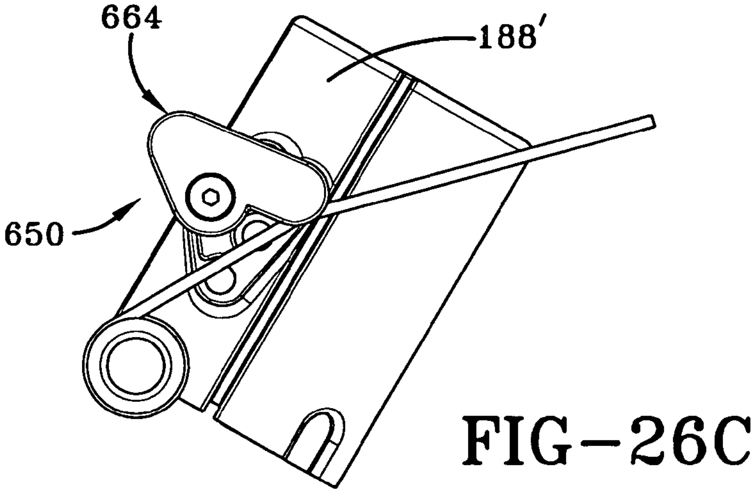

Referring now to FIG. 25, it can be seen that the compliance spring is engaged by the movable post cam 664 so as to place the motor assembly in an operative position. Further examples of the positioning of the compliance spring with respect to the movable post cam is shown in FIGS. 26A–C. In FIG. 26A the cam 664 is positioned so as to be in close proximity to the body or coil portion of the compliance spring for use with hard or heavier types of doors. For mid-weight doors, FIG. 26B shows the cam 664 positioned to contact the compliance spring at about a mid-point position between the coil spring and the spring's angular section. And FIG. 26C shows the cam 664 positioned so that it is in contact with the compliance spring at or near close proximity to the angular section for use with lighter doors.

Figure 27:
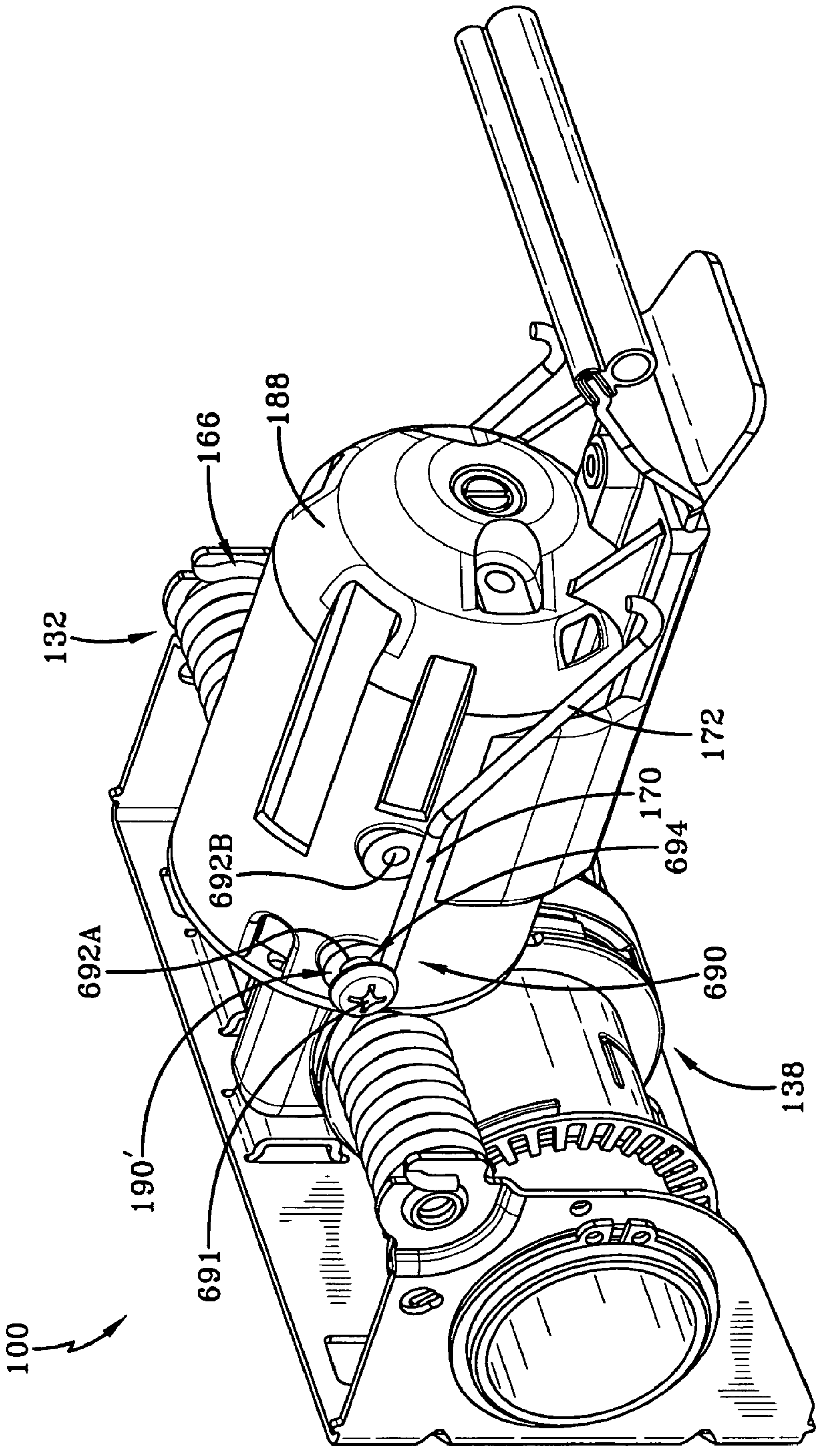
FIG. 27 is a side perspective view of a third alternative adjustable post motor housing.

Referring now to FIG. 27, it can be seen that an alternative embodiment for a movable post cam or housing is designated generally by the numeral 690. In this embodiment, a threaded fastener post 190' is employed and provides a threaded fastener head 691. The housing 188 provides a plurality of threaded receptacle openings 692A and 692B, although additional threaded receptacles could be utilized. Accordingly, the user selects the desired bias force setting by moving the threaded fastener into a desired position with respect to the housing. The fastener head 691 is positioned with respect to the housing so as to form a channel 694 for receiving the spring sections 170 and 172. Accordingly, it will be appreciated that a user may adjust the biasing forces by removing and reinserting the threaded fasteners 190' where needed.

Figure 28A:
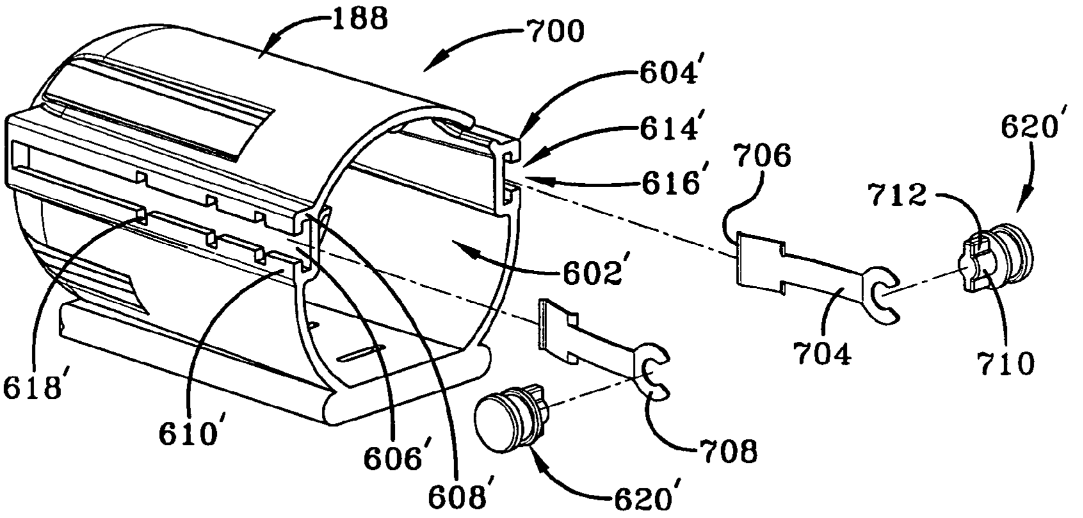
FIGS. 28A–B show an exploded and assembled perspective view, respectively, of a fourth alternative adjustable post motor housing.
Figure 28B:
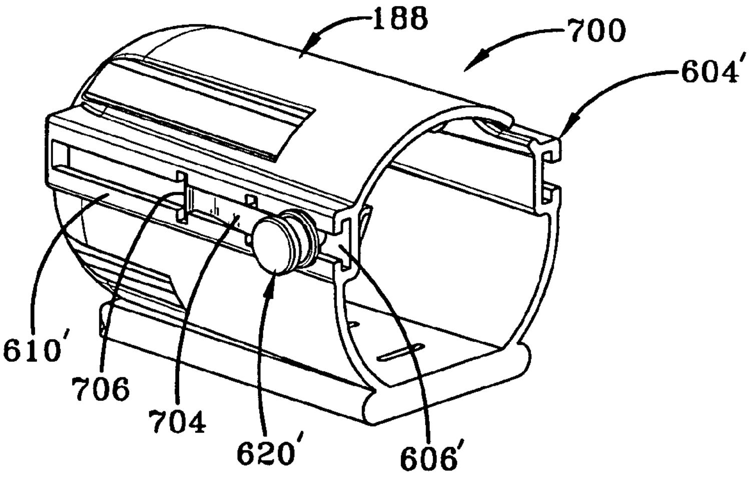

Referring now to FIGS. 28A and B, it can be seen that an alternative movable post embodiment is designated generally by the numeral 700. This embodiment includes the motor housing 188 which provides a housing cavity 602' along with post receptacles 604'. Each post receptacle includes a slide surface 606', sidewalls 608' perpendicularly extending from the surface and rails 610' which perpendicularly extend from corresponding sidewalls 608'. The sidewalls 608' form a finger opening 614' therebetween and the opposed rails 610' form a column opening 616' therebetween. A series of opposed notches 618' are provided in each of the rails 610'.

A movable post 620' is receivable in the notches 618'. In particular, each post 620' is retained within the receptacle by a biasing arm 704 which is made of a spring-like material such as stainless steel. Each arm 704 provides a finger 706 at one end and a fork 708 at an opposite end. The fork 708 is coupled to the post 620'. Each post 620' includes an insertion nub 710 from which radially extends a key 712, wherein the nub and the key are configured to be received within the notches 618' and the openings 614' and 616'.

To set the position of the posts, the arm 704 is first inserted into the column opening 616 and is positioned such that the fork 708 and the post 620' extend through the column opening and are positioned outside of the finger opening 614'. The arm and post is slidably moved until the post nub is aligned and inserted into the desired notch pair 618. The biasing arm 704 retains the posts 620' in the notches 618'. In this manner, the posts are movable so as to allow for adjustment of the biasing forces as needed.

Figure 29A:
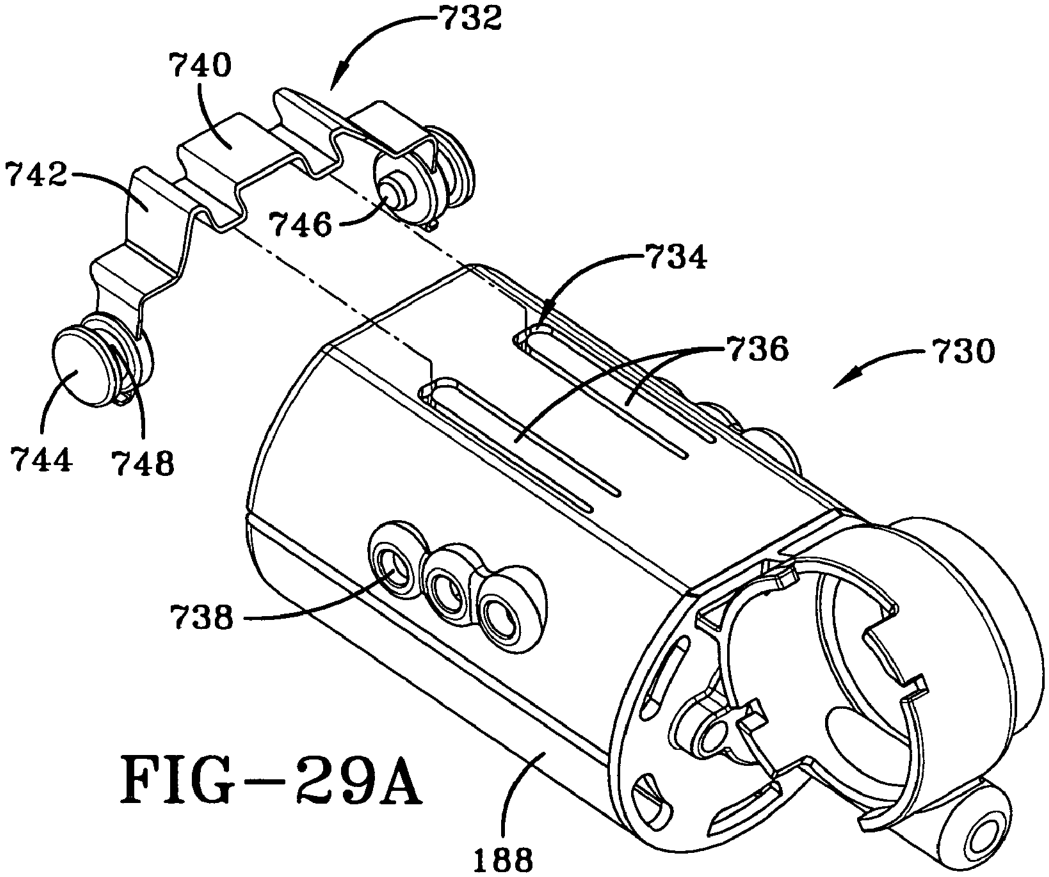
FIGS. 29A–B show an exploded and assembled perspective view, respectively, of a fifth alternative adjustable post motor housing.
Figure 29B:
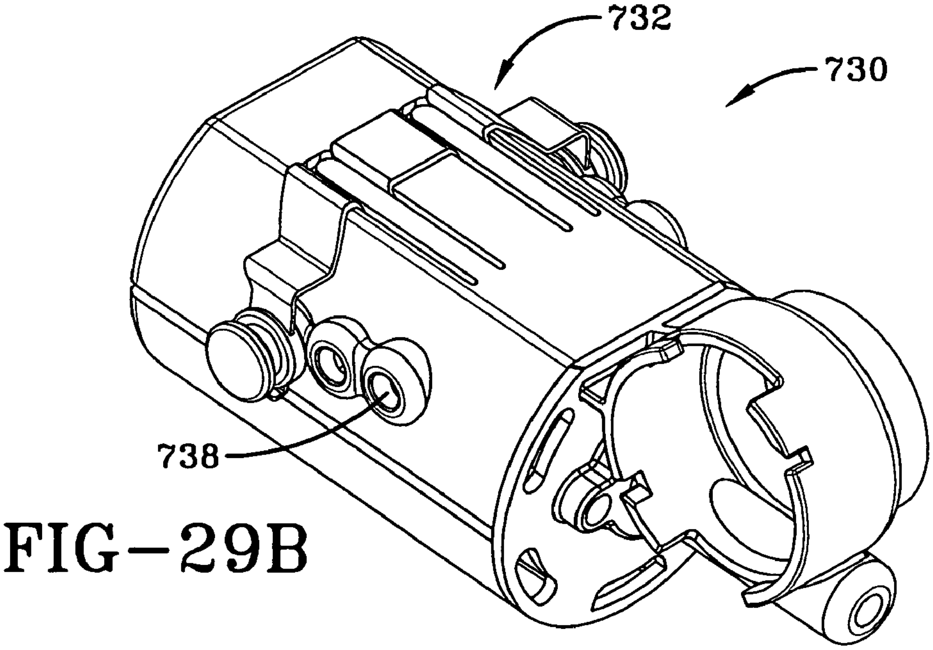
Figure 30:
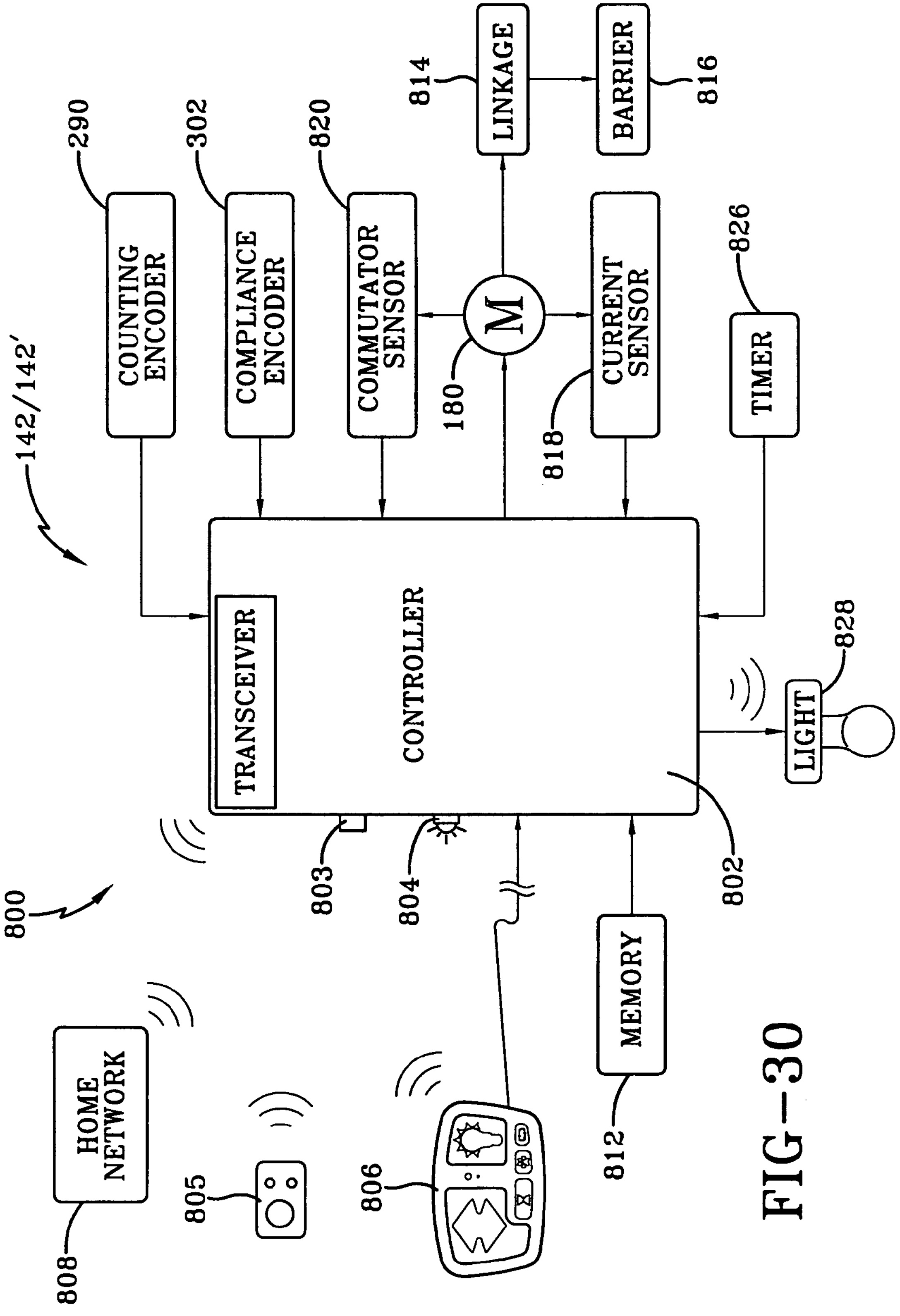
FIG. 30 is a schematic diagram of the motorized operator system according to the present invention.

Referring now to FIGS. 29A and B, it can be seen that another movable post embodiment is designated generally by the numeral 730. In this embodiment, the motor housing 188 receives and retains a post clip 732. In particular, the motor housing 188 includes at least one slat opening 734 which maintains a deflectable slat 736 which is deflectable with respect to the motor housing. The motor housing also provides a series of post holes 738 on each side of the housing. The post clip 732 includes a body 740 which is configured to be received in the slat openings 734 and be retained by the slats 736. Extending from the body 740 are a pair of clip arms 742 from which laterally extend a post 744 at each end of the arm. Extending inwardly from each post is a nub 746 that is receivable in a corresponding post hole 738. Each post 744 provides a channel 748 to receive the sections of the compliance springs. Accordingly, the assembly is configured such that the body 740 is retainable within the slats and the arms are deflectable such that the posts 744 and in particular the nubs 746 can be moved from one position to another with respect to the housing as needed.

The movable post features are advantageous in that simple adjustments can be made to accommodate different weight doors but still use the same motor and bias assemblies. Another advantage is that the posts are easily movable and can be done with minimal effort.

Operator Control Features

Referring now to FIG. 30, it can be seen that an operator control system is designated generally by the numeral 800. The control system 800 is part of the control circuit 142/142' and maintained on the control circuit board 292 which carries the necessary circuitry and components for implementing the operator system and provides connectivity to other components maintained by the operator systems 100, 100'. The operator system 800 includes a controller 802 which maintains the necessary hardware, software and memory for enabling the concepts of the present invention. The controller 802 receives user and sensor input for evaluation and generates command signals so as to implement the operating features of the systems 100, 100'. The controller 802 provides a program button 803 which places the controller in a learn mode for learning various transmitters and/or other components. The program button could also be used to learn other functions. It will also be appreciated that other wireless features may be used to enable a program sequence for the purpose of the controller learning certain procedures. The controller 802 may provide a program light 804 to indicate programming status or other status of the controller or associated components. The controller 802 is linked or learned to various devices such as a remote/portable transmitter 805 and/or a wall station 806. Typically, the remote/portable transmitter provides one of two functions wherein the primary function is for the opening and closing of the barrier and the secondary functions may control adjacent or less used barriers, or lighting fixtures and the like. It will also be appreciated that the remote portable transmitter is a wireless device but that it may be wired directly to the controller. A wall station transmitter 806 typically provides multiple functions and may be either wired or wirelessly connected to the controller. Additional functions that may be provided by the wall station transmitter may include but are not limited to delay-open, delay-close, setting of a pet height for the door, learning other transmitters to the operator and installation procedures used in learning a barrier to the operating system. The controller 802 may be linked with a home network 808 wherein the home network communicates with the controller and other appliances or peripheral devices within a building or residence so as to incorporate the features of the controller into a home network for monitoring and other purposes.

The controller 802 maintains a transceiver 810 which is a frequency appropriate device that allows for wireless communications between the controller and the various transmitters, transceivers and/or home networks and other accessories as deemed appropriate by the end user. The controller 802 may be linked to an external memory device 812 but it will also be appreciated that the memory may be provided internally of the controller.

The motor 180 receives input from the controller so as to initiate energization thereof. It will further be appreciated that control features are incorporated into the motor so as to allow control of the motor's speed and force in operation of the system. The motor is connected to the barrier 816 via linkage 814 such as the drive assembly and the counterbalance system. Accordingly, the motor is able to drive the barrier to an open position and assist in movement to the closed position and takes action whenever an obstruction is detected. A current sensor 818 is coupled to the motor to monitor the amount of current drawn by the motor which can then be used by the controller to determine operating parameters and which can further be used to monitor the motor for variations that may be indicative of an obstruction detection or other operating fault. A commutator sensor 820 may also be coupled with the motor 180 so as to monitor spikes and the amount of voltage applied to the motor wherein these events can also be indicative of the operational performance of the motor and indicate detection of obstructions or other malfunctions in the operator system. Other input received by the controller 802 includes the counting encoder 290 which monitors the rotation of the drive assembly by virtue of pulses of light passing through the slots of the encoder wheel which can, in turn, be used to determine speed and position of the door with respect to the position limits. A compliance encoder 302 is also linked to the controller 802 so as to detect whenever an obstruction force has overcome the bias assembly forces and indicate that the operator is no longer in an operational position. A timer 826 may also be connected to the controller 802 to monitor and associate the occurrence of various other variables with respect to time considerations such as the counting encoder. This can be used to determine speed or to provide a base-line profile or threshold for other forces monitored by the controller. An external light 828 may be provided so as to provide illumination or signal various operating features of the controller or programming stages as needed. The light 828 may be controlled by a wired or wireless signal received from the controller.

Figure 31A:
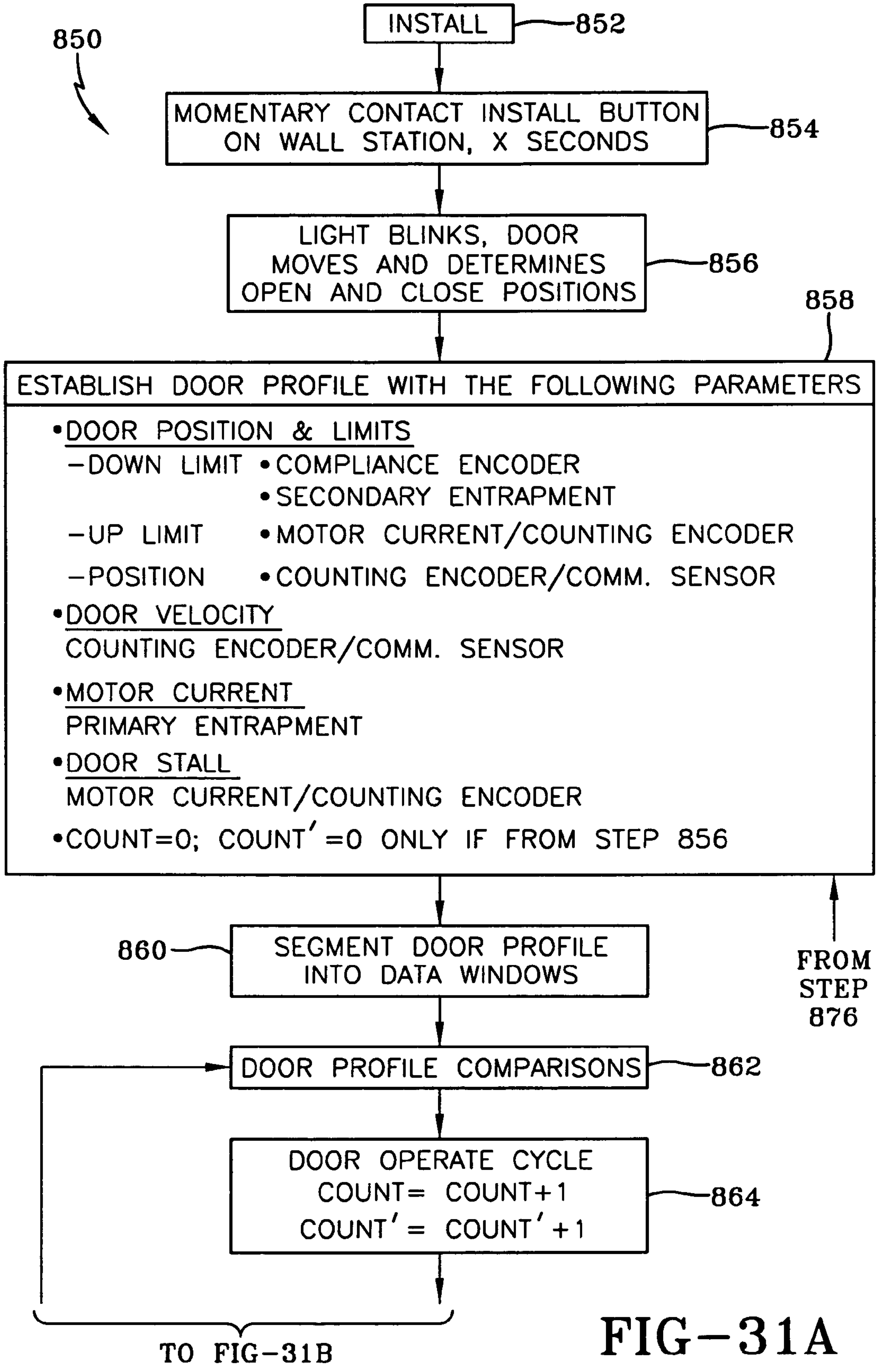
FIGS. 31A–B illustrate an operational flowchart setting forth the installation and operational steps of the motorized operator system.
Figure 31B:
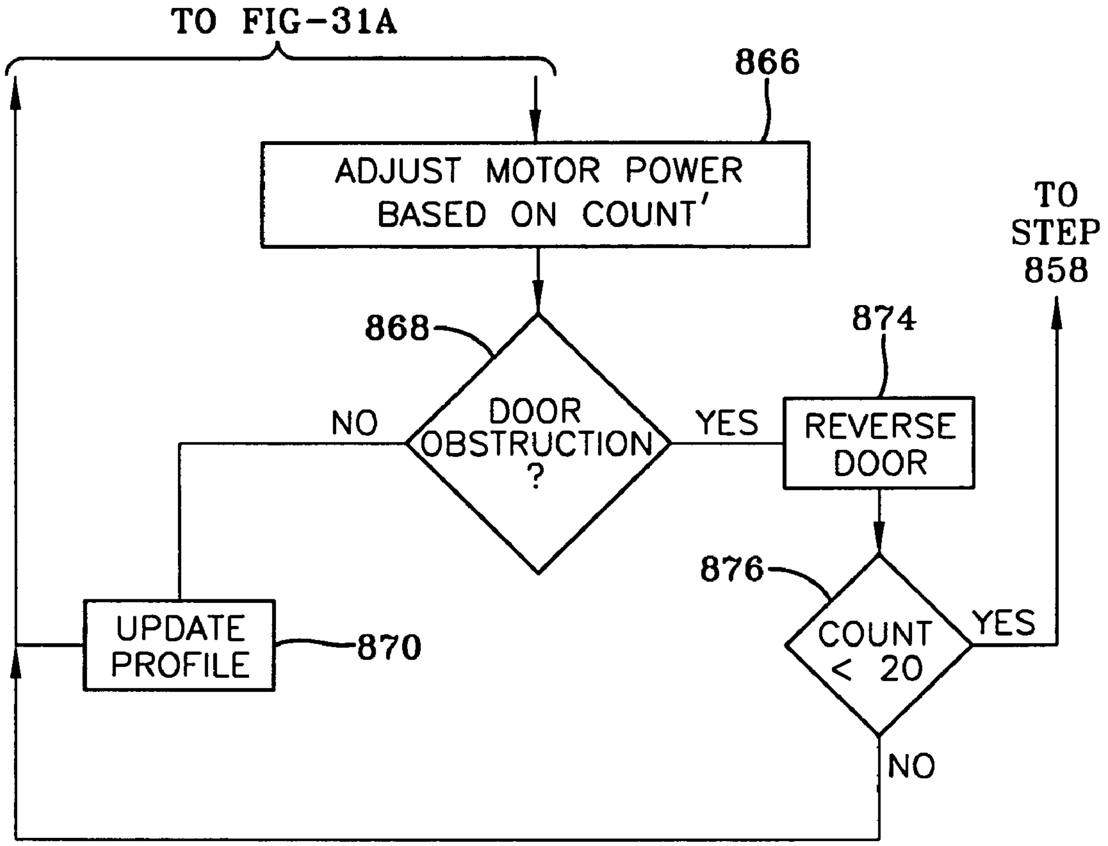

Referring now to FIGS. 31A and B, an operational flow chart representing the operational steps of the operating system 800 is designated generally by the numeral 850. Upon completion of installation of the door on the tracks, connection of the operator system to the counterbalance system and the corresponding connection of the counterbalance system to the door, the installer actuates an install procedure at step 852. This procedure may be implemented from the wireless wall station or by other mechanisms. Ideally, an install button on the wall station is a hidden or recessed button which can only be accessed with a special tool. In any event, the install button is held for a predetermined period of time such as 5 seconds so as to activate the install mode or if hidden or requiring a special tool the activation can be momentary contact. During this mode, as the door moves in either direction, a light 804 associated with the controller or an overhead light 828 blinks on/off at a predetermined rate such as one-half second. The operator opens and closes the door and at the end of the close cycle the operator determines and stores within the controller a profile of the door travel characteristics and the door's open and closed limits. Alternatively, a door-move button on the wall station can be used if no profile is previously stored and the door-move command has been received. In this alternative mode, the opener moves to a fully open position and blinks the overhead light on/off during the move. At the start of the next door-move command to bring the door down toward the closed position, the opener again blinks the lights as the door is closing. In this installation procedure, the door-move button can be pressed and the door system is stopped awaiting the next command to come down. In any event, the light blinking and movement steps are set forth in step 856.

At step 858 a door profile is established with various parameters that are monitored operational components of the operator system 100, 100'. The door position limits and a door position between those limits can be established by utilizing the timer and the various encoders and sensors. In particular, the door direction and/or position and position limits can be determined from the counting encoder, the compliance encoder, the commutator sensor and/or the motor current sensor. For example, the position of the door may be determined by using the counting encoder wherein a pulse of light interrupted by the encoder wheel typically represents 0.1 inch of door movement. The downward limit can be established by use of the compliance encoder when the door reaches the floor. In the install mode it is presumed that the floor is the "obstruction" causing the motor to pivot and accordingly rotate the blocker tab which is detected by the compliance encoder. This door position value is stored as the close limit. The door then reverses direction to the open position limit, or up-limit, which may be established by the motor current and/or the counting encoder by determining where the motor and the door stalls out. The controller then establishes door open limit position somewhat less than the stall position so as to reduce wear on the mechanical components of the operator system and the door. The controller also establishes a position 1 inch from the bottom limit so that any obstruction forces detected during the last inch of travel are disregarded according to the established safety standards. The commutator sensor and generated data may be used in place of the data generated by the counting encoder. The commutator of the motor generates a detectable spike as the motor shaft or armature rotates and this spike is a repeatable event that can be analyzed in much the same was as light pulses of the counting encoder. The blocking tab and compliance encoder provide a "home" location for resetting the door position to the bottom limit and as an obstruction arm for the secondary entrapment detection procedures previously discussed. Using this methodology, the compliance encoder can resolve the location much better than a potentiometer system, but it is subject to being a relative positioning system. As such, a "home" location must be returned to from time-to-time to resynchronize the relative value to the absolute door position. Accordingly, the blocking tab and compliance encoder provide this home reference capability.

Another variable that may be utilized in establishing a door profile is door velocity and this is obtained by use of the timer 822, and the counting encoder 290 or the commutator sensor 820. The counting encoder produces a pulse train signal, the frequency of which is directly related to the speed of the door system. As with the motor current, the speed of the door system may be stored in a profile table corresponding to the positional information. Once fully established, the profile window and a minimum speed can be determined from the pulse encoded data. The commutator sensor can be used to measure each edge-to-edge transition which is time measured and averaged with the last predetermined number of measurements such as eight. The minimum measurement is recorded in the profile table and is used as a comparison against the next door-move across this interval. If the speed of the door system is decreased over this interval by a pre-defined value, then the opener stops the door and reverses it to the top limit. Accordingly, this door velocity value can be used as a primary entrapment detection indicator.

Another data variable or characteristic maintained by the door profile is motor current which is established by the current sensor 818. The controller can use the change of motor current as a primary entrapment indicator. The real-time motor current is compared against the recorded motor current value which is stored in the profile table and may be correlated to door position. Motor current may be measured every 1-120th of a second or other interval as deemed appropriate. This measurement is taken and then averaged with the last fifteen or other predetermined number of measurements to provide a motor current window average. This average is compared to the profile table from the last door-move using a motor current difference trip point. Once the current reaches a trip point another timer-counter is activated which requires sixteen trip measurements to occur before the door system is reversed. Accordingly, the motor current data stored with the door profile may be utilized as a primary entrapment indicator.

Another component of the door profile data is the door stall variable. The controller system may use the encoder wheel stall or the motor current stall condition to locate the up limit. During an obstruction reversal, the controller runs the door in the up direction until the door is stalled as detected by the motor current draw or pulse encoder/velocity slow down. Once the door has stopped, the opener rewrites the door position with the value of the up limit as recorded in the profile table. The controller software monitors the door stall condition in the event that constant pressure is applied to the door-move command button so as to over-ride the profile data during the install mode in which the door stall is the method to determine the upper limit.

As discussed, the encoder wheel uses a number of evenly spaced slots, such as 64, which revolves as the counterbalance tube rotates. Each slot blocks a light beam as the slot rotates which produces a discreet signal (pulse-train) used by the controller 802. The controller counts each "tick" and resolves the relative door location down to about 0.1 inch. Since the spacing between the slots is evenly spaced, the software maintained by the controller cannot resolve the relationship of each pulse to the location of the counterbalance tube or drive tube. Therefore, if the operator is disconnected and the door is moved, the distance can be determined, but the direction of travel cannot. To overcome this deficiency, the encoder wheel has incorporated therewith a directional slot which allows the operator software component to determine the drive tube's location relative to door position. By blanking out two adjacent slots to create the directional slot 300 and a corresponding pulse, the controller's software can determine door location and direction by location and records this same pulse as the door system is moved either manually or by the opener. Although use of a slotted encoder wheel and a light beam is disclosed, it will be appreciated that other types of markers could be used. For example, equally spaced magnets could be used as a marker, wherein a different sized magnet could be used as the directional marker. an appropriate reed switch or other sensor could be used to detect the passing of the magnets.

For example, if the opener or operating system is disconnected and the door is manually moved up, while the door is being moved the software component may count pulses and locate the directional pulse. When the door is stopped with the pulse counter at, for example, 278 pulses, the directional pulse is located at the 270 pulse location. If the door system is manually moved again later, in this case the software component expects the directional pulse to appear again 8 pulses later given that the door is being pulled down or to appear again at 56 pulses later if the door is being moved in the up direction. Another application is to use the location of the directional pulse and the detection of the locking arm to determine the bottom or top limits. In the case of the close limit, the aforementioned relationship could be used to detect the one-inch obstruction-ignore position and resetting of the operator's pulse count to the bottom limit. In the case of the up limit, if the opener or operating system runs the door to the physical stall point, the software then uses the reference of the directional pulse to determine the true location of the door. For example, if the directional pulse shows up at location 1024, but really should have been in location 1011, then the pulse count is offset and can be readjusted to reflect the true location as to the "estimated" position.

Returning now to step 858, upon completion of the establishment of the door profile with any one, combination or all of the enumerated characteristics, count values are established wherein a COUNT variable is set to zero and a COUNT' variable is also set to zero. Next, at step 860 the door profile established during installation is segmented into data windows for comparison of these windows during actual door movements. The windows may comprise 4 inch or other denomination increments along the length of the barrier travel between the limit positions. During operation at step 862, the door profiles are detected and then compared window-by-window with the door profiles previously learned by the controller. At step 864 the door operation cycle counts are increased by one each.

At step 866, if a COUNT' value reaches a predetermined number of operation cycles, for example 10,000, then the motor power is adjusted at the ramps (up and down as detected by the commutator sensor) if required, thus, extending the motor's useful life. It will be appreciated that these ramps occur at the door panel sections as they pass from a vertical position to a horizontal position and vice versa. Currently, the motor wear reduces the motor torque and the loss of torque leaves the door system reversing near the bottom. Motor power adjustments can be made at any predetermined number of counts during the life of the motor. It will also be appreciated that the door speed is monitored at the ramps during travel and recorded into the memory of the operating system. In any event, at step 868 the controller determines whether a door obstruction indicator event has occurred by a comparison of the door window profiles to the stored information. If an obstruction is not detected at any one of the windows then at step 870, the previous data points monitored during barrier movement are stored and updated in the door profile, and the process returns to step 862.

If at step 868 an obstruction is detected, then at step 874 a reversal event takes place and the system awaits a next door-move command. At step 876 the controller determines whether the count is less than 20, door cycles since the learning of the door profile. If the count is less than 20, then the procedural flow returns to step 858 to reestablish a door profile. In this reestablishment step however, the count' value is not reset to zero. If at step 876 the count is not less than 20 then the process returns to step 862 for normal processing.

Based upon the foregoing, the advantages of the operator control features are readily apparent. The operating systems 100, 100' use simplified monitoring sensors such as the current sensor, the commutator sensor and the counting encoder in conjunction with a compliance encoder to provide a low-cost operating system which has been found to be more effective and reliable than previously known systems. The controller utilizes input from only a current sensor to determine whether the door or barrier is in a known stall position or has contacted an obstruction for the purpose of the primary entrapment mode. In the alternative, the primary obstruction detection can utilize input from the counting encoder to determine the motion of the drive tube to indicate whether the barrier is in a known stall position or has contacted an obstruction. These primary entrapment indicators are supplemented by the required secondary obstruction indicator which is provided by a pivoting operator motor rotating against a biasing member and blocking a compliance encoder signal. This eliminates other costlier types of secondary entrapment features and provides the advantage of being incorporated into an existing drive system. The biasing member that prevents the motor rotation during normal un-obstructed operation is positioned to pivot on a different axis than the motor and configured such that the biasing force lessens as the motor pivots during obstruction detection or locking of the door or barrier. As a result, this system does not require the use of a pulse counter to set the door travel limits nor require an accurate count from the pulse counter as to the barrier's position although such features can be utilized. Another advantage is that the compliance encoder can be used to monitor and adjust the speed of motor pivot for smoother, quieter operation. The control circuit measures time between leading and trailing edge signal from the blocker tab and adjusts motor power to compensate speed to a predetermined desirable level.

These systems are advantageous in that a count of voltage and/or current peaks measured from the commutator sensor to determine the speed of the motor can be utilized to determine the speed of the motor and therefore the maximum speed of the door. The use of the compliance springs also allow for elimination of cables to raise the motor during disconnection procedures and also eliminates the use of a biased detent pin and the timing components necessary to hold the motor in the operational position found in previous pivoting motor assemblies. This construction also eliminates the use of a slide potentiometer so as to reduce the cost of the overall unit. The advantages of the operating system allow for use of an encoder which can resolve the location as effectively as the potentiometer system and further reduce the cost of the device. The use of the profile data learned in the installation procedures can be used to determine if door location and encoder values are synchronized together. For example, it is known as door panels cross the radius and drop motor current will peak and then dip. Motor current peaks and dips due to changing door load, can be stored as part of the profile data and these peak and dip ratios can be used to determine if the owner is driving a heavy door system or a light door system so that operating parameters can be adjusted accordingly.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto and thereby. Accordingly, for an appreciation of the true scope and breadth of the invention, reference should be made to the following claims.

What is claimed is:

1. A system for moving a barrier between limit positions comprising:

an operator motor assembly mounted proximate to the barrier, at least a portion of said operator motor assembly movable between a barrier operating position and a barrier locking position with said operator motor assembly blocking movement of the barrier; and a bias assembly biasing said operator motor assembly in said barrier operating position and allowing said operator motor assembly to move toward said barrier locking position when either a predetermined force overcomes a biasing force of said bias assembly or when the barrier is moved to a closed limit position.

2. The system according to claim 1, further comprising:

a counterbalance system adapted to be connected to the barrier, said counterbalance system selectively coupled to said operator motor assembly to move the barrier.

3. The system according to claim 2, wherein said operator motor assembly pivots about a first axis and said bias assembly pivots about a second axis such that the biasing force decreases as said operator motor moves from said barrier operating position toward said barrier locking position such that the force created by the biasing assembly is not linear to the biasing member.

4. The system according to claim 1 wherein said bias assembly comprises:

a spring perch;

at least one spring, said at least one spring having a first end carried by said spring perch and a second end supporting said operator motor assembly.

5. The system according to claim 4, wherein said operator motor assembly has a post extending therefrom and supported by said spring's second end.

6. The system according to claim 5, wherein said spring's second end has an elongated section bearing against said post, and a transition section extending from said elongated section which remains in contact with said post when said operator motor assembly moves toward said barrier locking position.

7. The system according to claim 6, wherein said predetermined force is about 15 pounds to overcome said biasing force of said at least one spring.

8. The system according to claim 6, further comprising:

a retaining assembly which carries said operator motor assembly and said bias assembly;

a yoke having opposed yoke ends secured to said retaining assembly, each said yoke end carrying a corresponding one of said springs and positioned so that corresponding elongated sections are disposed proximal opposite sides of said motor assembly, wherein said motor assembly has selectively adjustable posts extending from opposite sides and supported by a corresponding one of said elongated sections.

9. The system according to claim 8, further comprising:

a buckle interposed between said yoke ends; and a compliant spring stop interconnecting said buckle to an adjacent said yoke end, said compliant spring stop retaining at least a portion of said elongated section.

10. The system according to claim 1, further comprising:

a counterbalance system to assist in moving the barrier between limit positions; and a drive system selectively engageable between said operator motor assembly and said counterbalance system.

11. The system according to claim 10 further comprising:

a controller connected to said operator motor assembly to control movement of the barrier;

a blocker tab associated with said drive system, said blocker tab moving when said operator motor assembly moves toward said barrier locking position; and a compliance encoder generating a compliance signal received by said controller when said blocker tab is moved.

12. The system according to claim 11, wherein said controller measures a speed of said compliance encoder and selectively adjusts an amount of power supplied to said operator motor assembly.

13. The system according to claim 11, further comprising:

an encoder wheel associated with said drive system, said encoder wheel having a plurality of slots;

a counting encoder associated with said encoder wheel and generating a count signal received by said controller as the barrier is moved between positions, said controller determining a door position based upon said count signal.

14. The system according to claim 13, wherein said encoder wheel has a directional slot larger than any one of said plurality of slots, said counting encoder generating a directional signal when said directional slot is detected, said directional signal received by said controller so as to determine a direction of travel of the moving barrier.

15. The system according to claim 13, wherein said controller receives a sensor input and in conjunction with said door position generates a door profile.

16. The system according to claim 15, wherein said sensor input is a door speed value derived from said count signal, wherein said door speed value is compared to said door profile by said controller and is used as a primary obstruction detection indicator, and wherein said compliance signal is used as a secondary obstruction detection indicator.

17. The system according to claim 15, further comprising:

a current sensor connected to said operator motor assembly, wherein said sensor input is a current value used in establishment of said door profile, and said current value is compared to said door profile by said controller and is used as a primary obstruction indicator, and said compliance signal is used as a secondary obstruction detection indicator.

18. The system according to claim 15, further comprising:

a commutator sensor connected to said operator motor assembly, wherein said sensor input is a commutator value used in establishment of said door profile, and said commutator value is compared to said door profile by said controller and is used as a primary obstruction indicator, and wherein said compliance signal is used as a secondary obstruction detection indicator.

19. The system according to claim 1, further comprising:

a drive assembly operatively connected to said operator motor assembly; and a counterbalance system adapted to be connected to said drive assembly, said drive assembly transferring power from said drive assembly to said counterbalance system to allow movement of the barrier between limit positions.

20. The system according to claim 19, further comprising:

a disconnect mechanism linking said drive assembly to said counterbalance system, wherein actuation of said disconnect mechanism disengages said drive assembly from said counterbalance system to allow manual movement of the barrier.

21. The system according to claim 20, wherein said disconnect mechanism and said drive assembly are axially aligned with said counterbalance system.

22. The system according to claim 20, further comprising:

a transfer gear interposed between said drive assembly and said counterbalance system, wherein said disconnect mechanism is axially aligned with said drive assembly.

23. The system according to claim 20, wherein actuation of said disconnect mechanism allows said bias assembly to move said operator motor assembly to the barrier operating position.

24. A system for moving a barrier between limit positions, comprising:

a counterbalance system adapted to be connected to the barrier;

an operator motor assembly mounted proximal the barrier, at least a portion of said operator motor assembly movable between an operating position and a locking position;

a bias assembly coupled to said operator motor assembly and maintaining said operator motor assembly in said operating position, said operator motor assembly overcoming a bias force of said bias assembly when the barrier is proximal a closed limit position; and a disengagement mechanism selectively interposed between said counterbalance system and said operator motor assembly, wherein actuation of said disengagement mechanism from an engagement position to a disengagement position allows said bias force to move said operator motor assembly from said locking position even when the barrier is proximal the closed limit position.

25. The system according to claim 24, further comprising:

a drive system which incorporates said disengagement mechanism, said disengagement mechanism comprising:

a sleeve rotatable with said counterbalancing system;

a disconnect mechanism slidably associated with said sleeve and rotatable therewith, said disconnect mechanism associated with and rotated by said operator motor assembly; and at least one disconnect spring disposed with respect to and biasing said disconnect mechanism into engagement with said operator motor assembly, wherein actuation of said disengagement mechanism to said disengagement position disengages said disconnect mechanism from said operator motor assembly and acts upon said disconnect spring.

26. The system according to claim 25, wherein said disengagement mechanism further comprises:

an L-bracket rotatably receiving said disconnect mechanism and slidably movable with respect to said sleeve; and a disconnect cable having a handle that is movable between said engagement and disengagement positions, said disconnect cable secured to said L-bracket, wherein said L-bracket is movable in only an axial direction parallel with an axial orientation of said drive system.

27. The system according to claim 26, wherein said at least one disconnect spring has one end coupled to said L-bracket and an opposite end coupled to a stationary portion of said operator motor assembly.

28. The system according to claim 25, wherein said disengagement mechanism further comprises:

a disconnect cable having a handle that is movable between said engagement and said disengagement positions, said disconnect cable coupled to said disconnect mechanism, wherein only axial movement of said disconnect cable disengages said disconnect mechanism from said drive system.

29. The system according to claim 28, wherein said disconnect spring and said disconnect mechanism are maintained within said sleeve.

30. The system according to claim 28, wherein said drive system further comprises:

a drive gear engageable with said disconnect mechanism;

a driven gear engageable by said drive gear; and a transfer gear engageable with said driven gear, said transfer gear adapted to rotate a drive tube so as to move the barrier between the limit positions.

31. The system according to claim 30, wherein said disconnect cable is terminated at an end opposite said handle by a slug having an elongated body which has a radial head, said handle movable to an intermediate position between said engagement position and said disengagement position, said elongated body adapted to move said disconnect mechanism from engagement with said drive gear when said handle is in said intermediate position, and said radial head adapted to move said drive gear from engagement with said driven gear when said handle is in said disengagement position.

32. The system according to claim 31, wherein said bias assembly pivots said operator motor assembly to said operating position when said handle is in said intermediate position.

33. An operator motor assembly for moving a barrier between limit positions comprising:

a motor assembly having a least one post associated therewith; and a bias assembly engaging said at least one post to maintain said motor assembly in an operating position, said bias assembly allowing said motor assembly to pivot and maintain engagement with said at least one post when a bias force of said bias assembly is overcome by pivoting forces applied to said motor assembly.

34. The assembly according to claim 33, further comprising:

a motor housing from which said at least one post extends.

35. The assembly according to claim 34, wherein said bias assembly comprises:

a yoke having opposed ends;

at least one spring, said at least one spring carried by a corresponding one of said yoke ends, said at least one spring having an elongate section from which extends a transition section; and wherein said motor housing has at least one post extending therefrom, wherein each post is supported by said elongate section.

36. The assembly according to claim 35, further comprising:

a compliance spring stop carried by said yoke and retaining at least a portion of said elongate section.

37. The assembly according to claim 35, wherein said at least one post is movable with respect to said motor housing so as to adjust the bias force.

38. The assembly according to claim 37, wherein said motor housing comprises:

at least one post receptacle having opposed sidewalls with inwardly extending rails, each said rail having opposed notches; and wherein said at least one post comprises a slide tab from which extends a finger, said slide tab received between said sidewalls and said finger movable between opposed notches so as to adjust a position of said post to adjust the bias force.

39. The assembly according to claim 37, wherein said motor housing comprises:

at least one post receptacle, said receptacle having opposed sidewalls with inwardly extending rails, each said rail having opposed notches; and wherein said post comprises:

an insertion nub having a key receivable in said notches; and a biasing arm having a finger at one end and a fork at an opposite end, said nub receivable in said opposed notches, said biasing arm extending between said rails, and said fork holding said post in said notches.

40. The assembly according to claim 37, wherein said motor housing comprises at least one cam surface, and each said post comprises a movable post cam receivable on said at least one cam surface.

41. The assembly according to claim 40, wherein said cam surface has a plurality of alignment holes extending into said motor housing, and a bushing surface recessed from said cam surface, said bushing surface having a fastener hole; said movable post cam having a housing side with a plurality of alignment nubs and a bushing extending therefrom, said bushing having a pivot opening extending therethrough.

42. The assembly according to claim 41, further comprising:

a spring-biased fastener received through said pivot opening and into said fastener hole, said alignment nubs movable into selected ones of said alignment holes, wherein said movable post cam has an irregular shape so as to provide a different contact point for said elongate sections of said bias assembly depending upon the orientation of said alignment nubs in said alignment holes.

43. The assembly according to claim 37, wherein said housing has at least one threaded opening on opposite sides thereof, and wherein said posts have threaded shafts receivable in said threaded openings.

44. The assembly according to claim 37, wherein said motor housing has at least one aligned post hole and said motor housing having at least one slat opening; and further comprising a post clip having at least one said post extending from each end, said post clip receivable in said slat opening, said at least one post having a post nub receivable in one of said aligned post holes.

45. A barrier operator system that moves a barrier between limit positions, comprising:

a pivotable motor assembly, said pivotable motor assembly having a blocking tab;

a counterbalance system coupled to said pivotable motor assembly and adapted to be linked to the barrier;

a drive system connected between said pivotable motor assembly and said counterbalance system; and a controller connected to said pivotable motor assembly to control operation thereof, said controller receiving a primary obstruction input from one of said pivotable motor assembly and said drive system and secondary obstruction input from movement of said blocking tab, wherein said controller initiates corrective action based upon said obstruction inputs.

46. The operator system according to claim 45, further comprising:

an encoder wheel associated with said drive system which generates a movement signal representative of the barrier's positional movement and which is used as said primary obstruction input.

47. The operator system according to claim 45, further comprising:

a current sensor associated with said pivoting motor and which generates a stall signal representative of the barrier's positional movement and which is used as said primary obstruction input.

48. The operator system according to claim 45, further comprising:

a commutator sensor associated with said pivoting motor and which generates a commutator signal representative of the barrier's positional movement and which is used as said primary obstruction input.

49. The operator system according to claim 45, further comprising:

a compliance encoder having a compliance emitter which generates a compliance beam received by a compliance receiver, said compliance encoder connected to said controller and generating said secondary obstruction input when said tab blocks said compliance beam.

50. The operator system system according to claim 49, wherein said blocking tab sets a reference position associated with a position established by said compliance encoder.

51. The operator system according to claim 45, further comprising:

an encoder wheel associated with said drive system which generates a movement signal representative of the barrier's positional movement and which is used as said primary obstruction input;

a current sensor associated with said pivoting motor and which generates a stall signal representative of the barrier's positional movement and which is used as said primary obstruction input; and a compliance encoder having a compliance emitter which generates a compliance beam received by a compliance receiver, said compliance encoder connected to said controller and generating said secondary obstruction input when said tab blocks said compliance beam; and wherein an upper travel limit is determined by combining said movement signal and said stall signal, and wherein a lower travel limit is determined by said secondary obstruction input.

52. The operator system according to claim 45, further comprising:

an encoder wheel associated with said drive system, said encoder wheel having a plurality of equally spaced markers, and at least one directional marker different than said equally spaced markers; and a sensor associated with said encoder wheel and generating count signals as said equally spaced markers pass said sensor, and a directional signal as said directional marker passes said sensor, said count signals and said directional signal received by said controller.

53. A drive system for a motorized barrier operator that moves a barrier between limit positions, comprising:

an encoder wheel having a plurality of equally spaced markers and at least one directional marker different than said equally spaced markers; and a sensor associated with said encoder wheel and generating count signals as said equally spaced markers pass said sensor and a directional signal as said directional marker passes said sensor.

54. The drive system according to claim 53, further comprising:

a motor-driven drive sleeve which rotates said encoder wheel.

* * * * *